US012746560B2

(12) United States Patent
Kopel et al.

(10) Patent No.: US 12,746,560 B2
(45) Date of Patent: Sep. 29, 2026

(54) PUMPING ASSEMBLY

(71) Applicant: Graco Minnesota Inc., Minneapolis, MN (US)

(72) Inventors: Andrew J. Kopel, Stanchfield, MN (US); Douglas S. Ryder, Buffalo, MN (US); Mark J. Brudevold, Fridley, MN (US); Jack M. Flatten, Centerville, MN (US); Jeremy P. Jurmu, Buffalo, MN (US); Erich W. Beckmann, Minneapolis, MN (US); Giaolong N. Nguyen, Plymouth, MN (US); Nicholas P. Peterson, Coon Rapids, MN (US); Dennis D. Kemmetmueller, Rogers, MN (US); Steve J. Wrobel, Rogers, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 19/565,935

(22) Filed: Mar. 13, 2026

(65) Prior Publication Data

US 2026/0225120 A1 Aug. 6, 2026

Related U.S. Application Data

(63) Continuation of application No. PCT/US2025/019536, filed on Mar. 12, 2025.

(Continued)

(51) Int. Cl.

| | |
|---|---|
| ***B05B 9/04*** | (2006.01) |
| ***F04B 9/04*** | (2006.01) |
| ***F04B 17/04*** | (2006.01) |

(52) U.S. Cl.
CPC ............ *B05B 9/0413* (2013.01); *F04B 9/045* (2013.01); *F04B 17/042* (2013.01)

(58) Field of Classification Search
CPC ....... B05B 9/0413; B05B 9/0416; F04B 9/02; F04B 9/025; F04B 9/04; F04B 9/042;
(Continued)

(56) References Cited

U.S. PATENT DOCUMENTS 5,228,842 A * 7/1993 Guebeli ................ F04B 53/162 277/530
5,769,321 A * 6/1998 Cyphers .................. F04B 9/045 239/154

(Continued)

FOREIGN PATENT DOCUMENTS

CN 114042555 A * 2/2022 ........... B05B 12/085
EP 4160014 A1 4/2023

(Continued)

OTHER PUBLICATIONS

English language translation of CN-114042555-A to Zhao et al., cited herewith as Foreign Patent Document "N" (Year: 2022).*

(Continued)

*Primary Examiner* — Darren W Gorman
(74) *Attorney, Agent, or Firm* — Kinney & Lange, P.A.

(57) ABSTRACT

A pumping assembly includes an electric motor that generates a rotational output, a drive that converts the rotational output to linear reciprocation motion, and a pump that receives the linear reciprocating motion from the drive. The electric motor is mounted to a mount body of the fluid sprayer. A drive shaft extends between a rotor of the electric motor and the drive to transmit the rotational motion from the rotor to the drive.

25 Claims, 30 Drawing Sheets

Related U.S. Application Data

(60) Provisional application No. 63/566,048, filed on Mar. 15, 2024, provisional application No. 63/671,477, filed on Jul. 15, 2024, provisional application No. 63/729,041, filed on Dec. 6, 2024.

(58) Field of Classification Search
CPC .......... F04B 9/045; F04B 9/047; F04B 17/03; F04B 17/04; F04B 17/042; F04B 15/02
See application file for complete search history.

(56) References Cited

U.S. PATENT DOCUMENTS

| | | | | |
|---|---|---|---|---|
| 8,596,555 | B2 * | 12/2013 | Thompson | B05B 9/0413 239/152 |
| 2002/0168275 | A1 | 11/2002 | Cooper et al. | |
| 2010/0224699 | A1 | 9/2010 | Gaddis et al. | |
| 2017/0149304 | A1 * | 5/2017 | Li | H02K 7/14 |
| 2018/0030967 | A1 | 2/2018 | Sulzer | |
| 2018/0200743 | A1 | 7/2018 | Dawson et al. | |
| 2022/0220950 | A1 * | 7/2022 | Janecek | F04B 17/03 |
| 2023/0100781 | A1 * | 3/2023 | Dalton | F04B 9/045 417/415 |

FOREIGN PATENT DOCUMENTS

| | | | |
|---|---|---|---|
| WO | 2020068685 | A1 | 4/2020 |
| WO | 2023230242 | A1 | 11/2023 |

OTHER PUBLICATIONS

International Search Report and Written Opinion for International Application No. PCT/US2025/019536, dated May 27, 2025, 16 pages.

* cited by examiner

PUMPING ASSEMBLY

CROSS-REFERENCE TO RELATED APPLICATION(S)

This application is a continuation of International Application No. PCT/US2025/019536 filed Mar. 12, 2025 and entitled "PUMPING ASSEMBLY," which in turn claims priority to U.S. Provisional Application No. 63/566,048 filed Mar. 15, 2024 and entitled "FLUID SPRAYER," and claims priority to U.S. Provisional Application No. 63/671,477 filed Jul. 15, 2024 and entitled "FLUID SPRAYER," and claims priority to U.S. Provisional Application No. 63/729,041 filed Dec. 6, 2024 and entitled "PUMPING ASSEMBLY," the disclosures of which are hereby incorporated by reference in their entireties.

BACKGROUND

This disclosure relates to pumping systems. More specifically, the present disclosure relates to pumping assemblies such as for use in fluid sprayers.

Fluid sprayers include pumps that pressure spray fluid and drive the spray fluid to a nozzle for outputting the spray fluid as an atomized fluid spray. Fluid sprayers include spray guns that can be held and manipulated by the user. The spray guns typically receive paint or other coating fluid under pressure and atomize the spray fluid. The spray fluid is typically put under pressure by a piston or diaphragm, which is referred to as airless spray. Airless spray can typically range in pressure from about 500 pounds per square inch (psi) (about 3.45 Megapascal (MPa)) to about 7000 psi (about 48.26 MPa), however lower and higher pressures are possible.

SUMMARY

According to an aspect of the disclosure, a pumping assembly configured to pump fluid includes a mount body; an electric motor, the electric motor comprising a stator and a rotor configured to rotate on a rotor axis, the electric motor configured to output rotational motion, wherein a portion of the mount body extends axially through the stator such that the stator is mounted on the portion of the mount body; a drive that converts rotational motion output by the electric motor into linear reciprocating motion; and a pump, the pump receiving the linear reciprocating motion from the drive to pump the spray fluid.

According to an additional or alternative aspect of the disclosure, a pumping assembly configured to pump fluid includes an electric motor, the electric motor comprising a stator and a rotor configured to rotate on a rotor axis, the electric motor configured to output rotational motion; a drive that converts rotational motion output by the electric motor into linear reciprocating motion; a pump, the pump receiving the linear reciprocating motion from the drive to pump the spray fluid; a frame including an upright portion and a base portion; and a tube extending from the upright portion, the motor axis extending within the tube and through the tube, the motor axis extending through the upright portion, and the stator mounted on the tube.

According to another additional or alternative aspect of the disclosure, A pumping assembly configured to pump fluid includes an electric motor, the electric motor comprising a stator and a rotor configured to rotate on a rotor axis, the electric motor configured to output rotational motion; a drive that converts rotational motion output by the electric motor into linear reciprocating motion; a pump, the pump receiving the linear reciprocating motion from the drive to pump the spray fluid; and a mount body supporting the electric motor, the drive, and the pump, the mount body including a tube, wherein the stator is mounted on a cantilevered end of the tube.

According to yet another additional or alternative aspect of the disclosure, a pumping assembly configured to pump fluid includes an electric motor, the electric motor comprising a stator and a rotor configured to rotate on a rotor axis, the electric motor configured to output rotational motion; a drive that converts rotational motion output by the electric motor into linear reciprocating motion; a pump, the pump receiving the linear reciprocating motion from the drive to pump the spray fluid; a mount body supporting the electric motor, the drive, and the pump, the mount body including a tube, the motor axis extending within the tube and through the tube, and the stator mounted on the tube; and a drive shaft connected to the rotor and extending through the tube to interface with the drive to provide a rotational input to the drive.

According to yet another additional or alternative aspect of the disclosure, a pumping assembly configured to pump fluid includes an electric motor, the electric motor comprising a stator and a rotor configured to rotate on a rotor axis, the electric motor configured to output rotational motion, wherein the electric motor is an outer rotator; a drive that converts the rotational motion output by the electric motor into linear reciprocating motion; and a pump, the pump receiving the linear reciprocating motion from the drive to pump the spray fluid. A portion of the rotor is disposed rearward of the stator, a portion of the stator is disposed forward of the rotor, a plurality of gears of the drive are disposed forward of the electric motor, and the pump is disposed forward of the plurality of gears.

According to yet another additional or alternative aspect of the disclosure, a pumping assembly configured to pump fluid includes an electric motor, the electric motor comprising a stator and a rotor configured to rotate on a rotor axis, the electric motor configured to output rotational motion, wherein the electric motor is an outer rotator; a drive that converts the rotational motion output by the electric motor into linear reciprocating motion; and a pump, the pump receiving the linear reciprocating motion from the drive to pump the spray fluid. The rotor extends rearward of the stator and further extends radially outward beyond the stator, the stator extends forward of the rotor, the drive extends forward of the stator, and the pump is located forward of the electric motor and extends below all of the electric motor and the drive.

According to yet another additional or alternative aspect of the disclosure, a pumping assembly configured to pump fluid includes an electric motor, the electric motor comprising a stator and a rotor configured to rotate on a rotor axis; a drive that converts the rotational motion output by the electric motor into linear reciprocating motion; a pump, the pump receiving the linear reciprocating motion from the drive to pump the spray fluid; and a drive shaft connected to the rotor and the interfacing with the drive, the drive shaft transmitting the rotational motion from the rotor to the drive. The drive shaft is disposed radially inward of the stator and the rotor extends radially outward of the stator.

According to yet another additional or alternative aspect of the disclosure, a pumping assembly configured to pump fluid includes a stand including at least one leg connected to a base plate; a mount body connected to the base plate and disposed on a top side of the base plate; an electric motor supported by the mount body, the electric motor comprising a stator and a rotor configured to rotate on a rotor axis, wherein the electric motor extends from above the base plate to below the top side of the base plate; a drive that converts the rotational motion output by the electric motor into linear reciprocating motion; and a pump, the pump receiving the linear reciprocating motion from the drive to pump the spray fluid.

According to yet another additional or alternative aspect of the disclosure, a pumping assembly configured to pump fluid includes a stand including a first leg and a second leg, the stand configured to support the pumping assembly on a support surface; a mount body connected to the stand; an electric motor supported by the mount body, the electric motor comprising a stator and a rotor configured to rotate on a rotor axis, wherein a portion of the rotor is disposed between the first leg and the second leg; a drive that converts the rotational motion output by the electric motor into linear reciprocating motion; and a pump, the pump receiving the linear reciprocating motion from the drive to pump the spray fluid.

According to yet another additional or alternative aspect of the disclosure, a pumping assembly configured to pump fluid includes a mount body; an electric motor supported by the mount body, the electric motor comprising a stator and a rotor configured to rotate on a rotor axis; a drive supported by the mount body, the drive converting the rotational motion output by the electric motor into linear reciprocating motion; a pump supported by the mount body, the pump receiving the linear reciprocating motion from the drive to pump the spray fluid; and a rotor cover connected to the mount body and disposed over the rotor.

According to yet another additional or alternative aspect of the disclosure, a pumping assembly configured to pump fluid includes a mount body; an electric motor supported by the mount body, the electric motor comprising a stator and a rotor configured to rotate on a rotor axis; a drive supported by the mount body, the drive converting the rotational motion output by the electric motor into linear reciprocating motion; a pump supported by the mount body, the pump receiving the linear reciprocating motion from the drive to pump the spray fluid; and a rotor cover connected to the mount body and disposed over the rotor, wherein a first portion of the rotor is exposed radially through the rotor cover and a second portion of the rotor is covered by the rotor cover.

According to yet another additional or alternative aspect of the disclosure, a pumping assembly configured to pump fluid includes a mount body; an electric motor supported by the mount body, the electric motor comprising a stator and a rotor configured to rotate on a rotor axis; a drive supported by the mount body, the drive converting the rotational motion output by the electric motor into linear reciprocating motion; a pump supported by the mount body, the pump receiving the linear reciprocating motion from the drive to pump the spray fluid; and a rotor cover connected to the mount body and disposed over the rotor. The rotor cover includes a first cover leg connected to the mount body and extending to radially overlap with the rotor; and a second cover leg connected to the mount body and extending to radially overlap with the rotor. A first cover gap is disposed circumferentially between the first cover leg and the second cover leg, the rotor exposed radially outward through the first cover gap.

According to yet another additional or alternative aspect of the disclosure, a pumping assembly configured to pump fluid includes a mount body; an electric motor supported by the mount body, the electric motor comprising a stator and a rotor configured to rotate on a rotor axis; a drive supported by the mount body, the drive converting the rotational motion output by the electric motor into linear reciprocating motion; a pump supported by the mount body, the pump receiving the linear reciprocating motion from the drive to pump the spray fluid; and a rotor cover connected to the mount body and disposed over the rotor, wherein the rotor cover supports an end circuit board such that the rotor is disposed axially between the end circuit board and the mount body.

According to yet another additional or alternative aspect of the disclosure, a pumping assembly configured to pump fluid includes an electric motor comprising a stator and a rotor configured to rotate on a rotor axis; a single bearing disposed radially within the electric motor; a drive that converts the rotational motion output by the electric motor into linear reciprocating motion; and a pump, the pump receiving the linear reciprocating motion from the drive to pump the spray fluid.

According to yet another additional or alternative aspect of the disclosure, a pumping assembly configured to pump fluid includes an electric motor comprising a stator and a rotor configured to rotate on a rotor axis; a motor bearing disposed radially within the electric motor, wherein only a single bearing is disposed radially within the electric motor, the motor bearing forming the single bearing; a drive that converts the rotational motion output by the electric motor into linear reciprocating motion; and a pump, the pump receiving the linear reciprocating motion from the drive to pump the spray fluid.

According to yet another additional or alternative aspect of the disclosure, a pumping assembly configured to pump fluid includes an electric motor comprising a stator and a rotor configured to rotate on a rotor axis, wherein the rotor includes a rotor forming a plurality of blades which cause airflow when the rotor rotates; a drive that converts the rotational motion output by the electric motor into linear reciprocating motion; and a pump, the pump receiving the linear reciprocating motion from the drive to pump the spray fluid.

According to yet another additional or alternative aspect of the disclosure, a pumping assembly configured to pump fluid includes an electric motor comprising a stator including at least one coil and a rotor configured to rotate on a rotor axis, wherein the rotor includes a rotor body that extends radially outward beyond the stator; a drive that converts the rotational motion output by the electric motor into linear reciprocating motion; and a pump, the pump receiving the linear reciprocating motion from the drive to pump the spray fluid. An endturn of the at least one coil is disposed axially closer to the pump than the rotor.

According to yet another additional or alternative aspect of the disclosure, a pumping assembly configured to pump fluid includes an electric motor comprising a stator including at least one coil and a rotor configured to rotate on a rotor axis; a drive that converts rotational motion output by the electric motor into linear reciprocating motion; a pump, the pump receiving the linear reciprocating motion from the drive to pump the spray fluid; and a motor control configured to regulate one or more power signals to the electric motor, the motor control including a circuit board disposed axially between the rotor and the pump.

According to yet another additional or alternative aspect of the disclosure, a pumping assembly configured to pump fluid includes an electric motor comprising a stator including at least one coil and a rotor configured to rotate on a rotor axis; a drive that converts rotational motion output by the electric motor into linear reciprocating motion; a pump, the pump receiving the linear reciprocating motion from the drive to pump the spray fluid; a frame including an upright portion, a base portion, and a tube on which the stator is mounted; a plate connected to the frame; and a motor control configured to regulate one or more power signals to the electric motor, the motor control including a control board mounted on the plate.

According to yet another additional or alternative aspect of the disclosure, a pumping assembly configured to pump fluid includes an electric motor comprising a stator including at least one coil and a rotor configured to rotate on a rotor axis; a drive that converts rotational motion output by the electric motor into linear reciprocating motion; a pump, the pump receiving the linear reciprocating motion from the drive to pump the spray fluid; and a motor control configured to regulate one or more power signals to the electric motor, the motor control including a capacitor projecting to radially overlap with the electric motor.

According to yet another additional or alternative aspect of the disclosure, a pumping assembly configured to pump fluid includes an electric motor comprising a stator including at least one coil and a rotor configured to rotate on a rotor axis; a drive that converts rotational motion output by the electric motor into linear reciprocating motion; a pump, the pump receiving the linear reciprocating motion from the drive to pump the spray fluid; a frame including an upright portion, a base portion, and a tube on which the stator is mounted; and a motor control configured to regulate one or more power signals to the electric motor, the motor control a control board wrapped at least partially around the tube.

According to yet another additional or alternative aspect of the disclosure, a pumping assembly configured to pump fluid includes an electric motor comprising a stator including at least one coil and a rotor configured to rotate on a rotor axis; a drive that converts rotational motion output by the electric motor into linear reciprocating motion; a pump, the pump receiving the linear reciprocating motion from the drive to pump the spray fluid; a frame including an upright portion and a base portion; a plate connected to the frame; and a channel formed between the upper portion and the plate, the channel closed radially inward towards the motor axis.

According to yet another additional or alternative aspect of the disclosure, a pumping assembly includes an assembly body having a mount body and an assembly cover at least partially enclosing the mount body, the assembly body having a front end, a rear end, a first lateral side, a second lateral side, a top side, and a bottom side; an electric motor disposed in the assembly body and supported by the mount body; a drive at least partially disposed in the assembly body and supported by the mount body, the drive configured to convert a rotational output from the electric motor to linear reciprocating motion; and an assembly handle extending from the mount body and at least partially disposed outside of the assembly cover. The assembly handle including a base arm that extends between a handle base and a junction, the base arm extending laterally and forwardly towards the front end as the base arm extends towards the junction; and a grip arm extending rearwardly from the junction, wherein the grip arm is cantilevered from the base arm.

According to yet another additional or alternative aspect of the disclosure, a pumping assembly includes an assembly body having a mount body and an assembly cover at least partially enclosing the mount body, the assembly body having a front end, a rear end, a first lateral side, a second lateral side, a top side, and a bottom side; an electric motor disposed in the assembly body and supported by the mount body, the electric motor configured to rotate on a motor axis; a drive at least partially disposed in the assembly body and supported by the mount body, the drive connected to the electric motor and configured to convert a rotational output from the electric motor to linear reciprocating motion, wherein the drive extends at least partially into a mounting cavity open through the front end, the mounting cavity configured such that a pump is at least partially disposed within the mounting cavity to mount to the mount body and the drive; and an assembly handle extending from the mount body and at least partially disposed outside of the assembly cover, the assembly handle including a base arm that extends laterally outward away from a reciprocation axis of the drive and extends forward towards the front end such that the base arm is dual-canted; and a grip arm extending rearwardly from the base arm, wherein the grip arm is cantilevered from the base arm.

According to yet another additional or alternative aspect of the disclosure, a pumping assembly includes an assembly body having a mount body and an assembly cover at least partially enclosing the mount body, the assembly body having a front end, a rear end, a first lateral side, a second lateral side, a top side, and a bottom side; an electric motor disposed in the assembly body and supported by the mount body, the electric motor configured to rotate on a motor axis; a drive at least partially disposed in the assembly body and supported by the mount body, the drive connected to the electric motor and configured to convert a rotational output from the electric motor to linear reciprocating motion along a reciprocation axis; and an assembly handle extending from the mount body and at least partially disposed outside of the assembly cover. The assembly handle includes a handle base interfacing with the mount body; a base arm extending laterally from the handle base and forward towards the front end from the handle base, the base arm extending laterally away the reciprocation axis; and a grip arm extending rearwardly from the base arm and towards the rear end, wherein the grip arm is cantilevered from the base arm.

According to yet another additional or alternative aspect of the disclosure, a pumping assembly includes an assembly body having a mount body and an assembly cover at least partially enclosing the mount body, the assembly body having a front end, a rear end, a first lateral side, a second lateral side, a top side, and a bottom side; an electric motor disposed in the assembly body and supported by the mount body, the electric motor configured to rotate on a motor axis; a drive at least partially disposed in the assembly body and supported by the mount body, the drive connected to the electric motor and configured to convert a rotational output from the electric motor to linear reciprocating motion along a reciprocation axis; and an assembly handle extending from the mount body and at least partially disposed outside of the assembly cover. The assembly handle includes a base arm that extends laterally and forward from a handle base of the assembly handle, the base arm extending forward towards the front end and extending laterally away from the motor axis; and a grip arm extending rearwardly from the base arm and towards the rear end, wherein the grip arm is cantilevered from the base arm and extends to overlap with a center of gravity of the pumping assembly, and wherein the grip arm is spaced laterally in a direction towards the first lateral side from the center of gravity.

According to yet another additional or alternative aspect of the disclosure, a pumping assembly includes an assembly body having a mount body and an assembly cover at least partially enclosing the mount body, the assembly body having a front end, a rear end, a first lateral side, a second lateral side, a top side, and a bottom side; a stand including a plurality of legs that support the assembly body; an electric motor disposed at least partially in the assembly body and supported by the mount body; a drive at least partially disposed in the assembly body and supported by the mount body, the drive connected to the electric motor and configured to convert a rotational output from the electric motor to linear reciprocating motion; and an assembly handle extending from the mount body and at least partially disposed outside of the assembly cover. The assembly handle includes a base arm that extends between a handle base and a junction, the base arm projecting away from the mount body in an orientation that is tilted both laterally and forwardly such that the junction is laterally to the side of the handle base and the junction is forward of at least a portion of the handle base; and a grip arm extending rearwardly from the junction, the grip arm extending horizontally, wherein the grip arm is cantilevered and the assembly handle defines an upper-most part of the pumping assembly.

According to yet another additional or alternative aspect of the disclosure, a pumping assembly includes an assembly body having a mount body and an assembly cover at least partially enclosing the mount body, the assembly body having a front end, a rear end, a first lateral side, a second lateral side, a top side, and a bottom side; a stand including a plurality of legs that support the assembly body; an electric motor disposed at least partially in the assembly body and supported by the mount body; a drive at least partially disposed in the assembly body and supported by the mount body, the drive connected to the electric motor and configured to convert a rotational output from the electric motor to linear reciprocating motion; and an assembly handle extending from the mount body and at least partially disposed outside of the assembly cover. The assembly handle includes a base arm that extends between a handle base and a junction, the base arm projecting away from the frame in an orientation that is tilted both laterally and forwardly such that the junction is laterally to the side of the handle base and the junction radially overlaps the handle base relative to the motor axis; and a grip arm extending rearwardly from the junction, the grip arm extending horizontally, wherein the grip arm is cantilevered and the assembly handle defines an upper-most part of the pumping assembly.

DETAILED DESCRIPTION

Figure 1:
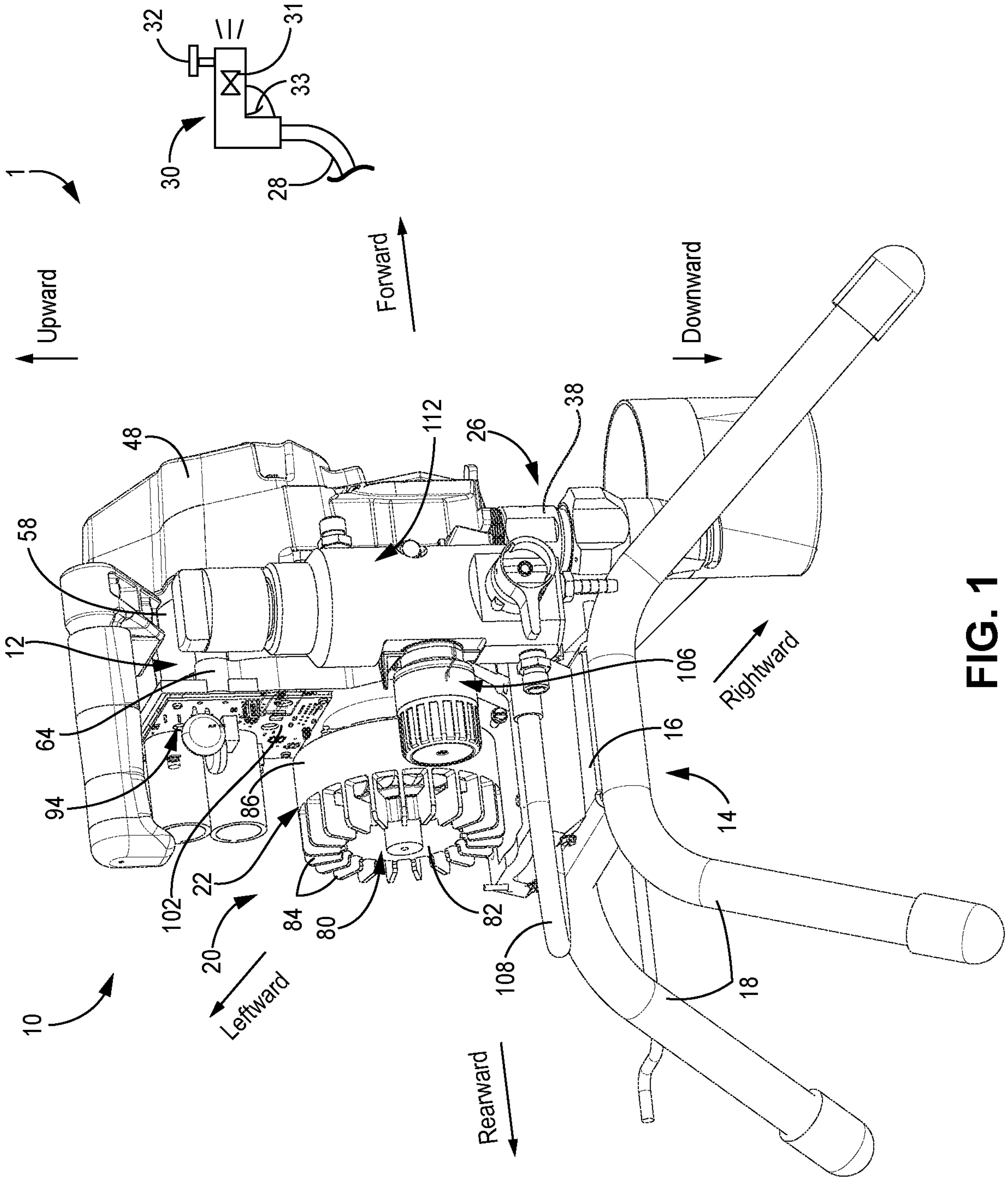
FIG. 1 is an isometric view of a fluid sprayer.

This disclosure relates to fluid supply. Pumping assemblies according to the present disclosure can be utilized in spray systems, such as for spraying paint, varnish, water, oil, stains, finishes, aggregate, coatings, and solvents, amongst other options, onto a substrate.

While the above-identified figures set forth embodiments of the present invention, other embodiments are also contemplated, as noted in the discussion. In all cases, this disclosure presents the invention by way of representation of possibilities and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

The present disclosure makes use of multiple embodiments to demonstrate various inventive aspects. The embodiments use similar reference numbers and/or descriptions of the components and aspects. An aspect (material, dimensions, functions, relationship to other aspects, etc.) of a component shown and/or described in connection with one embodiment can be present in a similar component of another embodiment even if not explicitly shown or described for another embodiment, particularly but not exclusively for components of similar reference numbers. For the sake of brevity, such common aspects may not be repeated for each embodiment, but may nevertheless be applicable between embodiments.

This disclosure uses multiple examples to demonstrate various inventive aspects. The inventive scope of this disclosure is not necessarily limited to any one of these embodiments, nor to all of them in just the manner shown and/or described. Rather, the inventive aspects demonstrated herein can be implemented in various other manners. One aspect or feature shown or described from one embodiment could be implemented on another embodiment in this disclosure even if not shown or described for that embodiment, or various embodiments not illustrated herein. The embodiments illustrated and/or discussed are intended to be illustrative and not limiting, and the described and/or illustrated features can be mixed and matched between different embodiments but including and excluding various features amongst the embodiments.

Pumping assemblies according to aspects of the disclosure include an electric motor that generates a rotational output to cause pumping by a pump. The electric motor includes a rotor that rotates on an axis and a stator that electromagnetically drives rotation of the rotor. The electric motor can be mounted on a portion of a mount body of the pumping assembly. The mount body can support other components of the pumping assembly, such as a drive that converts the rotational output of the electric motor to linear reciprocating motion and the pump.

The electric motor of the pumping assembly can be mounted on a portion of the mount body that extends at least partially into the electric motor. The electric motor can be mounted on a tube of the mount body. The tube can extend into the stator to interface with the stator. The electric motor can, in various examples, be configured as an outer rotator in which the rotor rotates around the stator. The rotor can extend radially outward of the stator.

The stator can be mounted on a tube of a mount body of the pumping assembly. The tube can be disposed on a radially inner side of the mount body. A drive shaft extends between and connects the rotor and the drive to provide the rotational output of the electric motor to the drive. The drive shaft can extend through the tube that supports the stator. The drive shaft can extend through the stator.

Pumping assemblies according to aspects of the disclosure include an electric motor that is mounted to provide a compacta and lighter weight assembly. According to various aspects of the disclosure, the electric motor can be configured such that the rotor extends rearward of the stator and the stator extends forward of the rotor. The drive of the pumping assembly can be disposed forward of both the stator and the rotor. The pump can be disposed forward of the stator and the rotor. The pump can be disposed forward of portions of the drive. The pump can hang downward below each of the drive, the stator, and the rotor. According to some examples, the electric motor can be configured such that end turns of the stator are disposed closer to the pump than the rotor is to the pump.

Pumping assemblies according to aspects of the disclosure can include an electric motor formed as an outer rotator. A drive shaft extends from the rotor to transmit rotational motion from the electric motor. The drive shaft can extend through the electric motor radially inward of the stator. The pumping assembly can be configured such that the stator is disposed radially outward of the drive shaft and such that the rotor is disposed radially outward of the stator. A radial line extending from a rotational axis of the electric motor can extend through the drive shaft, then through the stator, and then through the rotor.

Pumping assemblies according to aspects of the disclosure include an electric motor supported by a mount body of the pumping assembly. The mount body can be connected to base plate of a stand, the stand including legs that extend from the base plate. The stand is configured to support the pumping assembly on a support surface (e.g., the ground). The electric motor can be disposed such that an outer diameter of the electric motor hangs down below the interface between the mount body and the base plate. The electric motor can be disposed such that the electric motor extend below a top side of the base plate. The electric motor can be disposed such that the electric motor extends below a bottom side of the mount body. According to some aspects of the disclosure, the electric motor can be mounted such that the electric motor hangs down such that a portion of the electric motor is directly between stand legs of the stand.

Pumping assemblies according to various aspects of the disclosure include a rotor cover that at least partially covers the rotor. The rotor cover can be disposed inside of a main shroud of the pumping assembly. According to some examples, the rotor cover can be configured such that the rotor is exposed through the rotor cover.

According to additional or alternative aspects, the rotor cover can be configured to shield components of the pumping assembly from the rotating rotor. Portions of the rotor cover can be disposed between electronic components and the rotor, such as to hold and protect wiring of the electronic components. Portions of the rotor can be configured to hold and/or guide wiring between electronic components.

According to additional or alternative aspects, the rotor cover can be configured to hold one or more electronic components (e.g., a circuit board) of the pumping assembly. The electronic component can be mounted on the rotor cover to mount to the rotor cover. The rotor cover can hold and/or guide wiring between that electronic component and one or more other electronic components, such as a controller.

Pumping assemblies according to various aspects of the disclosure include an electric motor that drives rotation of a drive shaft. A rotor of the electric motor can be supported by a single bearing disposed radially within the motor. The single bearing can be disposed directly radially inward of the stator and rotor of the electric motor. The single bearing can be an only bearing radially within the electric motor. The electric motor can be an outer rotator.

According to additional or alternative aspects, the drive shaft can be disposed radially inward of the stator. The drive shaft can, in some examples, extend through the stator. The rotor can be mounted to the drive shaft at a location radially inward of the stator. The drive shaft can extends through the single bearing to be rotatably supported by the single bearing.

According to additional or alternative aspects, the rotor can extend radially outward from an interface with the drive shaft to radially outward of the stator. The rotor can include one or more blades that generate airflow during rotation of the rotor. The rotor can axially and radially overlap with the stator such that the rotor can blow cooling air through the stator.

Pumping assemblies according to aspects of the disclosure can include a control board that controls various electronic aspects of the pumping assembly. In some examples, the control board can regulate power signals to the electric motor. The control board can be disposed forward of the electric motor. The control board can, in some examples, extend vertically above the electric motor. In some examples, the control board can project laterally outward of the electric motor, in one or both lateral directions. According to some examples, the control board can be disposed between the electric motor and the drive. According to some examples, the control board can be between the electric motor and an eccentric of the drive. According to some examples, the control board can be disposed directly between the electric motor and at least one gear of the drive.

According to additional or alternative aspects, a control board of the pumping assembly can include one or more capacitors. A capacitor extending from the control board can extend over the electric motor. The capacitor can be disposed directly radially outward of the electric motor.

According to additional or alternative aspects, a control board of the pumping assembly can be mounted on a plate. The plate can be connected to a frame of the pumping assembly. The plate and control board can be removed together and installed together. Various examples of pumping assemblies according to aspects of the controller include a tube on which the stator is mounted. A drive shaft can extend through the tube. The plate on which the control board is mounted can extend at least partially around the tube. The plate can include a notch that receives the tube such that the plate extends on both lateral sides of the tube. In various examples, the control board can be mounted on the plate such that the control board extends at least partially around the tube and is disposed on both lateral sides of the tube.

According to some additional or alternative aspects, the plate on which the control board mounts is mounted to a frame of the pumping assembly. One or more channels are disposed between the plate and the frame. The one or more channels can provide cooling pathways for cooling air to flow. The one or more channels can, in some examples, provide passages for routing wiring to/from the control board. The wiring can extend within the channel.

Pumping assemblies according to various aspects of the disclosure include an assembly handle. The assembly handle is configured to be grasped by a user to pick up and/or carry the pumping assembly. The assembly handle is canted to extend outward relative to a handle base connected to a mount body of the pumping assembly. The assembly handle can extend forward and laterally from the handle base. The assembly handle can include a first arm that is canted laterally and longitudinally and a second arm that extends rearward from the first arm. In various examples, the assembly handle can include a grip notch configured to accommodate a thumb of the user.

Components can be considered to radially overlap when those components are disposed at common axial locations along an axis and such that a line extending radially from the axis will extend through each of the radially overlapping components. Components can be considered to axially overlap when those components are disposed at common radial and circumferential locations relative to an axis such that an axial line parallel to the axis extends through each of the axially overlapping components. Components can be considered to circumferentially overlap when aligned about the axis at a common radial distance from the axis such that a circle centered on the axis passes through each of the circumferentially overlapping components.

Figure 2:
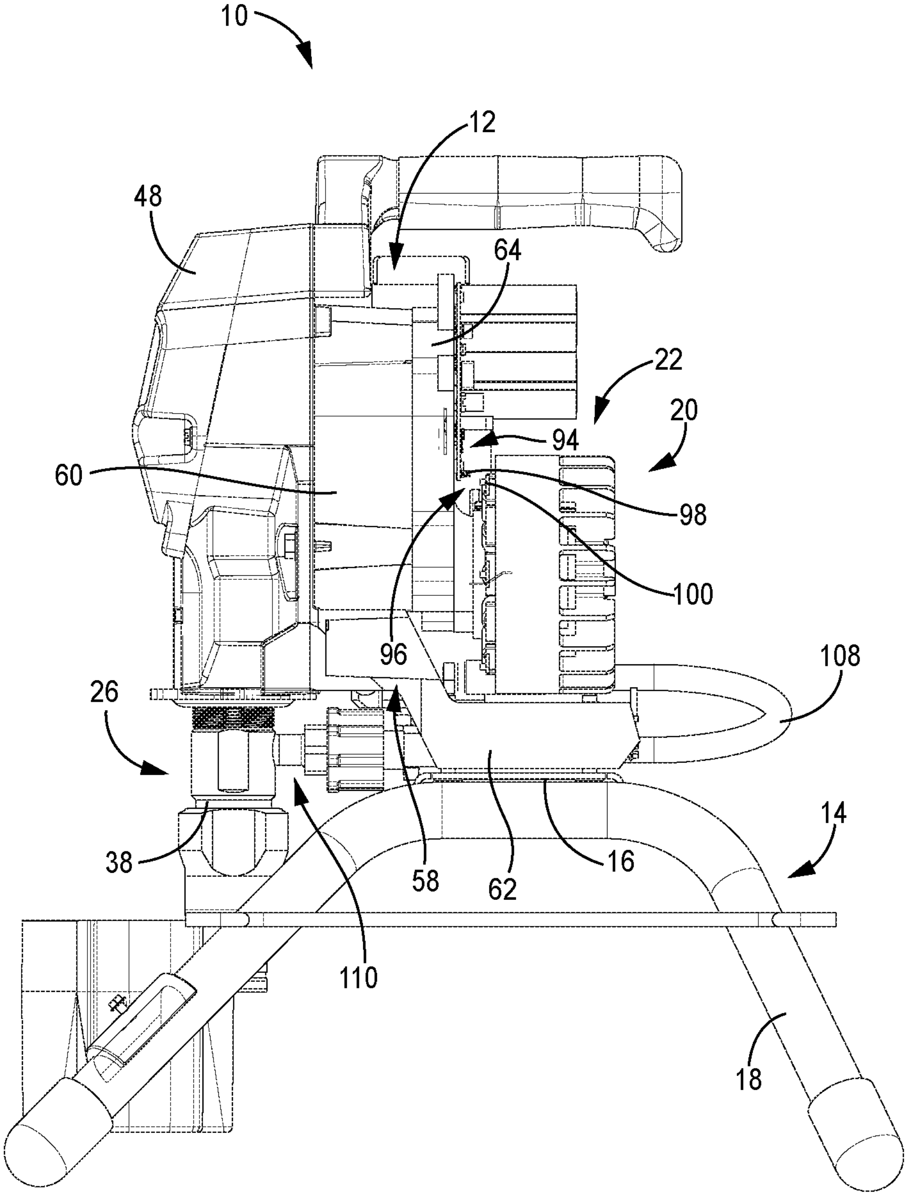
FIG. 2 is a side elevational view of a pumping assembly of the fluid sprayer.
Figure 3:
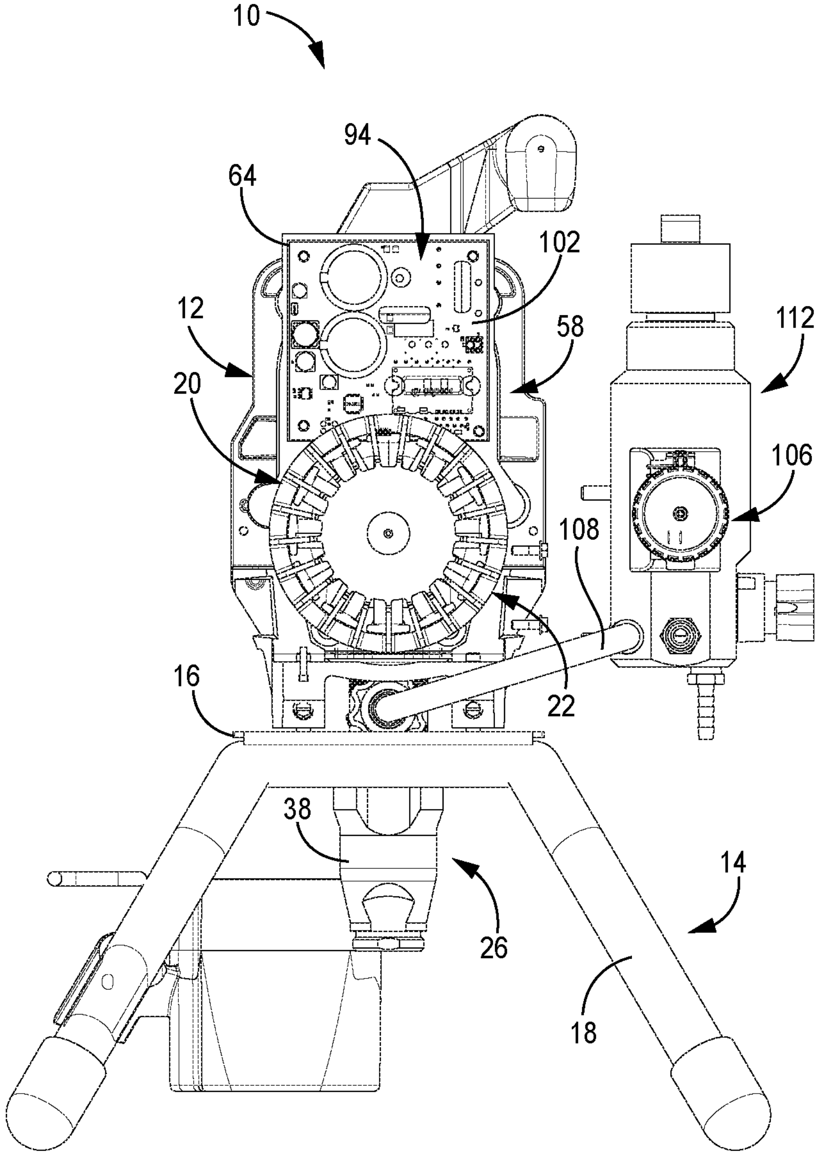
FIG. 3 is a rear elevational view of the pumping assembly.
Figure 4:
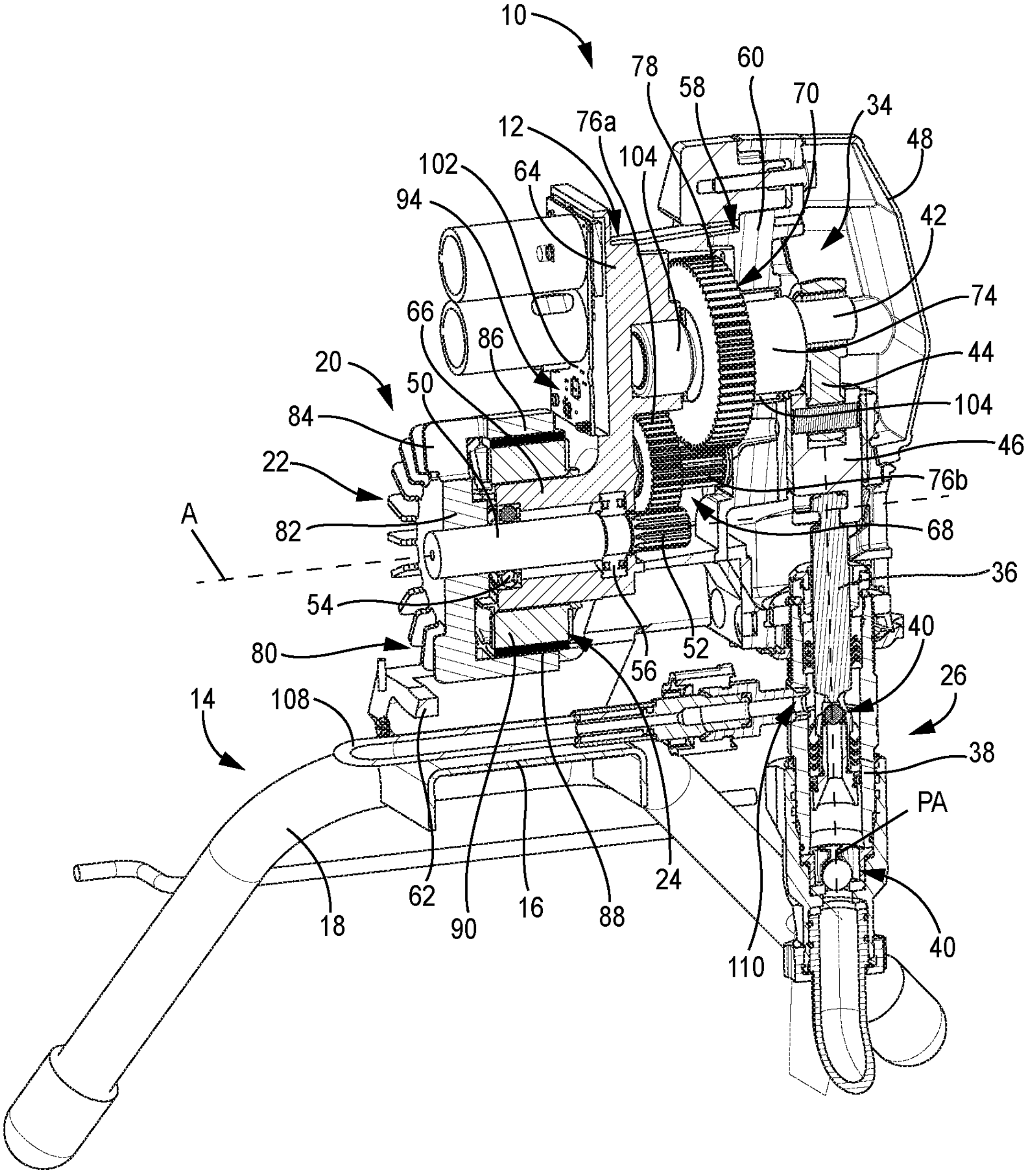
FIG. 4 is an isometric cross-sectional view of the pumping assembly.
Figure 5:
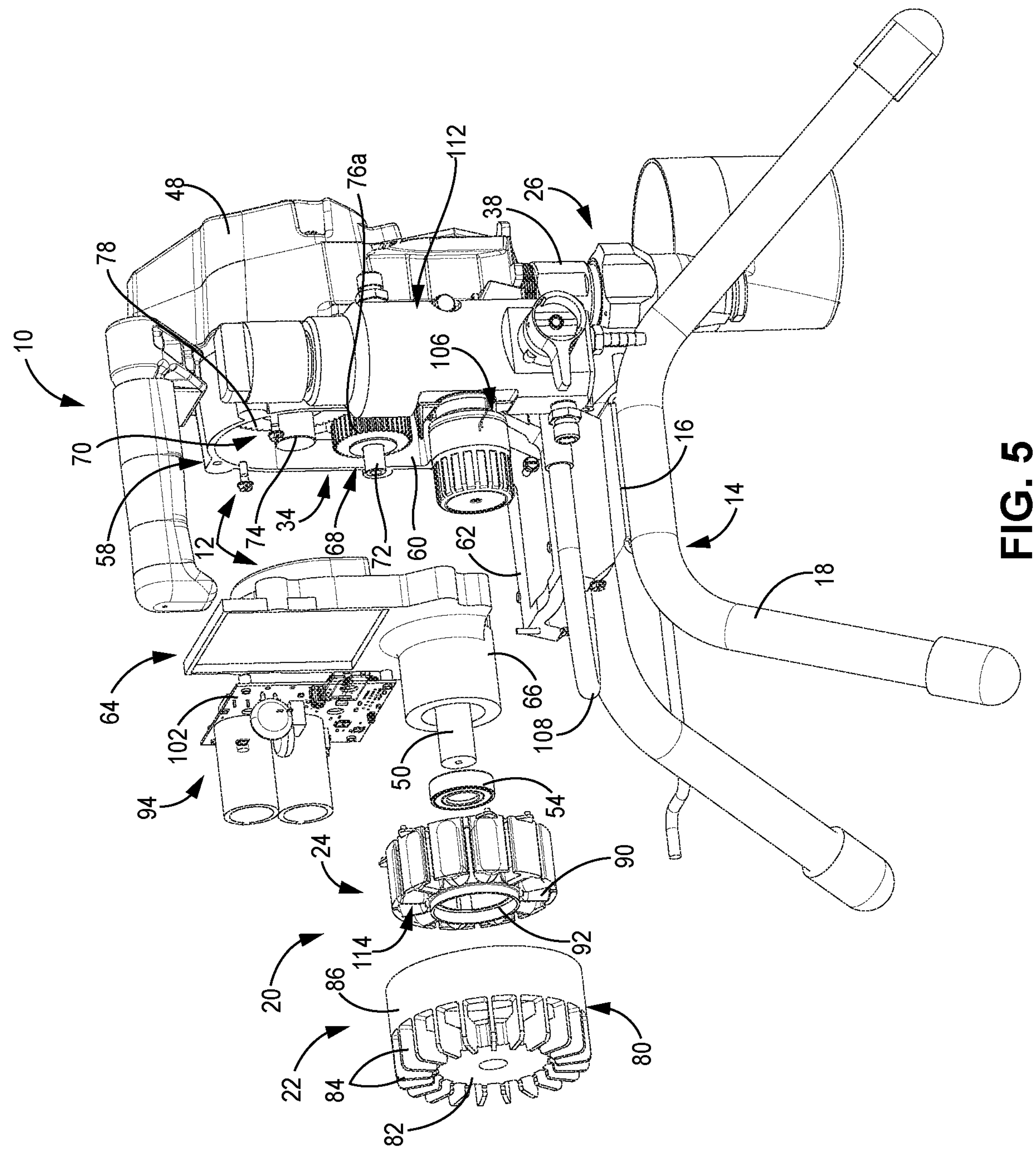
FIG. 5 is a partially exploded view of the pumping assembly.
Figure 6:
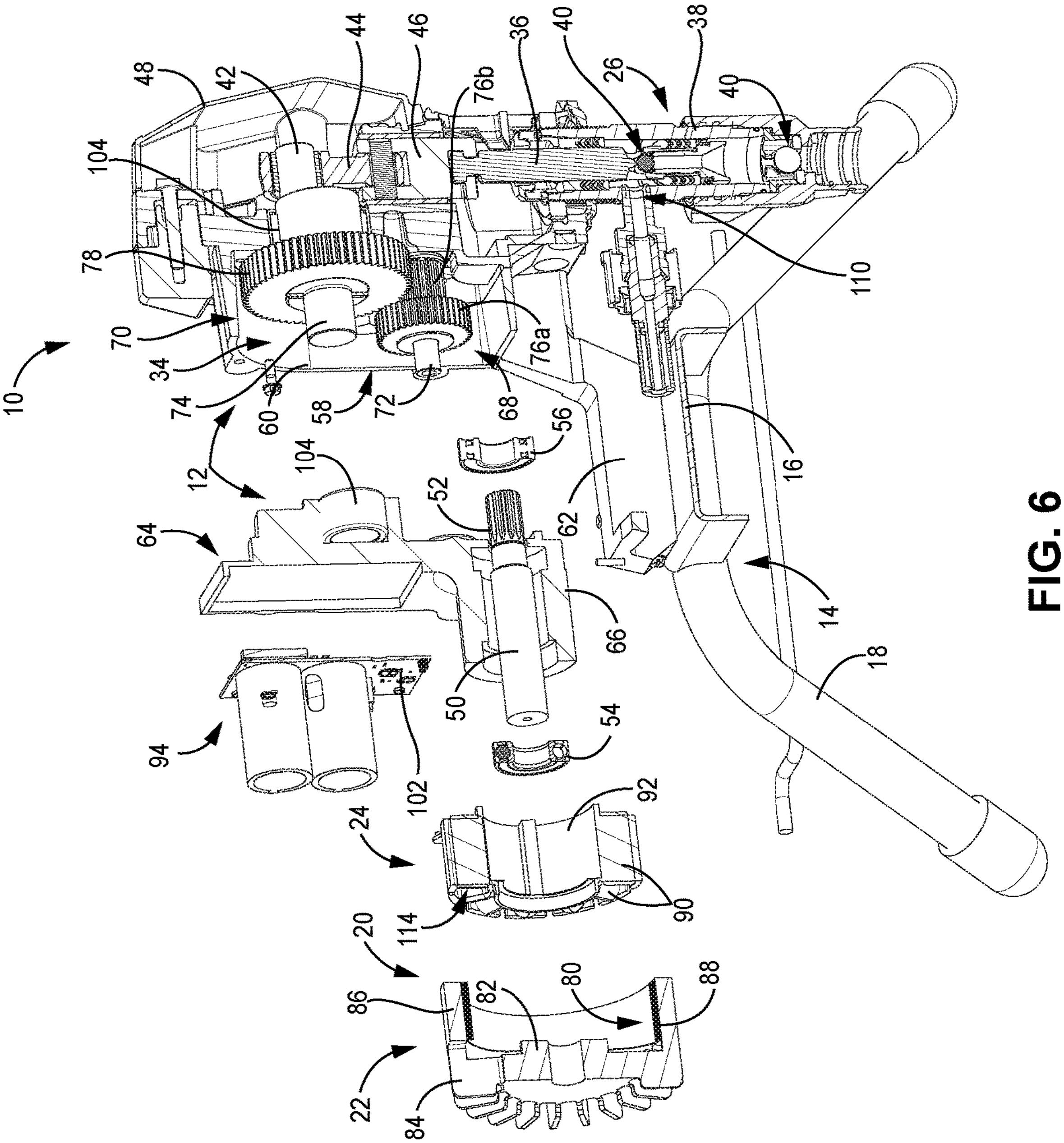
FIG. 6 is an isometric, partially exploded, cross-sectional view of the pumping assembly.

FIG. 1 is an isometric view of pumping assembly 10. FIG. 2 is a side elevational view of pumping assembly 10 pumping assembly 10 of fluid sprayer 1. FIG. 3 is a rear elevational view of pumping assembly 10. FIG. 4 is an isometric cross-sectional view of pumping assembly 10. FIG. 5 is a partially exploded view of pumping assembly 10. FIG. 6 is an isometric, partially exploded, cross-sectional view of pumping assembly 10. A pumping assembly 10 configured to pump fluid is shown. Portions of a housing or shroud of the pumping assembly 10 are omitted to illustrate various internal components of the pumping assembly 10.

Pumping assembly 10 includes mount body 12 on which various other components of the pumping assembly 10 are mounted. Mount body 12 can structurally support other components of fluid sprayer. In the example shown, mount body 12 is connected to stand 14. Stand 14 is configured to support pumping assembly 10 relative to a support surface, such as the ground. Stand 14 includes base plate 16 on which mount body 12 is disposed and stand legs 18 extending from base plate 16.

The pumping assembly 10 can comprise an electric motor 20. The electric motor 20 can comprise a rotor 22 and a stator 24, the electric motor 20 configured to output rotational motion. In examples in which pumping assembly 10 is utilized for spraying of fluids, such as in a fluid sprayer (e.g., fluid sprayer 1), the spray fluid can be pumped via pump 26 under pressure via supply hose 28 to a spray gun 30 for spraying, such as via opening of valve 31 within the spray gun 30 due to actuation of trigger 33 of the spray gun 30. The outlet orifice of the spray gun 30 may be part of a rotatable spray tip 32 that allows reversing of the direction of flow to unclog. For example, the spray tip 32 can be in a first position associated with spray operations and can then be rotated (e.g., about 180-degrees) to a position associated with de-clogging.

The pumping assembly 10 can further comprise a drive 34 which converts rotational motion output by the electric motor 20 into linear reciprocating motion. The pumping assembly 10 can further comprise a pump 26, the pump 26 receiving linear reciprocating motion from the drive 34 to pump the spray fluid under pressure. The pump 26 can include a piston 36 that reciprocates within a pump body 38 of the pump 26. The pump 26 can include check valves 40, such as in the manner of a double displacement pump. For example, a first one of the check valves 40 can be disposed at an inlet of the pump 26 and a second one of the check valves 40 can be carried by the piston 36. The pump 26 can be configured as a double displacement pump, in various examples, such that the pump 26 outputs spray fluid during both an upstroke of the piston 36 and a downstroke of the piston 36.

The drive 34 includes an eccentric 42 and a crank arm 44 to convert rotational motion into linear reciprocating motion to operate the pump 26. A coupling 46 can connect the crank arm 44 to the rod of the piston 36. The drive 34 can be partially covered by front cover 48, which can be a polymer case, among other options. While a crank mechanism is shown, other mechanisms for converting rotational motion to linear reciprocating motion are possible, such as scotch yoke, wobble, cam and follower, and rack and pinion, amongst other options.

The stator 24 is configured to electromagnetically drive rotation of the rotor 22 to generate the rotational output from motor 20. It is understood that in various examples the motor 20 can be formed as either an inner rotator (in which the rotor 22 is disposed radially inward of the stator 24) or as an outer rotator (in which the rotor 22 is disposed radially outward of the stator 24). In the example shown, the stator 24 can be at least partially located inside of the rotor 22 such that the rotor 22 rotates around the stator 24.

The pumping assembly 10 can further comprise a drive shaft 50, the drive shaft 50 connected to the rotor 22 such that the drive shaft 50 rotates 1:1 with the rotor 22. The pumping assembly 10 does not include intermediate gearing between the rotor 22 and the drive shaft 50 in this example. The drive shaft 50 can extend within the rotor 22 and the stator 24. The drive shaft 50 can extend entirely though the stator 24 such that the drive shaft 50 is located both forward and rearward of the stator 24. A forward end of the drive shaft 50 can be formed into a pinion 52 that interfaces with a gear of the drive 34. The drive shaft 50 can be located at a radial center (the axis A indicated on FIG. 4). Directly radially outward from the drive shaft 50 can be located the stator 24. Directly radially outward from the stator 24 can be an air gap (a tubular shaped air gap between the rotor 22 and stator 24). Directly radially outward from the air gap can be the rotor 22.

The rotor 22 can be mounted on a rear end of the drive shaft 50. The rear end of the drive shaft 50 can be considered to form an input end of the drive shaft 50 as the rear end of the drive shaft 50 receives the rotational motion from the rotor 22. The front end of the drive shaft 50 can be considered to form an output end of the drive shaft 50 as the front end of the drive shaft 50 provides a rotational output to the drive 34. The output end includes the pinion 52 in the example shown.

The pumping assembly 10 can further comprise a first bearing (e.g., motor bearing 54) located directly radially inward of both the rotor 22 and the stator 24, the first bearing located directly radially outward of the drive shaft 50. The first bearing can directly contact both of the stator 24 and the drive shaft 50 to allow the drive shaft 50 to rotate relative to the stator 24. The first bearing can contact structure on which the stator 24 is mounted and contact the drive shaft 50 to allow for rotation of the drive shaft 50 relative to the static support structure. The first bearing can be disposed directly radially between the drive shaft 50 and the stator 24. The first bearing can contact a stationary support for the stator 24 (e.g., contact the tube 66) and contact the drive shaft 50 to support rotation of the drive shaft 50 relative to the stationary tube 66. The first bearing may be the only bearing located directly radially within the electric motor 20. The first bearing may be the only bearing located within the electric motor 20.

The pumping assembly 10 can further comprise a second bearing (e.g., shaft bearing 56) through which the drive shaft 50 extends, the second bearing mounted to a frame 58, the second bearing located outside of the electric motor 20. The second bearing is spaced axially from the motor 20. The first bearing and the second bearing may be the only bearings that support the drive shaft 50 in various examples, though it is understood that not all examples are so limited.

The pump 26 can be mounted on the frame 58. The pump 26 can be clamped onto the frame 58. The pump 26 can be mounted on an upright portion 60 of the frame 58. The upright portion 60 can connect to a base portion 62 at a corner section. The pump 26 may be mounted to the upright portion 60 and not the base portion 62. The base portion 62 can be mounted to stand 14. The stand 14 can engage the ground to support the pumping assembly 10. The illustrated embodiment shows a stand 14 with two tubes forming four legs, but other types of stands may be implemented, including a stand 14 with wheels allowing the pumping assembly 10 to be transported by rolling. Further, the stand 14 can include more or fewer than four legs, such as two, three, five, etc.

The mount body 12, which includes frame 58 and plate 64 in the example shown, is stationary during operation of the pumping assembly 10. A part of the mount body 12 extends within the electric motor 20. Such a part can be tube 66. The drive shaft 50 extends within and through the tube 66 while the stator 24 is located directly radially outward from the tube 66. As shown, the stator 24 can be mounted on the tube 66. The tube 66 can be cylindrical or a different shape. The part of the mount body 12 (e.g., the tube 66) that extends into the stator 24 can project rearward from an upright portion 60 of the frame 58. The part of the mount body 12 (e.g., the tube 66) that extends into the stator 24 can be cantilevered. As such, the stator 24 can be supported by a cantilevered portion of the mount body 12 of the pumping assembly 10. In the example shown, the tube 66 is formed as a portion of the plate 64 that mounts to the frame 58, though it is understood that not all examples are so limited.

The tube 66 (or other part of the mount body 12 that extends into the stator 24) can be formed as a a single piece of contiguous metal with other portions of the mount body 12 (e.g., with frame 58 or plate 64), among other options.

In some implementations, the upright portion 60 can receive at least one gear (e.g., lower gear assembly 68 or upper gear assembly 70) of the drive 34. In some implementations, the upright portion 60 can receive portions of at least two gears (e.g., lower gear shaft 72 of lower gear assembly 68 and upper gear shaft 74 of upper gear assembly 70) of the drive 34. In some implementations, the upright portion 60 receives an eccentric 42 of the drive 34. In some implementations, the frame 58 supports at least one gear of the drive 34 and an eccentric 42 of the drive 34. While drive 34 is described as including lower gear assembly 68 and upper gear assembly 70, it is understood that not all examples are so limited. For example, drive 34 can include a single stage of gearing (e.g., with pinion 52 directly driving upper gear 78 of upper gear assembly 70) or can include a gear train with more than two stages.

The rotor 22 can comprise a rotor body or rotor frame 80 that extends radially outward, the rotor body 80 forming a plurality of blades 84 which cause airflow when the rotor 22 rotates. The rotor body 80 comprises a mounting ring 82 configured to mount on the drive shaft 50, and includes an outer tube 86 which is radially outward from the mounting ring 82, the outer tube 86 located around the stator 24. A circular array of magnets 88 is mounted on the outer tube 86. The magnets 88 directly radially overlap with the stator 24. As shown, the circular array of magnets 88 is radially inward facing, complementary to the circular array of electromagnetic coils 90 of the stator 24 which are outward facing across an air gap. The plurality of blades 84 structurally connect the outer tube 86 to the mounting ring 82 in the example shown.

The stator 24 comprises a circular array of a plurality of electromagnet coils 90. The coils 90 are configured to generate electromagnetic flux that drives rotation of the rotor 22. The plurality of blades 84 causes airflow between adjacent electromagnet coils 90 of the plurality of coils 90. The circular array of a plurality of electromagnet coils 90 can be mounted on a mandrel 92. The mandrel 92 can be mounted to the tube 66 that extends radially within the stator 24.

The rotor 22 can extend rearward of the stator 24 and further can extend radially outward beyond the stator 24. The stator 24 can extend forward of the rotor 22. The drive 34 can extend forward of the stator 24, and the pump 26 can be located forward of the electric motor 20 and extends below all of the electric motor 20 and the drive 34. In the example shown, at least a portion of the stator 24 is disposed axially between a forwardmost portion of the rotor 22 and the drive 34.

The rotor 22 can extend radially outward beyond the stator 24, and the stator 24 can include a circular array of a plurality of electromagnet coils 90. Endturns of the plurality of electromagnet coils 90 are closer to the pump 26 than the rotor 22 is to the pump 26.

The stator 24 can be coaxial with the drive shaft 50 and directly radially overlap with the drive shaft 50, and the rotor 22 may not be directly radially between the drive shaft 50 and the stator 24.

The pumping assembly 10 can further comprise a motor control 94 which regulates one or more power signals to the electric motor 20. As shown, the motor control 94 can directly face the rotor 22. A rotational sensor 96 can sense rotation of the rotor 22. The rotational sensor 96 can include a first sensor part 98 mounted on the rotor 22 and a second sensor part 100 mounted on the motor control 94, the first sensor part 98 and the second sensor part 100 can be located directly across from each other, as shown. The motor control 94 can extend each of above the electric motor 20, forward of the electric motor 20, and may not extend laterally beyond the electric motor 20 (e.g., as shown in FIG. 3), though it is understood that not all examples are so limited. The motor control 94 can comprise multiple electrical components, such as resistors, capacitors, and chips, mounted on a control board 102 (such as a single circuit board).

The pumping assembly 10 can further comprise a plate 64. The motor control 94 can be mounted on the plate 64. The plate 64 can support the eccentric 42 of the drive 34. For example, a bearing supporting rotation of the eccentric 42 can be mounted to the plate 64. The drive shaft 50 can extend through an aperture of the plate 64. The plate 64 can support at least one gear of the drive 34. As shown, the plate 64 is mounted to a rear side of a frame 58, the pump 26 located on the front side of the frame 58 relative to the plate 64.

The frame 58 can have a base portion 62 and an upright portion 60. The base portion 62 can be horizontally orientated and the upright portion 60 can be vertically orientated. The plate 64 is mounted to a rear side of the upright portion 60. One or more gears of the drive 34 can be captured between the upright portion 60 and the plate 64. In the example shown, lower gear assembly 68 (including lower gears 76*a*, 76*b*) and upper gear assembly (including upper gear 78) are disposed between and supported by upright portion 60 and plate 64.

The eccentric 42 can be captured between the upright portion 60 and the plate 64, and the eccentric 42 further extends forward through the upright portion 60 to connect with a crank arm 44 of the drive 34. The drive shaft 50 extends from behind the plate 64 through the plate 64 to support a pinion 52 that is positioned between the plate 64 and the upright portion 60. The plate 64 can be mounted to a rear side of the upright portion 60. A plurality of fasteners (e.g., bolts among other options) may be used to connect the plate 64 to the upright portion 60. The upright portion 60 can receive a first plurality of bearings 104 that support the drive 34, and the plate 64 receives a second plurality of bearings 104 that support the drive 34. For example, the lower gear assembly 68 can be supported by multiple bearings 104, with one of the bearings supported by upright portion 60 and another one of the bearings supported by plate 64. Additionally or alternatively, the upper gear assembly 70 can be supported by multiple bearings 104, with one of the bearings supported by upright portion 60 and another one of the bearings supported by plate 64.

The upright portion 60 can handle a majority (or all or essentially all) of reactionary load forces generated from the drive 34 and the pump 26 during operation. The upright portion 60 transmits these loads through the base portion 62. The base portion 62 can be mounted on stand 14, and all or essentially all of the reactionary load forces generated from the drive 34 and the pump 26 are transmitted through the stand 14 to the support surface (e.g., the ground). The plate 64 may not be directly mounted to the base portion 62. The frame 58 may be in an L shape relative to a lateral or side view, with the upright portion 60 forming the vertical leg and the base portion 62 forming the horizontal leg. The upright portion 60 and the base portion 62 can be formed from two separate metal parts, or a single piece of contiguous metal.

The pumping assembly 10 can further comprise a pressure module 106. The pressure module 106 can control a pressure of the fluid output from pump 26 to supply hose 28. The pressure module 106 can be formed as a user pressure input in which the user can manipulate the pressure module 106 to adjust the output pressure. In the example shown, the pressure module 106 includes a knob or dial that can be rotated by the user to adjust the output pressure.

Output hose 108 is connected to pump 26 and is configured to carry fluid output from the outlet 110 of the pump 26 to the filter manifold 112. The supply hose 28 can be connected to the filter manifold 112 to receive fluid output from filter manifold 112 and provide such spray fluid to the spray gun 30.

Figure 7:
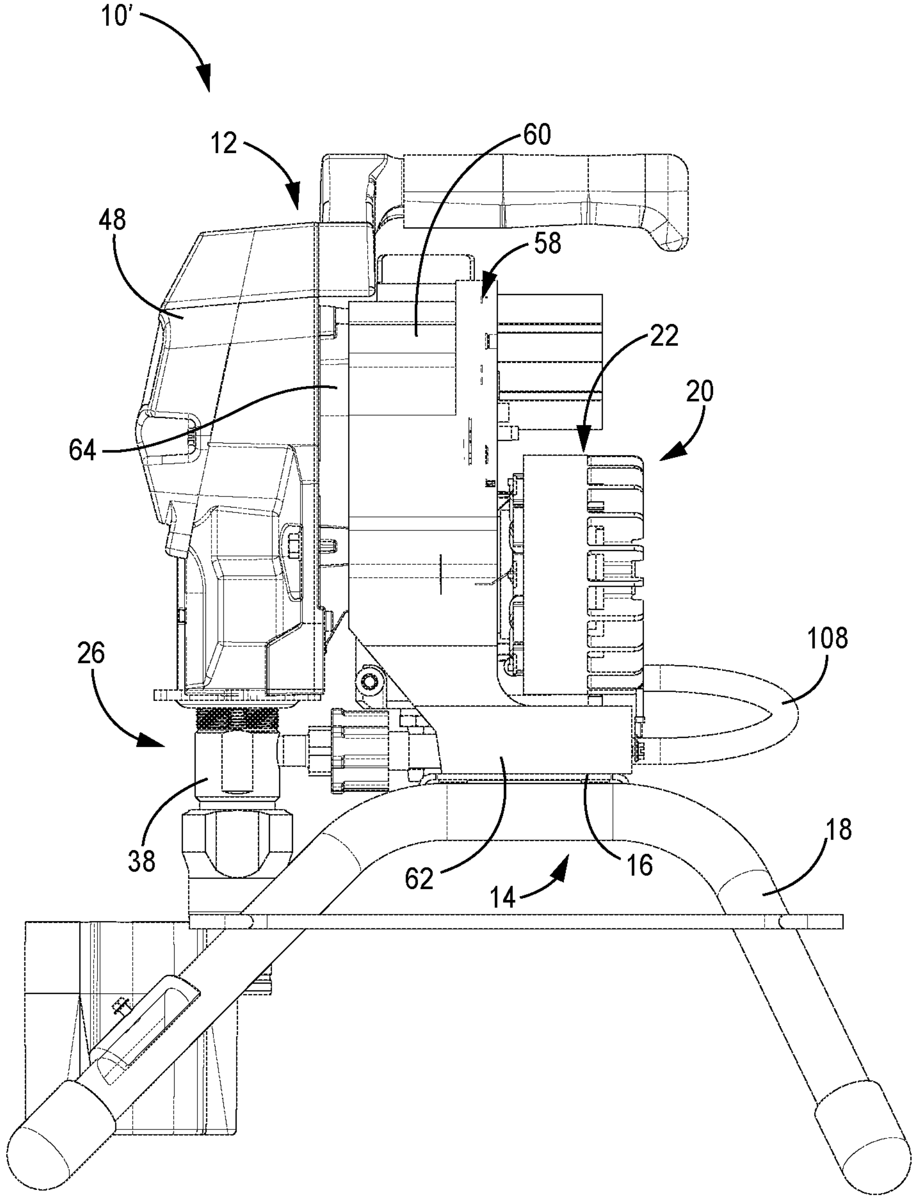
FIG. 7 is a side elevational view of a pumping assembly.
Figure 8:
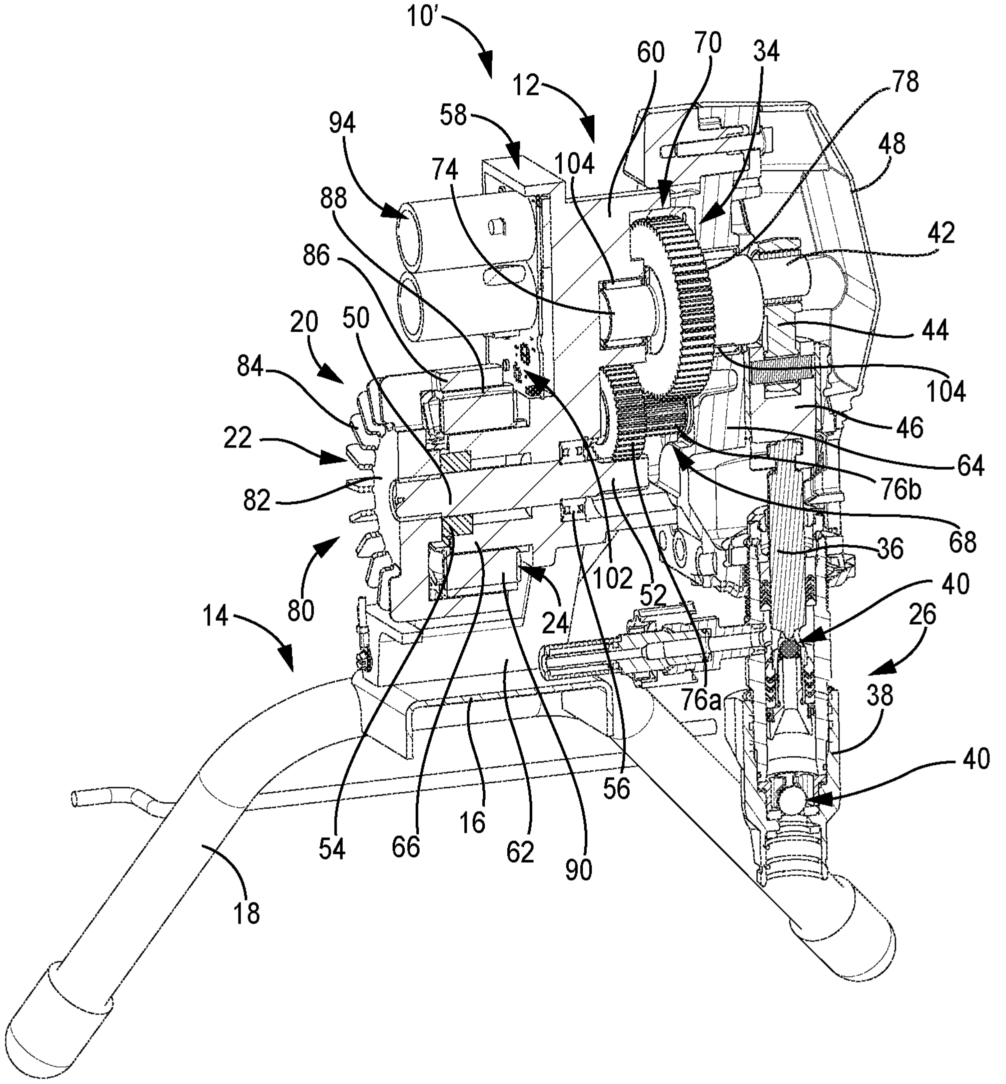
FIG. 8 is an isometric cross-sectional view of the pumping assembly.
Figure 9:
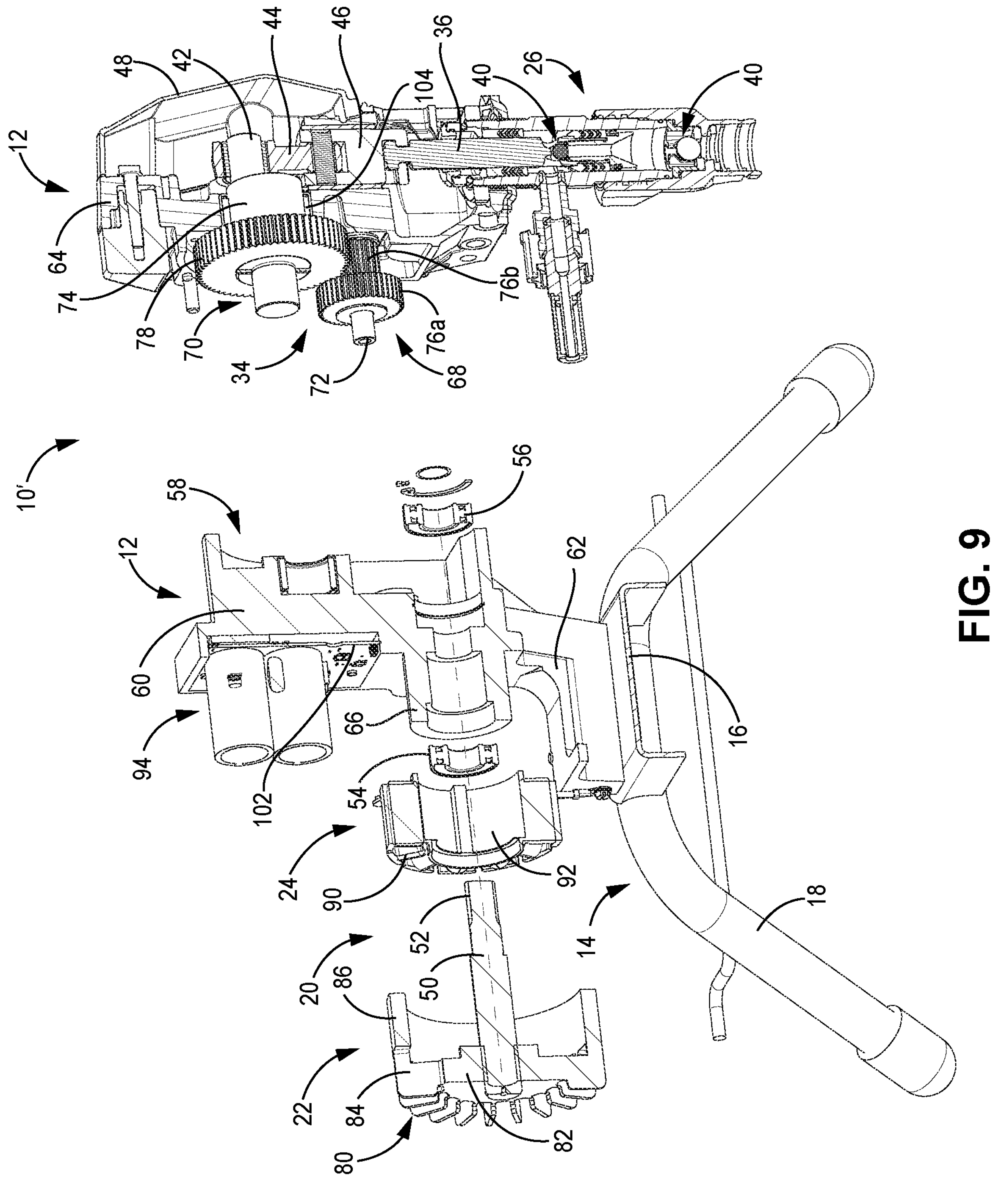
FIG. 9 is an isometric, partially exploded, cross-sectional view of the pumping assembly.

FIG. 7 is a side elevational view of pumping assembly 10'. FIG. 8 is an isometric cross-sectional view of pumping assembly 10'. FIG. 9 is an isometric, partially exploded, cross-sectional view of pumping assembly 10'. FIGS. 7-9 are discussed together. The pumping assembly 10' shown in FIGS. 7-9 is substantially similar to the pumping assembly 10 shown in FIGS. 1-6. The parts can be structurally similar and/or operate the same as preciously shown and/or described, except to the limited degree shown or described to be different. Components with the same reference numbers can operate and/or be structurally similar, such that redundant explanations are not provided.

A different between the pumping assembly 10 shown in FIGS. 1-6 and the pumping assembly 10' shown in FIGS. 7-9 is that in FIGS. 1-6 the plate 64 is mounted to the upright portion 60 from the backside of the upright portion 60, whereas in the example of FIGS. 7-9 the plate 64 mounts to the upright portion 60 from the front side of the upright portion 60. The gears and eccentric 42 are still captured between the plate 64 and the upright portion 60. In this example, the tube 66 is formed from the frame 58 and extends rearward from the frame 58 into the stator 24.

Figure 10:
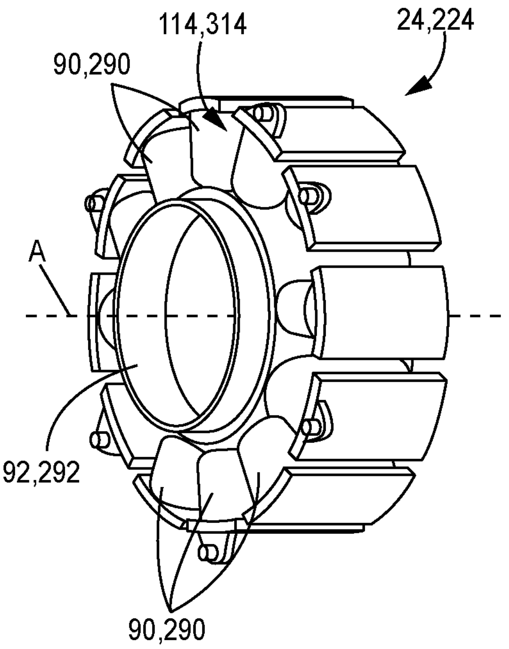
FIG. 10 is an isometric view of a stator of an electric motor.

FIG. 10 is an isometric view of a stator 24, 224. The stator 24, 224 includes a circular array of electromagnetic coils 90, 290. The individual coils 90, 290 are shown. The coils 90, 290 can be supported by a mandrel 92, 292. As shown, the coils 90, 290 are arrayed in a circle around the axis. As shown, coil gaps 114, 314 are open between adjacent ones of the coils 90, 290 to allow air to flow directly between the coils 90, 290 to cool the stator 24, 224. The coil gaps 114, 314 allows airflow between adjacent coils 90, 290 and through the stator 24, 224. Stator 24, 224 can be used in any motor referenced herein.

Figure 11:
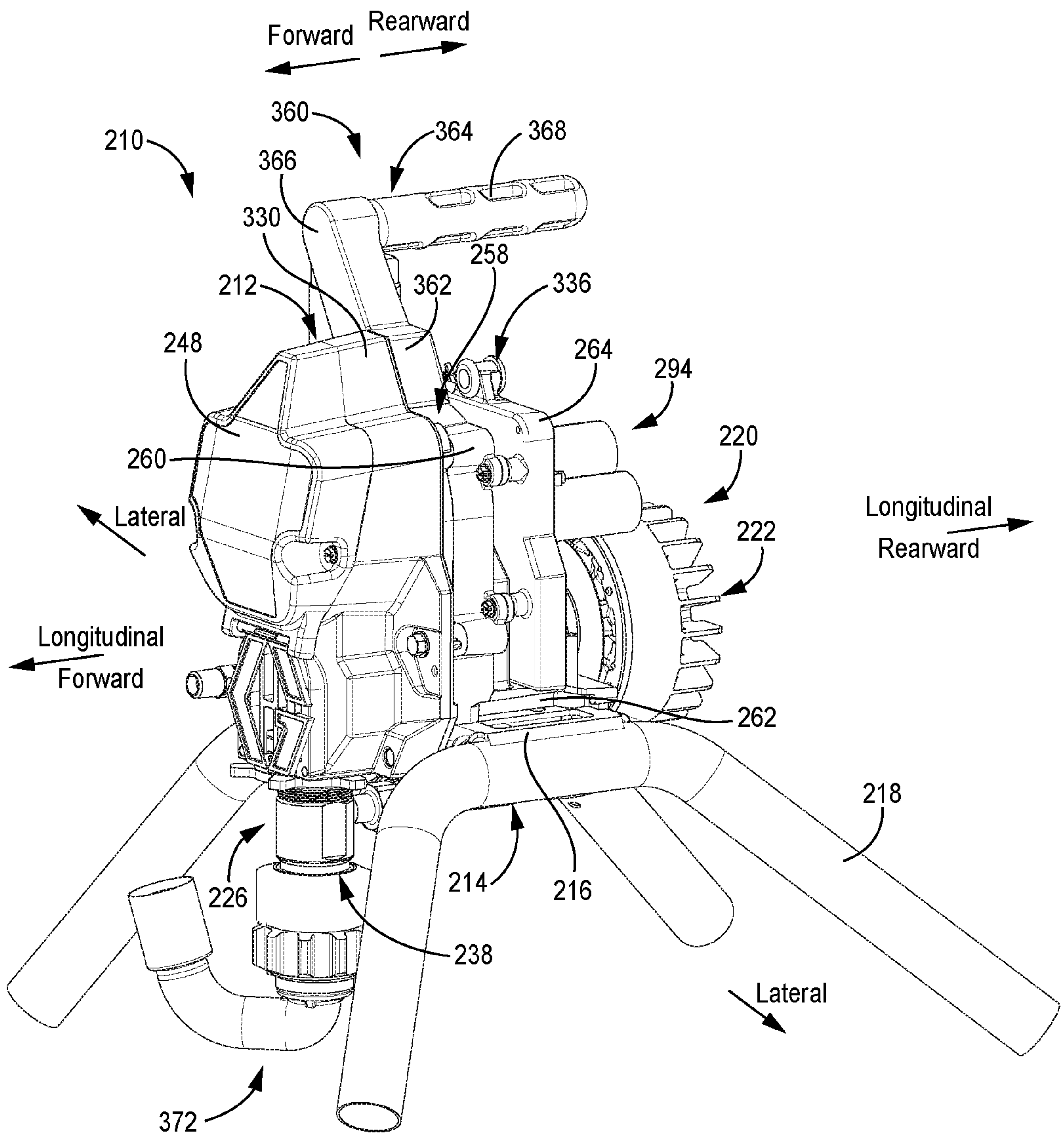
FIG. 11 is an isometric view of a pumping assembly.
Figure 12A:
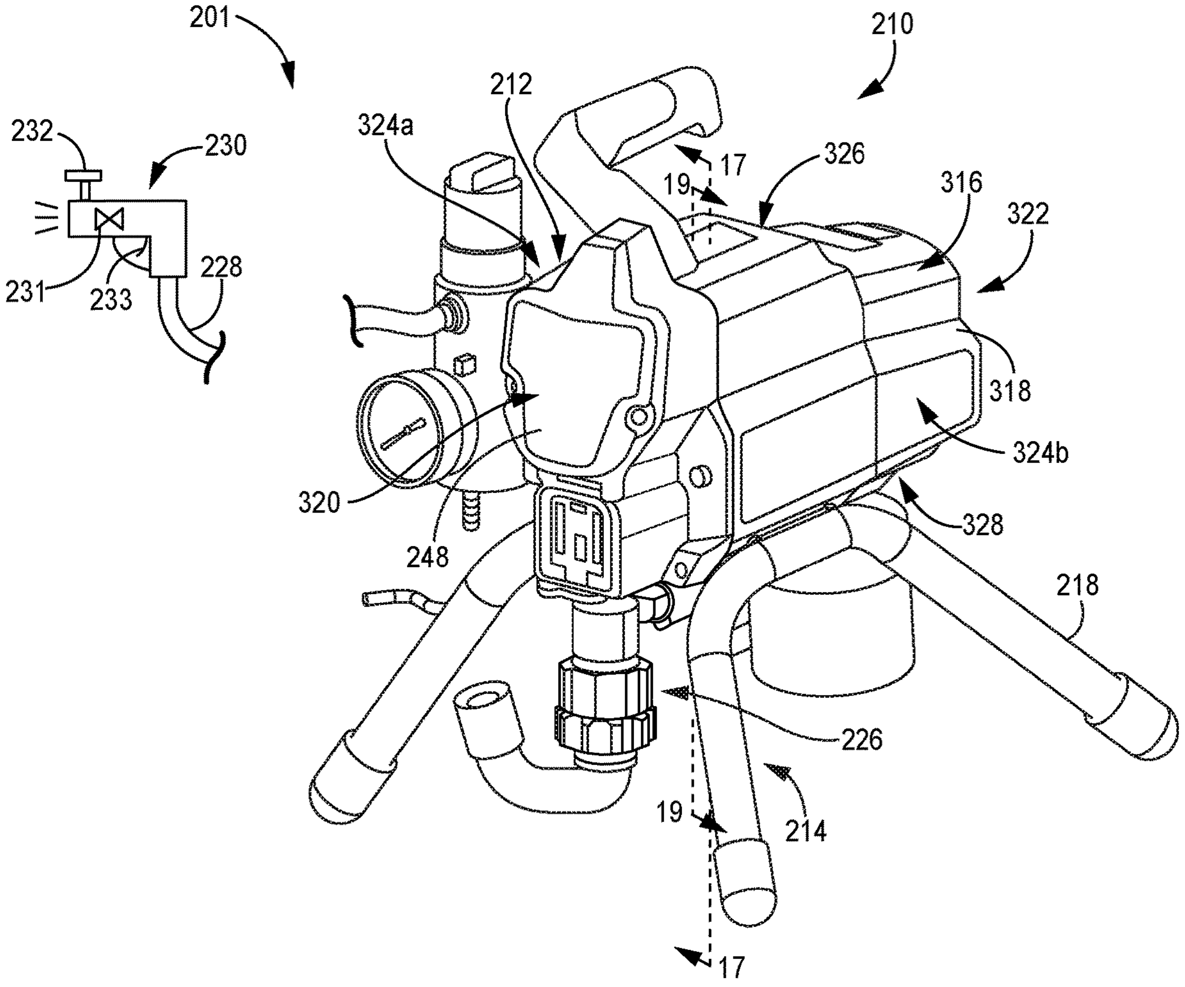
FIG. 12A is an isometric view of the pumping assembly.
Figure 12B:
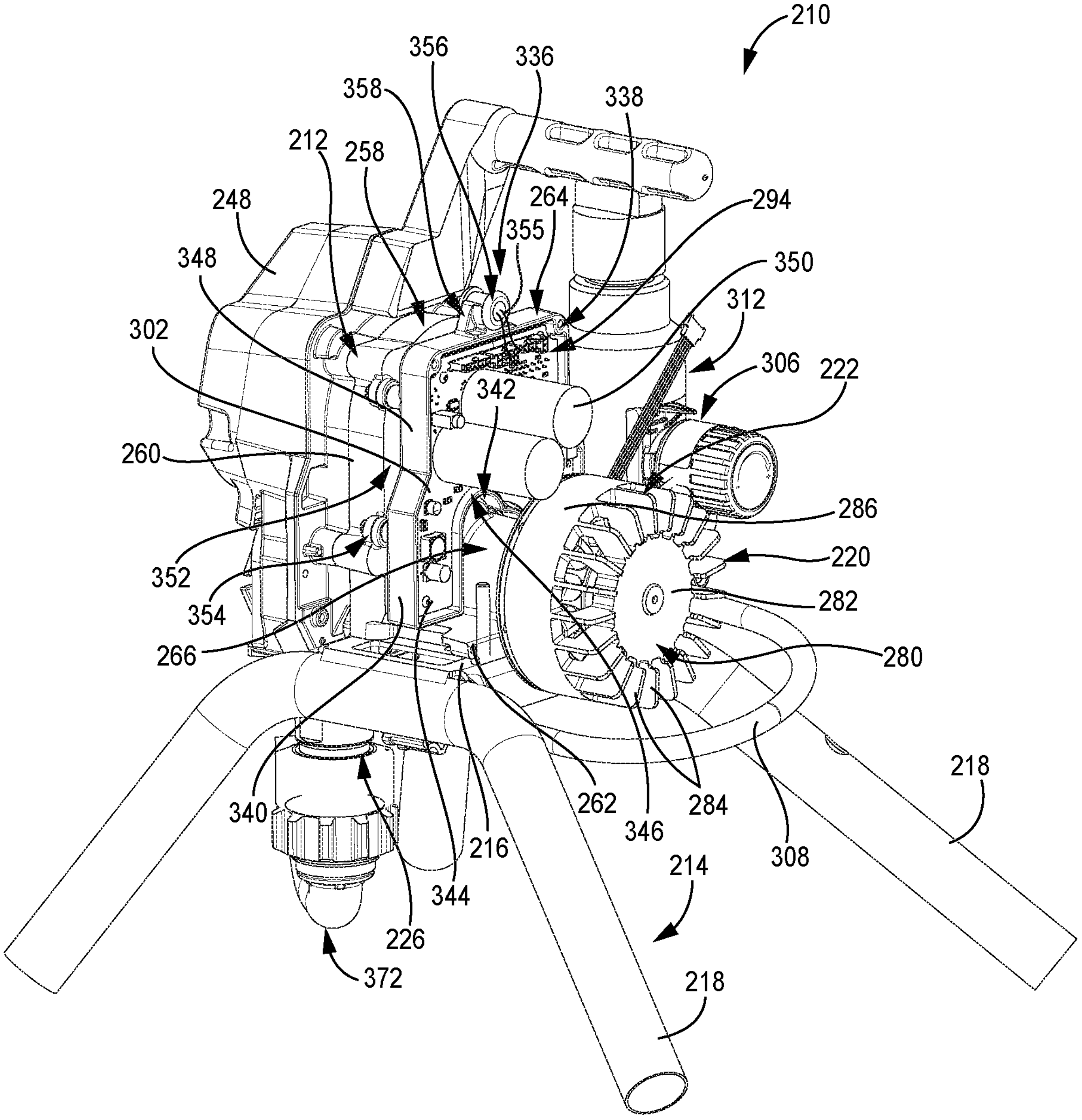
FIG. 12B is an isometric view of the from a rear end of pumping assembly with an assembly cover removed.
Figure 13:
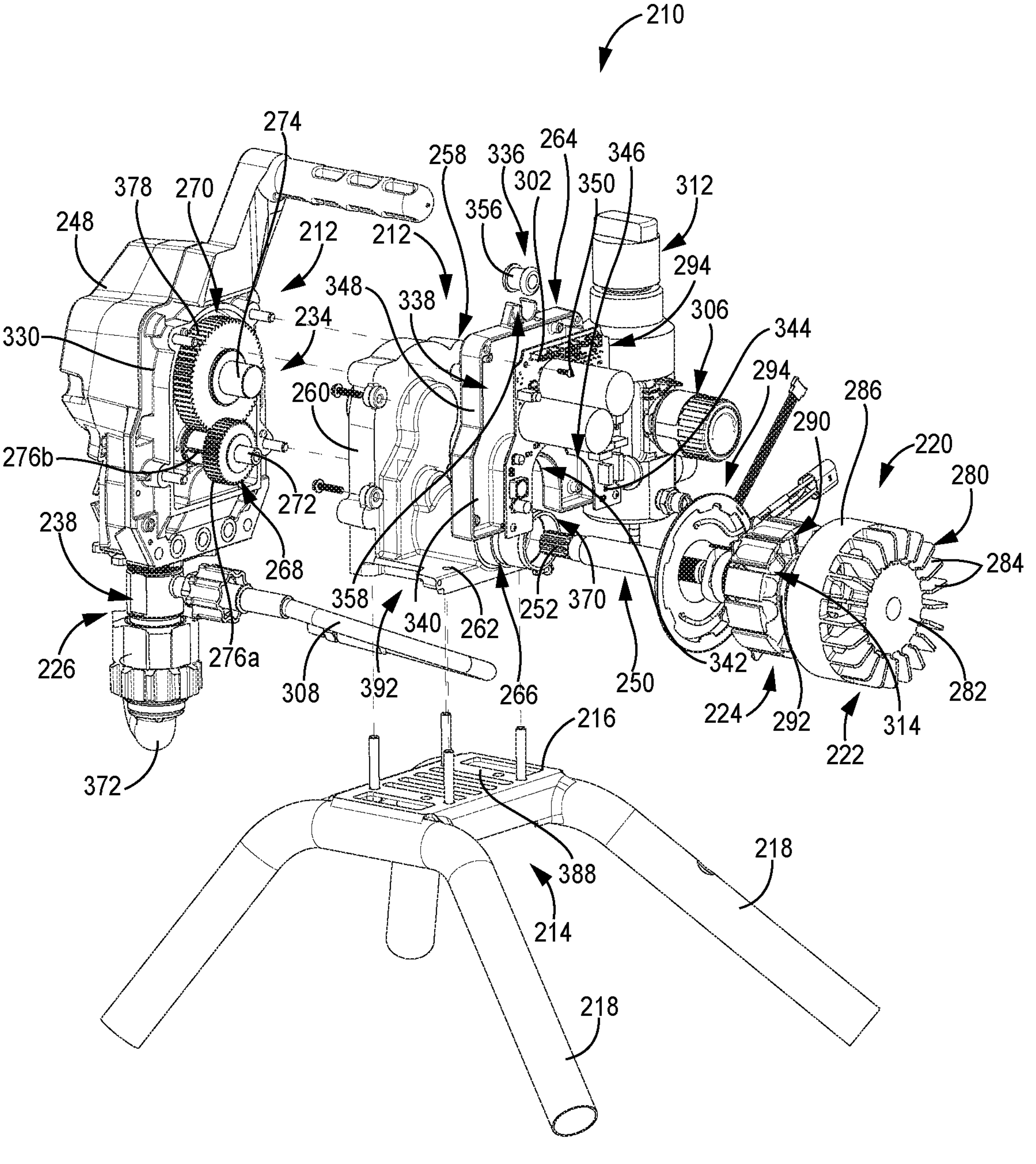
FIG. 13 is an isometric partially exploded view of the pumping assembly.
Figure 14:
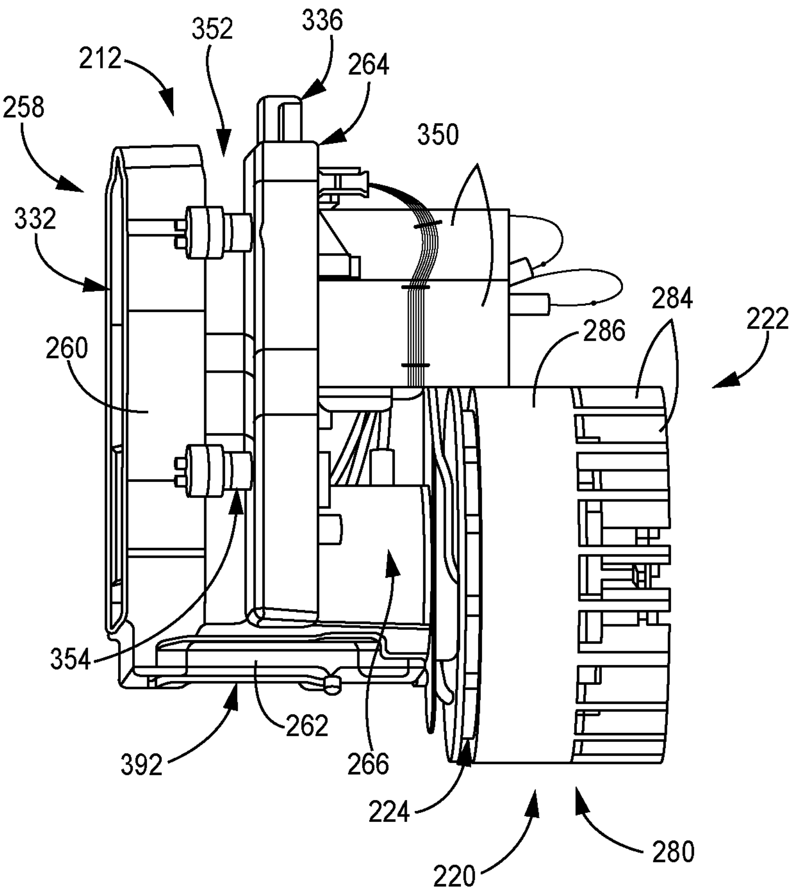
FIG. 14 is an isometric view showing a portion of the pumping assembly.
Figure 15:
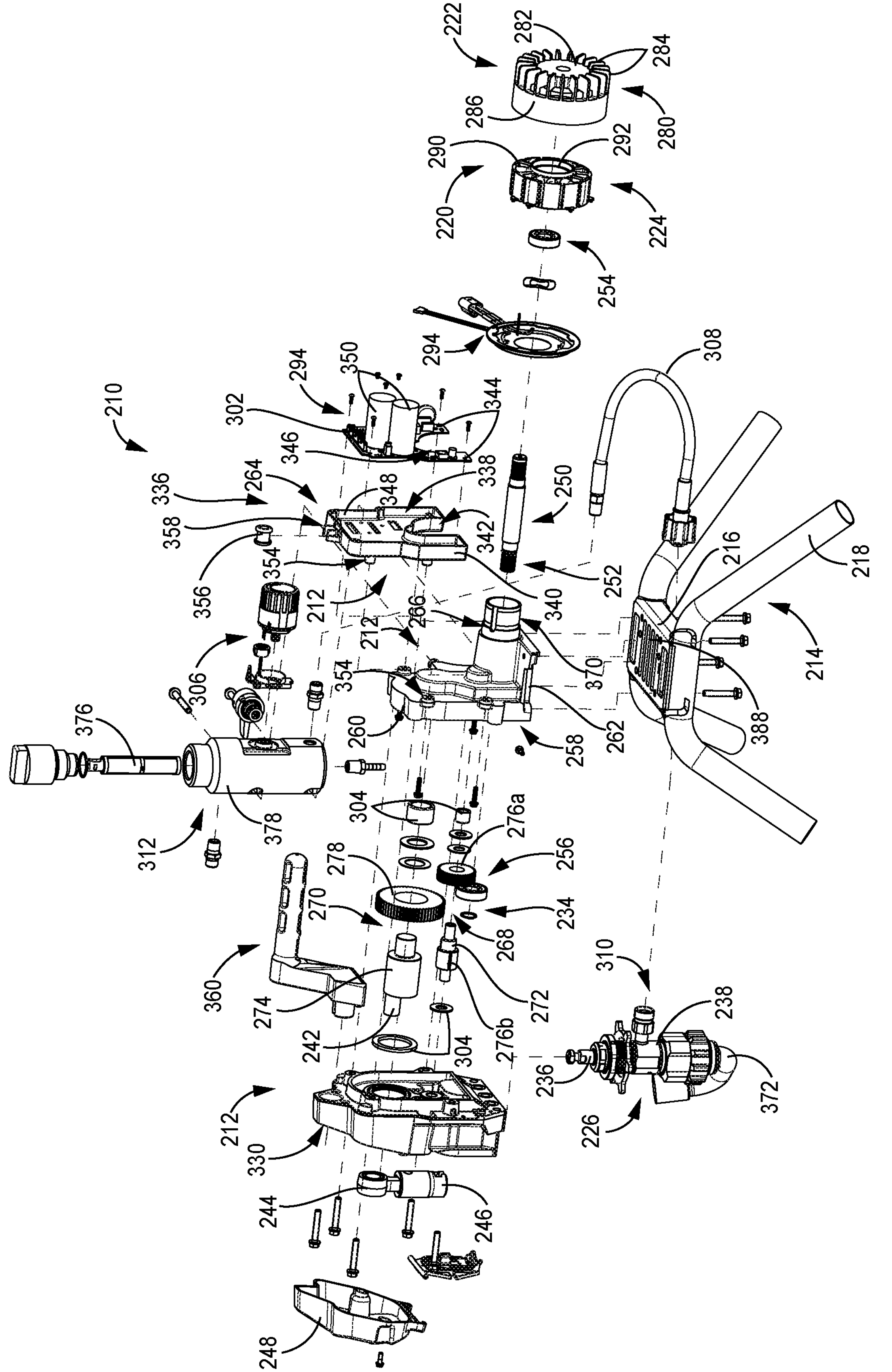
FIG. 15 is a first exploded view of the pumping assembly.
Figure 16:
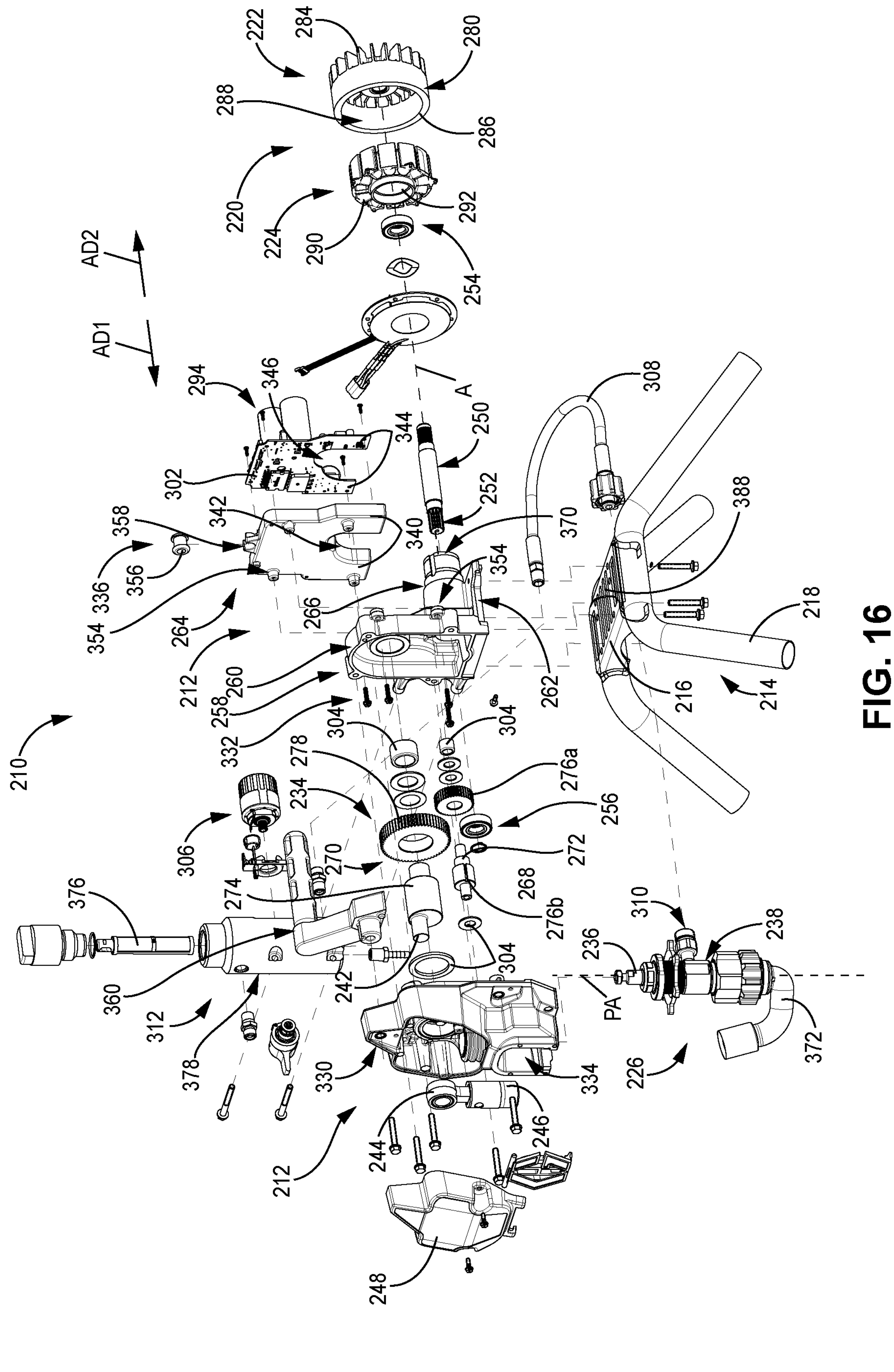
FIG. 16 is a second exploded view of the pumping assembly.

FIG. 11 is an isometric view of pumping assembly 210. FIG. 12A is an isometric view of pumping assembly 210. FIG. 12B is an isometric view of pumping assembly 210 from a rear end of pumping assembly 210 with assembly cover 318 removed. FIG. 13 is an isometric partially exploded view of pumping assembly 210. FIG. 14 is an isometric view showing a portion of a pumping assembly 210. FIG. 15 is a first exploded view of pumping assembly 210. FIG. 16 is a second exploded view of pumping assembly 210. FIGS. 11-16 are discussed together. Pumping assembly 210 shown in FIGS. 11-16 is substantially similar to pumping assembly 10 (FIGS. 1-6) and pumping assembly

10' (FIGS. 7-9). Similar or same components are labeled with the same reference number except increased by "200" (e.g., pumping assembly 210 and pumping assembly 10).

Pumping assembly 210 can be utilized in a spray system, among other pumping systems. With pumping assembly 210 disposed in fluid sprayer 201, pumping assembly 210 is configured to pump a spray fluid (e.g., a coating such as paint, lacquer, stain, etc.) under pressure to a spray gun 230 for spraying. The fluid can be emitted as the spray by actuation of a trigger 233 of the spray gun 230, causing opening of the valve 231. The spray fluid can be atomized by the spray tip 232.

Pumping assembly 210 includes assembly body 316 that supports and/or encloses various other components of pumping assembly 210. Assembly body 316 includes assembly cover 318 and mount body 212. Assembly cover 318 is formed as a shroud in the example shown. Pumping assembly 210 includes stand 214 that is configured to support the other portions of the pumping assembly 210 relative to a support surface (e.g., the ground). The stand 214 includes a base plate 216 on which the mount body 212 of the pumping assembly 210 can be mounted.

Pumping assembly 210 includes an assembly body 316 mounted to a stand 214 in the example shown. The assembly body 316 includes a front end 320, a rear end 322, lateral sides 324*a*, 324*b*, top side 326, and bottom side 328. The front end 320 and the rear end 322 form longitudinal ends of the pumping assembly 210.

Mount body 212 is configured to support other components of pumping assembly 210. Assembly cover 318 at least partially encloses various components of the pumping assembly 210. Assembly cover 318 is connected to mount body 212. In the example shown, the electric motor 220 is at least partially enclosed by the assembly cover 318. The assembly cover 318 can also be referred to as a sprayer shroud.

In the example shown, the mount body 212 is formed by drive housing 330, frame 258, and plate 264. Frame 258 can support other components of pumping assembly 210. In the example shown, the frame 258 includes upright portion 260 that extends vertically and includes base portion 262 that extends horizontally. The base portion 262 is connected to the baseplate 264 of the stand 214, such as by fasteners (e.g., bolts among other options). The frame 258 connects the other components of the pumping assembly 210 to the stand 214 in this example.

The upright portion 260 can handle a majority (or all or essentially all) of reactionary load forces generated from the drive 234 and the pump 226 during operation. The upright portion 260 transmits these loads through the base portion 262. The base portion 262 can be mounted on stand 214, and all or essentially all of the reactionary load forces generated from the drive 234 and the pump 226 are transmitted through the stand 214 to the support surface (e.g., the ground).

Drive housing 330 is a separate piece from the frame 258 in the example shown. Drive housing 330 can be connected to the frame 258 with a plurality of fasteners (e.g., bolts among other options). The drive 234 can be partially or entirely contained within the drive housing 330. The drive housing 330 can be a plate with an internal cavity which contains some or all of the drive 234. The drive housing 330 can capture the components of the drive 234 between, and within, itself from the front, and the upright portion 260 of the frame 258 from the back. The geartrain of the drive 234 can be supported by the drive housing 330 and the frame 258. The geartrain can be disposed within gear chamber 332 that is formed by and between the drive housing 330 and the frame 258.

In the example shown, the drive 234 includes lower gear assembly 268 and upper gear assembly 270, though it is understood that not all examples are so limited. Lower gear assembly 268 includes lower gears 276*a*, 276*b*. Upper gear assembly 270 includes upper gear 278. Upper gear assembly 270 further includes eccentric 242 in this example. Eccentric 242 can be formed integrally with one or more other portions of upper gear assembly 270, such as be formed by a projection of the upper gear shaft 274.

The lower gear assembly 268 and the upper gear assembly 270 are supported by the mount body 212. In the example shown, the upper gear assembly 270 and the lower gear assembly 268 are at least partially disposed between the drive housing 330 and the frame 258. The upper gear assembly 270 and the lower gear assembly 268 are disposed within a gear chamber 332 that is formed by the drive housing 330 and the upright portion 260 of the frame 258.

Lower gear assembly 268 includes lower gear shaft 272. Lower gear shaft 272 is supported by gear bearings 304. A first one of the gear bearings 304 can be supported by drive housing 330 and a second one of the gear bearings 304 can be supported by the frame 258. The lower gears 276*a*, 276*b* can be formed separately from the lower gear shaft 272 and mounted to the lower gear shaft 272 or can be formed integrally with the lower gear shaft 272. In the example shown, the lower gears 276*a*, 276*b* are disposed coaxially such that the lower gears 276*a*, 276*b* rotate 1:1 with each other.

Upper gear assembly 270 includes upper gear shaft 274. Upper gear shaft 274 is supported by gear bearings 304. A first one of the gear bearings 304 can be supported by drive housing 330 and a second one of the gear bearings 304 can be supported by the frame 258. The upper gear shaft 274 can extend fully axially through the one of gear bearings 304 supported by drive housing 330. In the example shown, the eccentric 242 is formed at an end of the upper gear shaft 274 that is disposed outside of the gear chamber 332. The upper gear assembly 270 thus extends from within the gear chamber 332 to outside of the gear chamber 332 in this example.

Drive 234 includes a first gear stage and a second gear stage in the example shown. The first gear stage is formed between drive shaft 250 and lower gear assembly 268. Specifically, the first gear stage is formed between pinion 252 of drive shaft 250 and lower gear 276*a*. The second gear stage is formed between lower gear assembly 268 and upper gear assembly 270. Specifically, the second gear stage is formed between lower gear 276*b* and upper gear 278. While drive 234 is shown as including two gear stages, it is understood that not all examples are so limited.

Drive 234 includes eccentric 242 and a crank arm 244 to convert rotational motion into linear reciprocating motion to operate the pump 226. A coupling 246 can connect the crank arm 244 to the fluid displacer of the pump 226. For example, the coupling 246 can connect to a rod of the piston 236. The crank arm 244 is connected to the eccentric 242 and extends between the eccentric 242 and the coupling 246.

The coupling 246 can extend into mounting cavity 334 of drive housing 330 through an upper opening of the mounting cavity 334 to connect to piston 236. The drive 234 can be partially covered by front cover 248, which can be a polymer case, among other options. While a crank mechanism is shown, other mechanisms for converting rotational motion to linear reciprocating motion are possible, such as scotch yoke, wobble, cam and follower, and rack and pinion, amongst other options.

Front cover 248 attaches to the drive housing 330, such as with a plurality of fasteners (e.g., bolts among other options). The drive housing 330 can be a single contiguous piece of metal. The drive housing 330 can include one or more annular bores which can receive parts of gears (e.g., the core parts of the lower gear assembly 268 and upper gear assembly 270 on which the toothed discs are mounted), parts of the bearings supporting the gears, and part of the eccentric 242.

The pump 226 is mounted to and supported by mount body 212. Pump 226 is mounted to and supported by drive housing 330 in this example. The pump 226 can be clamped to the drive housing 330 among other options. The pump 226 is configured to receive linear reciprocating motion from drive 234 that causes pumping by pump 226. For example, the drive 234 can connect with a piston of the pump 226 to drive reciprocation of the piston and thus cause pumping by the pump 226. Pump 226 can include one or more check valves 240 that regulate fluid flow through pump 226. In the example shown, pump 226 includes a first check valve 240 at an inlet of the pump 226 and a second check valve 240 carried by the piston 236. Pump 226 can be configured as a double displacement pump that outputs fluid during both a first stroke of the piston 236 (e.g., upward along pump axis PA) and a second stroke of the piston 236 (e.g., downward along the pump axis PA).

Pump 226 is at least partially disposed in mounting cavity 334 of the mount body 212. The mounting cavity 334 is formed in drive housing 330 in the example shown, though it is understood that not all examples are so limited. The pump 226 can be statically connected to the drive housing 330 to be supported by the mount body 212 and can be dynamically connected to the drive 234 to receive the reciprocating input from the drive 234. Pump body 238 of the pump, which can be formed as a cylinder, can be disposed at least partially within the mounting cavity 334. The pump body 238 can hang vertically downward out of the mounting cavity 334 through a lower opening of the mounting cavity 334. The drive 234 can extend into the mounting cavity 334 through the upper opening of the mounting cavity 334 to connect to the piston 236 of the pump 226 to provide reciprocating driving motion to the pump 226.

In some examples, the pump 226 can be mounted to or dismounted from other components of the pumping assembly 210 by the pump 226 shifting radially relative to a pump axis PA of the pump 226, the pump axis PA being a reciprocation axis of the fluid displacer (e.g., piston 236) of the pump 226. The pump 226 can be configured to slide through a side opening of the mounting cavity 334 during mounting and dismounting of the pump 226. In the example shown, the side opening is disposed at the front end 320 of the pumping assembly 210 and is open in the forward direction.

Plate 264 is disposed on an opposite side of the frame 258 from the drive housing 330 in this example. Plate 264 is disposed on a rearward side of the upright portion 260 of the frame 258 in this example. The plate 264 is formed separately from the frame 258 and connected to the frame 258. In the example shown, the plate 264 is connected to the upright portion 260 of the frame 258 and is not directly connected to the base portion 262 of the frame 258. In some examples, the plate 264 does not directly contact the base portion 262 of the frame 258. In some examples, a lowest end of the plate 264 is spaced vertically above the base portion 262, though it is understood that not all examples are so limited.

The plate 264 straddles the tube 266 and is fixed to the upright portion 260. This allows the plate 264 to be removed together with the motor control 294. The plate 264 on which the motor control 294 is mounted is itself mounted to the frame 258. Motor control 294 is configured to regulate one or more power signals to the electric motor 220. For example, the control board 302 can be configured to generate or make a logic decision that instructs the electric motor 220 to run or not run, to run at certain speed or acceleration, etc.

Motor control 294 includes circuitry for managing operation of the electric motor 220. The motor control 294 can include circuitry for delivering modulated electrical power to the coils 290 of the stator 224. The motor control 294 can also include one or more sensors which measure one or more parameters of the rotor 222, such one or more parameters being used to manage operation of the electric motor 220. For example, motor control 294 can include one or more sensors, such as hall sensors or encoders, which senses rotation of the rotor 222 to understand the positional orientation and/or rotational count of the rotor 222, and in response, manage the delivery of electrical energy to the coil 290 of the stator 224. Motor control 294 can include portions mounted to plate 264 and portions not mounted to plate 264.

As shown, the motor control 294 can directly face the rotor 222. The motor control 294 is mounted to the plate 264 to be supported by the plate 264. The motor control 294 includes a control board 302 that is mounted to the plate 264. The control board 302 is formed as one or more circuit boards. The control board 302 can be formed as a single circuit board. The motor control 294 can comprise multiple electrical components, such as resistors, capacitors, and chips, mounted on a circuit board (such as a single circuit board).

In the example shown, plate 264 includes a holder 336 which can hold one or more wires 355 that extend along the sides of the plate 264, up and over the plate 264 and then down the backside of the plate 264 to connect with the motor control 294. The wires 355 can connect with a power source (e.g., electrical plug or battery), transducer (e.g., pressure transducer), and/or a user input (e.g., to provide a control parameter (e.g., pressure, flow, etc.) to the motor control 294, among other options.

The motor control 294 includes one or more circuit boards which mount to the plate 264. The control board 302 of the motor control 294 is received partially within plate recess 338 of the plate 264. In the example shown, both of the plate 264 and the motor control 294 have a lower end that forms a horseshoe-shaped which facilitates straddling of the tube 266. The control board 302 can include a horseshoe-shaped lower end that can straddle the tube 266.

The example of plate 264 shown extends at least partially around the tube 266. The plate 264 straddles the tube 266 such that a portion of the plate 264 is disposed vertically above the tube 266 and at least one other portion of the plate 264 is disposed on a lateral side of the tube 266. In the example shown, the plate 264 is disposed such that portions of the plate 264 are disposed on both lateral sides of the tube 266. The plate 264 can straddle the tube 266 such that at least a portion of the tube 266 is disposed directly laterally between portions of the plate 264.

In the example shown, plate 264 includes plate legs 340 that are disposed at least partially around the tube 266. Plate notch 342 is formed between the plate legs 340. A first one of plate legs 340 is disposed on a first lateral side of the tube 266 and a second one of plate legs 340 is disposed on a second lateral side of the tube 266. The plate 264 can extend to cover portions of the tube 266 such that the plate 264 extends downward to be disposed directly laterally outward of the drive shaft 250. The plate 264 can, in some examples, wrap at least 180-degrees over the tube 266. The plate 264 can, in some examples, wrap a majority of the way around the tube 266. The plate 264 can, in some examples, radially overlap with a majority of the circumference of the tube 266. In some examples, a horizontal plane extending along the rotor axis A can extend through the drive shaft 250, the tube 266, and the plate 264. Such a plane can extend through both plate legs 340 of the plate 264.

The plate 264 straddles tube 266 that supports stator 224 in this example. Each plate leg 340 extends downward on opposite lateral sides of the tube 266. The tube 266 is disposed directly between the two plate legs 340. The tube 266 is at least partially disposed in the plate notch 342 between the two plate legs 340.

Motor control 294 is mounted to plate 264. Control board 302 is mounted to plate 264 and other components of motor control 294 can be connected to control board 302 and can extend from control board 302. Control board 302 can extend at least partially around the tube 266. Control board 302 can be disposed such that control board 302 at least partially wraps around the tube 266. The control board 302 can extend vertically above the tube 266 and can be disposed on one or both lateral sides of the tube 266.

Control board 302 includes board legs 344 that extend vertically downwards on either lateral side of the tube 266. The tube 266 is disposed directly between the two board legs 344. The tube 266 is at least partially disposed in a board notch 346 formed between the board legs 344 of the control board 302. Both the plate 264 and the control board 302 straddle the tube 266. Both the plate 264 and the control board 302 can be considered to straddle the drive shaft 250 as the drive shaft 250 extends through the tube 266 to connect with the drive 234.

Motor control 294 is mounted to plate 264. In the example shown, the motor control 294 is mounted on a side of plate 264 facing in the rearward axial direction AD2 and away from drive 234. The motor control 294 faces rearward away from the pump 226. Motor control 294 is mounted within plate recess 338 of plate 264. The motor control 294 is mounted within the plate recess 338 such that the plate walls 348 that define the plate recess 338 can cover and protect the edges of the control board 302. The control board 302 can be mounted such that the control board 302 does not project outward beyond the plate walls 348. It is understood, however, that various components of the motor control 294 can project rearward beyond the plate 264, such as capacitors 350 among others.

Motor control 294 is disposed vertically above the electric motor 220 and extends laterally outward beyond the electric motor 220. The motor control 294 is mounted to plate 264 such that a portion of the motor control 294 is disposed to axially overlap with the electric motor 220. The portion of the motor control 294 can axially overlap with the rotor 222. The portion of the control board 302 can axially overlap with the stator 224.

The motor control 294 is disposed axially between the electric motor 220 and the drive 234. The motor control 294 is disposed axially between the electric motor 220 and the pump 226. The motor control 294 is disposed forward of the electric motor 220 and rearward of the pump 226. The positioning of the motor control 294 within the pumping assembly 210 can provide for shorter wire lengths and a more compact configuration of pumping assembly 210. Such a configuration can reduce both size and weight and provide for less cost in manufacturing.

In the example shown, control board 302 is disposed axially between the electric motor 220 and the drive 234. The control board 302 is disposed axially between the electric motor 220 and the pump 226. The control board 302 is disposed forward of the electric motor 220 and rearward of the pump 226. The positioning of the control board 302 within the pumping assembly 210 can provide for shorter wire lengths and a more compact configuration of pumping assembly 210. Such a configuration can reduce both size and weight and provide for less cost in manufacturing.

The plate 264 is connected to the frame 258 such that channel 352 is formed between plate 264 and frame 258. In the example shown, the channel 352 is formed between the upright portion 260 of the frame 258 and the plate 264. The channel 352 is disposed axially between a rearward facing side of the upright portion 260 and a forward facing side of the plate 264. The channel 352 is disposed axially between the upright portion 260 and the plate 264. Channel 352 facilitates flow of cooling air and better exposure of components to release heat into the air for cooling. Wires can also be run along the channel 352 to provide electrical connections between various components of pumping assembly 210.

In the example shown, the channel 352 is closed inwards towards the rotor axis A. The channel 352 can be closed radially inwards towards the rotor axis A. The channel 352 can route wiring between various components while preventing such wiring from hanging or drooping inwards towards moving components of pumping assembly 210. In the example shown, the base of the channel 352 is formed by the upright portion 260, though it is understood that not all examples are so limited.

Channel 352 can be defined axially by upright portion 260 and plate 264. In the example shown, a first channel wall of the channel is formed by the upright portion 260. The channel wall formed by the upright portion 260 is disposed on a forward side of the channel 352. The portion of the upright portion 260 defining the channel 352 can be disposed directly axially between the channel 352 and a gear of the drive 234. A second channel wall of the channel 352 can be formed by the plate 264. The channel wall formed by the plate 264 is disposed on a rearward side of the channel 352.

At least one standoff 354 is disposed between frame 258 and plate 264. Standoffs 354 can space the plate 264 from the frame 258 to form the channel 352 therebetween. The standoff 354 can at least partially span across the channel 352. The standoff 354 can be formed as a portion of the frame 258, as a portion of the plate 264, and/or separately from both the frame 258 and the plate 264. In the example shown, standoffs 354 extend from both the plate 264 and the upright portion 260. The standoffs 354 are formed as portions of the upright portion 260 of the frame 258 and as portions of the plate 264. The fasteners that connect the plate 264 to the frame 258 extend within the standoffs 354.

In some examples, the pumping assembly 210 includes a plurality of the standoffs 354 between upright portion 260 and plate 264. The plurality of standoffs 354 can include a first subset of standoffs 354 disposed on a first lateral side of the rotor axis A and a second subset of standoffs 354 disposed on a second lateral side of the rotor axis A. The number of standoffs 354 can vary between the subsets or can be the same. For example, a standoff count of the first subset of standoffs 354 can be greater than a standoff count of the second subset of standoffs 354. The standoffs 354 on opposite lateral sides of the rotor axis A are not disposed as mirror images in various examples. In the example shown, the standoffs 354 closer to lateral side 324*a* are spaced further vertically apart than the standoffs 354 closer to lateral side 324*b*.

The channel 352 can, in some examples, span over the rotor axis A. For example, the channel 352 can span over the rotor axis A such that a portion of the channel 352 is disposed on a first lateral side of the axis A and a second portion of the channel 352 is disposed on a second lateral side of the axis A. The channel 352 can be considered to wrap partially around the rotor axis A in various examples.

The channel 352 provides a passage for cooling air, providing improved cooling. For example, spacing the plate 264 from the upright portion 260 such that channel 352 is formed therebetween increases a surface area of the plate 264 exposed to the cooling air, on which the motor control 294 is mounted, providing for improved exposure to the cooling air and thus improved cooling.

The channel 352 can, in some examples, provide routing for one or more wires. In the example shown, various controls are disposed on lateral side 324*a* of the pumping assembly 210. For example, filter manifold 312 and pressure module 306 can be disposed on lateral side 324*a*. At least a portion of the channel 352 is disposed between the motor axis A and lateral side 324*a*. Wires from the control components can be routed within channel 352 to connect to motor control 294. For example, the wires can be routed within channel 352 and then over plate 264, such as through holder 336, to connect with motor control 294. For example, a wire connected to a transducer can be routed within channel 352 and over plate 264 to connect with motor control 294.

Holder 336 is configured to route wires to and/or from motor control 294. Holder 336 includes conduit 356 and receiver 358. Holder 336 is disposed on an upper side of plate 264. Conduit 356 is configured to mount to receiver 358 to be held by receiver 358. Receiver 358 is formed as a portion of plate 264. Wires can be routed through the conduit 356 between the channel 352 and motor control 294.

Assembly handle 360 is connected to mount body 212. Assembly handle 360 is configured to be grasped by a user for picking up and transporting pumping assembly 210. Assembly handle 360 includes handle base 362 that is mounted to mount body 212 and extension 364 that projects from handle base 362. In the example shown, the extension includes base arm 366 and grip arm 368. Base arm 366 extends from handle base 362. Base arm 366 projects laterally outward from handle base 362 in the example shown. Grip arm 368 is connected to base arm 366 and extends rearward from base arm 366. Grip arm 368 forms at least a portion of a hand grip configured to be grasped by the user. As discussed in more detail below, the assembly handle 360 can be configured such that the grip arm 368 is spaced laterally outward of the rotor axis A and such that the grip arm 368 does not cross-over the rotor axis A. The grip arm 368 can extend to overlap with a center of gravity of the pumping assembly 210.

Electric motor 220 is configured to generate a rotational output for powering pumping by the pump 226. Stator 224 is configured to generate electromagnetic flux that interacts with the magnetic flux of the magnets 288 of the rotor 222 in the air gap between the stator 224 and rotor 222 to cause rotation of the rotor 222. In the example shown, electric motor 220 is configured as an outer rotator in that the rotor 222 is disposed outside of and rotates around the stator 224. It is understood, however, that in various examples the electric motor 220 can be configured as an inner rotator in which the rotor 222 is disposed within the stator 224.

The stator 224 of the electric motor 220 is supported by mount body 212. A portion of the mount body 212 extends within the stator 224 to support the stator 224. In the example shown, a portion of the frame 258 extends within the stator 224. In the example shown, frame 258 includes tube 266 is formed by frame 258 and extends rearward from upright portion 260 of frame 258.

Stator 224 is mounted on the tube 266 to be supported by the tube 266. The stator 224 can be mounted on a cantilevered portion 370 of the tube 266. The stator 224 can extend fully annularly around the tube 266 with the stator 224 mounted on the tube 266.

The drive shaft 250 extends within and through the tube 266 while the stator 224 is located directly radially outward from the tube 266. As shown, the stator 224 can be mounted on the tube 266. The tube 266 can be cylindrical or a different shape. The part of the frame 258 (e.g., the tube 266) that extends into the stator 224 can project rearward from an upright portion 260 of the frame 258. The part of the frame 258 (e.g., the tube 266) that extends into the stator 224 can be cantilevered. As such, the stator 224 can be supported by a cantilevered portion 370 of the frame 258 of the pumping assembly 210.

In some examples, the tube 266 can extend fully axially through the stator 224 such that the tube 266 projects in both the forward axial direction AD1 and the rearward axial direction AD2 relative to the stator 224. In the example shown, the tube 266 extends partially axially through the stator 224. Coils 290 of the stator 224 can project axially beyond the tube 266, such as in rearward axial direction AD2.

The stator 224 can include a mandrel 292 that is mounted on the tube 266 and a plurality of electromagnetic coils 290 that are disposed around the tube 266. The electromagnetic coils 290 are mounted to the mandrel 292. In the example shown, the electromagnetic coils 290 are disposed on an outer radial side of the mandrel 292 while the tube 266 extends into the mandrel 292 on an inner radial side of the mandrel 292.

Tube 266 statically supports the electric motor 220. In the example shown, the tube 266 projects outward beyond the base portion 262 of the frame 258. The tube 266 can be at least partially formed by the base portion 262 in various examples. Tube 266 extends in the rearward axial direction AD2 beyond the base portion 262 in the example shown. In some examples, the tube 266 can form a rearward-most portion of the mount body 212. In the example shown, the cantilevered portion 370 of the tube 266 extends rearward from a portion of the tube 266 formed by the base portion 262.

Drive shaft 250 is connected to rotor 222 to be rotated by rotor 222. The drive shaft 250 is directly connected to the rotor 222 such that the drive shaft 250 rotates 1:1 with the rotor 222 in the example shown. Drive shaft 250 is connected to rotor 222 at a rear end of the electric motor 220. The drive shaft 250 extends forward from the connection with the rotor 222 to interface with drive 234 and provide a rotational input to drive 234.

The drive shaft 250 extends through the stator 224 between the d of the drive shaft 250 connected to rotor 222 and the output end of the drive shaft 250 interfacing with drive 234. The drive shaft 250 extends fully axially through the stator 224. The drive shaft 250 extends fully axially through the tube 266 that supports the stator 224. In the example shown, the drive shaft 250 extends fully axially through the frame 258 such that a first end of the drive shaft 250 is disposed outside of the frame 258 and spaced from the frame in the rearward axial direction AD2 and such that a second opposite end of the drive shaft 250 is disposed outside of the frame 258 and spaced from the frame 258 in the forward axial direction AD1.

Drive shaft 250 interfaces with drive 234 to provide a rotational input to drive 234. In the example shown, drive shaft 250 includes pinion 252 disposed at the output end of the drive shaft 250. The pinion 252 interfaces with lower gear assembly 268 to provide a rotational input to lower gear assembly 268.

In the example shown, the pinion 252 interfaces with lower gear **276*a* to provide a rotational input to drive 234 at lower gear 276*a*. Lower gear assembly 268 interfaces with upper gear assembly 270 to provide rotational motion to upper gear assembly 270. In the example shown, lower gear 276*b* interfaces with upper gear 278 such that rotation of lower gear 276*b* drives rotation of upper gear 278. Eccentric 242 is connected to upper gear 278 to be rotated by the upper gear 278. The eccentric 242 and crank arm 244 convert the rotational motion provided by electric motor 220 to linear reciprocating motion provided to pump 226 to cause pumping by pump 226**.

Stand 214 includes base plate 216. The base plate 216 can be a platform onto which the mount body 212 is directly or indirectly mounted. In the example shown, the frame 258 is configured to mount to the base plate 216. The base plate 216 bridges between the tubes that form the stand legs 218 of the stand 214. In the example shown, the base plate 216 bridges between the two tubes forming the four stand legs 218 of the stand 214. The base plate 216 can be welded to the two tubes, among other options.

A plurality of fasteners (e.g., bolts among other options) can extend partially or fully through the base plate 216 to connect the frame 258 to the base plate 216. The base plate 216 may be the only part of the stand 214 that supports the rest of the assembly body 316 of the pumping assembly 210. The base plate 216 may be the only part of the stand 214 on which the mount body 212 is mounted. The base plate 216 may be the only part of the stand 214 that supports the rest of the assembly body 316 of the pumping assembly 210.

In the example shown, a suction tube 372 is attached to the inlet 374 of the pump 226. Suction tube 372 facilitates the intake of paint from a reservoir into the pump 226. Such reservoir can be a bucket of paint. A flexible hose can be integrated into the suction tube 372. Output hose 308 extends from an outlet 310 of the pump 226. In the example shown, the output hose 308 extends between pump 226 and filter manifold 312. The output hose 308 provides pressurized fluid output from pump 226 to filter manifold 312.

Filter manifold 312 is connected to mount body 212 to be supported by mount body 212. Filter manifold 312 is disposed on lateral side **324*a* of the pumping assembly 210. Filter 376 and manifold body 378 of filter manifold 312 are shown. Filter 376 can be configured as a screen to filter out particulate from the spray fluid. The assembly handle 360 projects laterally from the handle base 362 towards the lateral side 324*a* of the pumping assembly 210 on which the filter manifold 312** is disposed, although it is understood that other configurations are possible.

Pressure module 306 is disposed on lateral side **324*a* of the pumping assembly 210. Pressure module 306 can control a pressure of the fluid output from pump 226 to the supply hose 228 that extends to the spray gun 30. The pressure module 306 can be formed as a user input in which the user can manipulate the pressure module 306 to adjust the output pressure. In the example shown, the pressure module 306 includes a knob or dial that can be rotated by the user to adjust the output pressure, though it is understood that other configurations are possible. In the example shown, the pressure module 306 is mounted on the filter manifold, though it is understood that not all examples are so limited. For example, the pressure module 306 can be mounted on lateral side 324*a* separate from filter manifold 312**.

Figure 17:
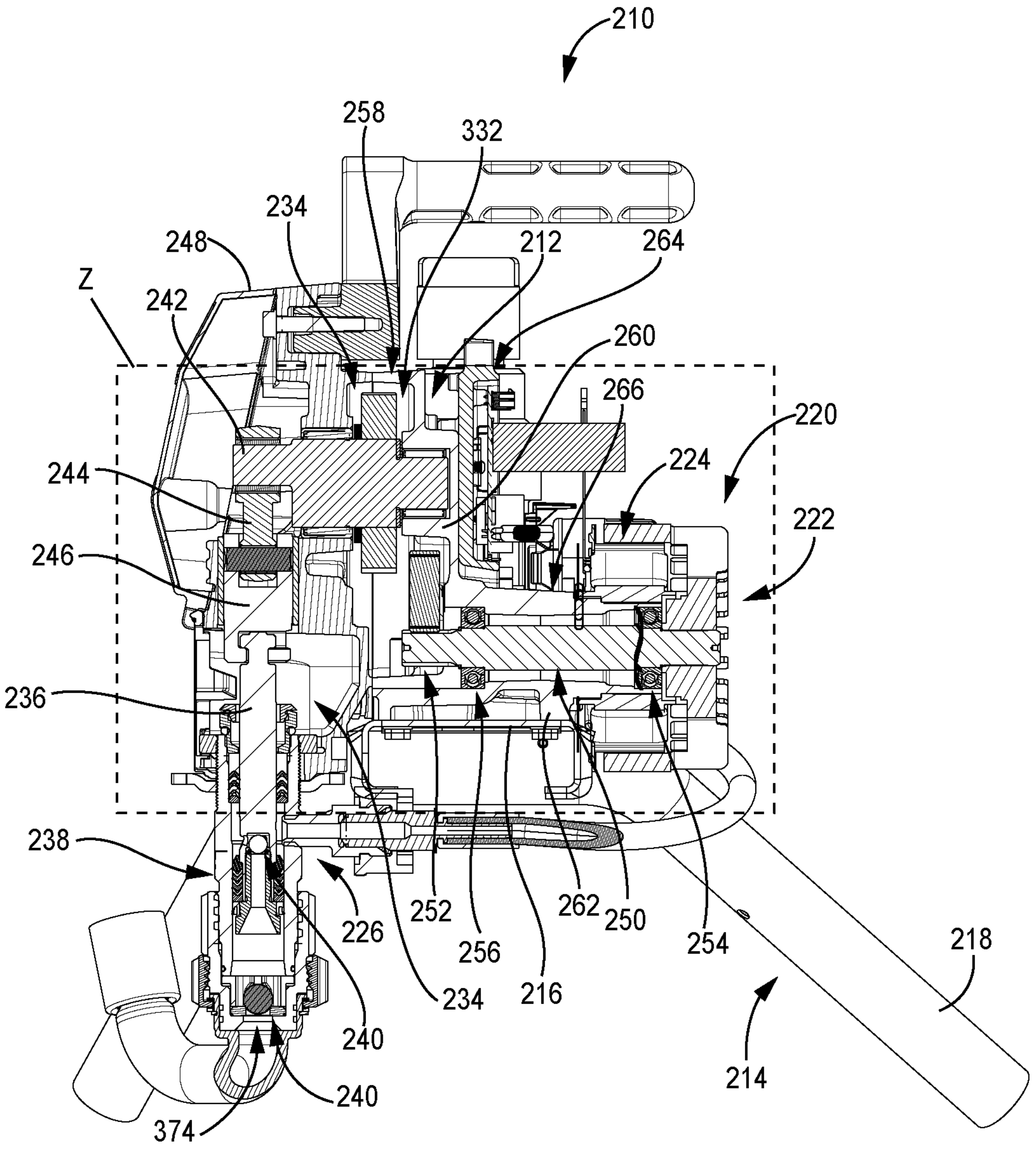
FIG. 17 is a cross-sectional view of the pumping assembly taken along line 17-17 in FIG. 12A.
Figure 18:
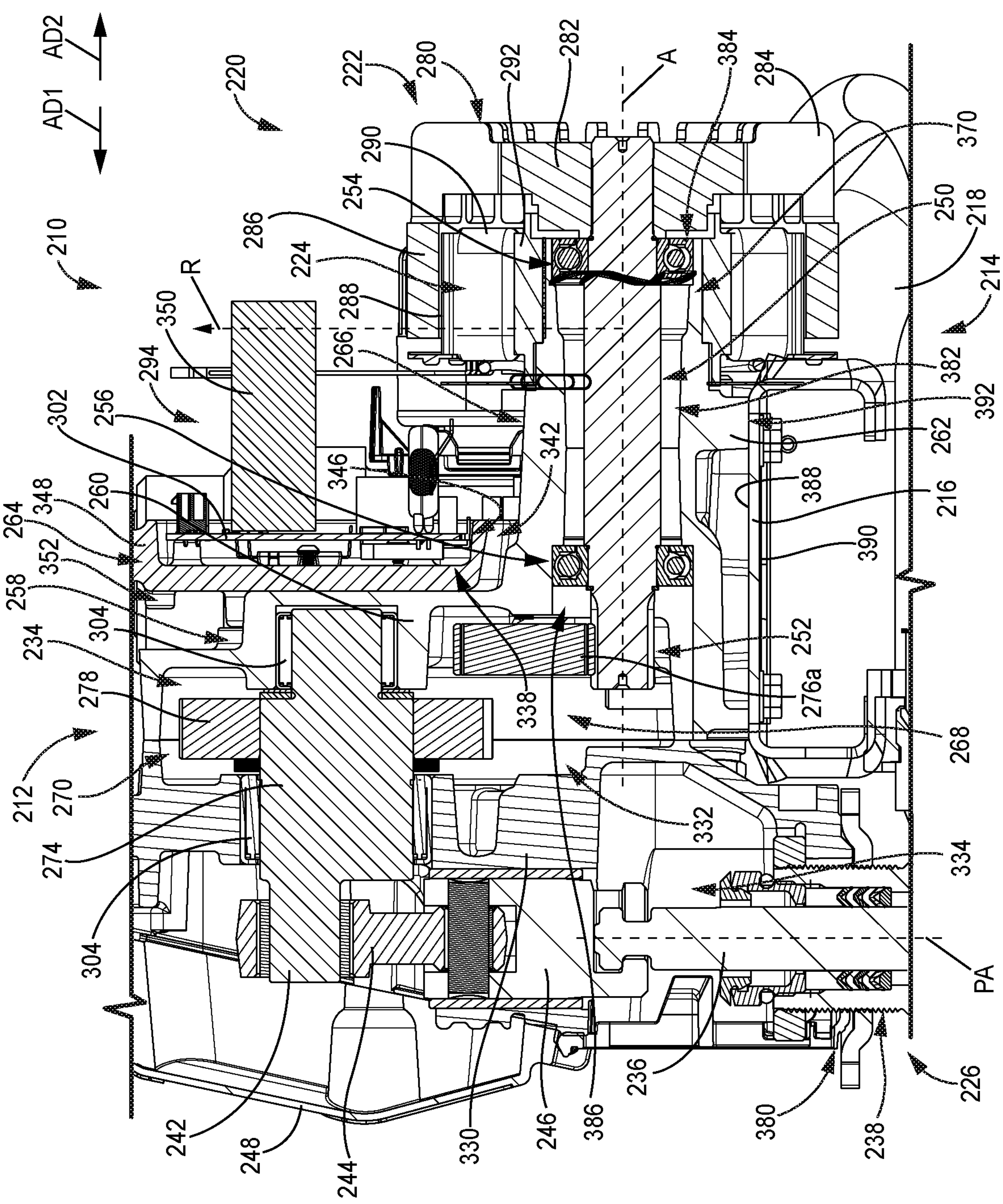
FIG. 18 is an enlarged view of detail Z in FIG. 17.
Figure 19:
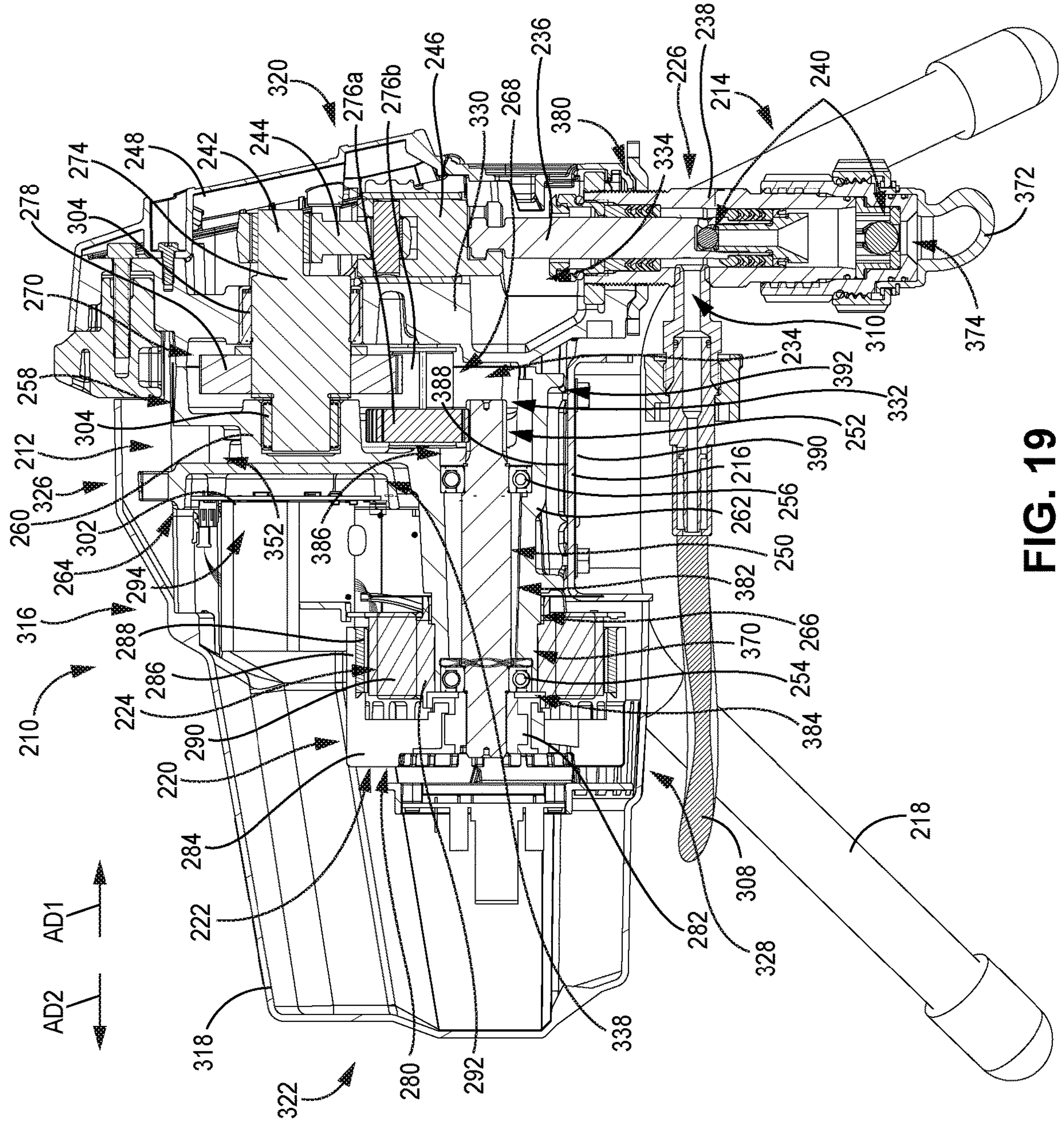
FIG. 19 is a cross-sectional view of the pumping assembly taken along line 19-19 in FIG. 12A.

FIG. 17 is a cross-sectional view of pumping assembly 210 taken along line 17-17 in FIG. 12A. FIG. 18 is an enlarged view of detail Z in FIG. 17. FIG. 19 is a cross-sectional view of pumping assembly 210 taken along line 19-19 in FIG. 12A. FIGS. 17-19 are discussed together with continued reference to FIGS. 11A-16.

Mount body 212 of pumping assembly 210 supports other components of the pumping assembly 210. Assembly cover 318 at least partially encloses various components of the pumping assembly 210 is shown in FIG. 19 but not shown in FIGS. 17 and 18 to better illustrate the components of pumping assembly 210. Mount body 212 is disposed on stand 214 and supported by the stand 214. The mount body 212 structurally supports the moving components of pumping assembly 210, such as rotor 222 of electric motor 220, gears of drive 234, and the fluid displacer (e.g., piston 236) pump 226. The mount body 212 can structurally support stationary components of pumping assembly 210, such as stator 224 and pump body 238.

In the example shown, the mount body 212 is formed from multiple component parts that are fixed together. In this example, the mount body 212 includes drive housing 330, frame 258, and plate 264. Frame 258 supports other components of mount body 212 and is connected to stand 214 to connect the mount body 212 to the stand 214. While mount body 212 is shown as including a separate drive housing 330, frame 258, and plate 264, it is understood that not all examples are so limited.

Drive housing 330 is disposed at a forward end of the mount body 212. Drive housing 330 is disposed at front end 320 of pumping assembly 210. Pump 226 can be mounted to drive housing 330 to connect pump to drive housing 330. Pump 226 is disposed at front end 320 of pumping assembly 210. Pump 226 is statically connected to drive housing 330 to structurally support the pump 226 on the mount body 212. The pump 226 is dynamically connected to the drive 234 to receive the reciprocating linear motion that causes pumping by pump 226.

In the example shown, pump body 238 is mounted to drive housing 330 to statically connect pump 226 to mount body 212. Pump 226 can be connected to drive housing 330 via clamp 380, among other options. The pump 226 can be at least partially disposed within mounting cavity 334 of the drive housing 330 with the pump 226 mounted to drive housing 330. The mounting cavity 334 can be open vertically such that the pump body 238 can hang down through a lower vertical opening to outside of the mounting cavity 334. The mounting cavity 334 can also be open radially relative to a reciprocation axis PA of the piston 236. Such a configuration can facilitate side shifting of the pump 226 during mounting and dismounting. As shown, the piston 236 includes a head that can be slid into and out of a cavity in the coupling 246 to form or break the dynamic connection between the pump 226 and drive 234.

Drive housing 330 is connected to frame 258 such that drive housing 330 is supported by frame 258. The drive housing 330 can be connected to the frame 258 in any desired manner suitable for fixing the drive housing 330 and frame 258 together, such as by fasteners (e.g., bolts) among other options. In the example shown, the drive housing 330 is connected to and supported by upright portion 260 of the frame 258.

At least a portion of drive 234 is captured between drive housing 330 and frame 258. A gear chamber 332 is disposed between the drive housing 330 and the frame 258. The toothed gears of the drive 234 (e.g., lower gears 276*a*, 276*b* and upper gear 278) are disposed within the gear chamber 332. One or more, up to all, of the gears of the drive 234 can be supported by the frame 258 and the drive housing 330.

Lower gear assembly 268 interfaces with pinion 252 of drive shaft 250 to receive a rotational output from drive shaft 250. In the example shown, the lower gear 276*a* interfaces with the pinion 252 to receive a rotational output from the pinion 252. Lower gear assembly 268 can be supported by gear bearings 304, one of which can be disposed in the upright portion 260 and another of which can be disposed in the drive housing 330. Lower gear 276*b* is disposed coaxially with lower gear 276*a* in the example shown. Rotation of lower gear 276*a* causes rotation of lower gear 276*b*. While lower gear assembly 268 is shown as including multiple individual gears, it is understood that not all examples are so limited.

Upper gear assembly 270 receives rotational output from lower gear assembly 268. Upper gear assembly 270 is supported by gear bearings 304. In the example shown, a first gear bearing 304 is disposed in the upright portion 260 and a second gear bearing 304 is disposed in the drive housing 330. The upper gear shaft 274 on which the upper gear 278 is mounted extends fully axially through the drive housing 330 such that the upper gear shaft 274 projects both forward and rearward of the drive housing 330.

Eccentric is disposed on an opposite side of the drive housing 330 from the gear chamber 332. The eccentric 242 can be formed on the upper gear shaft 274 that is directly connected to the upper gear 278. In the example shown, the eccentric 242 is connected to the upper gear 278 such that the eccentric rotates 1:1 with the upper gear 278.

Plate 264 is disposed on an opposite side of frame 258 from drive housing 330. Plate 264 can be fixed to frame 258, such as by fasteners (e.g., bolts) among other options. Plate 264 is connected to upright portion 260 of frame 258 in the example shown. As discussed above, the control board 302 is mounted to plate 264. The control board 302 is disposed on a rearward facing side of the plate 264. The control board 302 is exposed in the rearward direction AD2. The control board 302 is disposed on an opposite side of the upright portion 260 from the gear chamber 332. At least a portion of the control board 302 is disposed vertically above the electric motor 220. In the example shown, another portion of the control board 302 is disposed to axially overlap with the electric motor 220 relative to the axis A, which is the axis of rotation of the rotor 222.

In various examples, the control board 302 axially overlaps with the rotor 222. The control board 302 can axially overlap with one or more magnets 288 of the rotor 222. The control board 302 can axially overlap with a portion of the rotor 222 that radially overlaps with the stator 224. The control board 302 can axially overlap with blades 284 of the rotor body 280. In additional or alternative examples, the control board 302 axially overlaps with the stator 224. The control board 302 can axially overlap with one or more electromagnetic coils 290 of the stator 224.

Electric motor 220 is configured to generate a rotational output that powers pumping by pump 226. Stator 224 is mounted on the exterior side of the tube 266 of the mount body 212. In this example, the tube 266 is formed as a portion of the frame 258, though it is understood that not all examples are so limited. The stator 224 includes a plurality of coils 290 that generate electromagnetic flux in response to electric current being run through the coils 290.

The stator 224 is mounted on the tube 266 to be supported by the tube 266. The stator 224 can be considered to be mounted on a cantilevered portion of the mount body 212. The stator 224 can be considered to be mounted on a cantilevered portion of the frame 258. In the example shown, the stator 224 is disposed on cantilevered portion 370 of the tube 266.

The tube 266 projects into the stator 224 to interface with the stator 224 on a radially inner side of the stator 224. The stator 224 can extend fully annularly around the tube 266. In some examples, the tube 266 can project fully axially through the stator 224. In various other examples, the tube 266 does not extend fully axially through the stator 224. In the example shown, cantilevered portion 370 of the tube terminates radially within the stator 224.

In some examples, a portion of a coil 290 of the stator 224 radially overlaps with the tube while another portion of that coil 290 does not radially overlap with the tube 266. The coils 290 of the stator 224 can thus project axially beyond the distal end of the tube 266. In some examples, the stator 224 can be configured such that multiple, up to all, of the coils 290 of the stator 224 include a portion radially overlapping the tube 266 and include another portion that does not radially overlap with the tube 266. The portions of the coils 290 that do not radially overlap with the tube 266 can be spaced in the rearward axial direction AD2 from the distal end of the tube 266.

The stator 224 is disposed radially within the rotor 222 in the example shown such that electric motor 220 is an outer rotator. Rotor 222 extends radially outward beyond the stator 224 and projects to radially overlap with the stator 224. Stator 224 includes coil gaps 314 disposed circumferentially between adjacent coils 290 of the stator 224. Air can flow through the coil gaps 314 and through stator 224 to provide cooling to the stator 224. In the example shown, the coils 290 of the stator 224 extend axially beyond the rotor 222 in the forward axial direction AD1. The coils 290 project axially beyond the magnets 288 of the rotor 222. As such, the coils 290 are partially radially overlapped by the magnets 288 and partially not radially overlapped by the magnets 288, though it is understood that not all examples are so limited.

End turns of the coils 290, which is the location where the material forming the coil (e.g., wire, ribbon strand, etc., typically of copper) turns to loop back in another direction, are disposed axially closer to the control board 302 than the magnets 288 of the rotor 222 are to the control board 302. The end turns of the coils 290 are disposed axially closer to the drive 234 than the rotor 222 is to the drive 234. The end turns of the coils 290 are disposed axially closer to the pump 226 than the rotor 222 is to the pump 226. Having the end turns of the coils 290 extend further in axial direction AD1 than portions of the rotor 222 can provide for a more compact configuration for pumping assembly 210.

In the example shown, the stator 224 extends closer to front end 320 of the pumping assembly 210 than the rotor 222. The rotor 222 extends closer to rear end 322 of the pumping assembly 210 than the stator 224. The coils 290 of the stator 224 are disposed such that a portion of each coil 290 is not radially overlapped by the rotor 222. The portion of the coil 290 not radially overlapped by the rotor 222 can be disposed forward of the rotor 222. The portion of the coil 290 not radially overlapped by the rotor 222 can be disposed between the rotor 222 and the pump 226. The portion of the coil 290 not radially overlapped by the rotor 222 can be disposed between the rotor 222 and the drive 234.

In the example shown, the rotor 222 extends rearward of the stator 224 and further extends radially outward beyond the stator 224. The stator 224 extends forward of the rotor 222. The drive 234 vextends forward of the stator 224. The pump 226 is located forward of the electric motor 220 and extends below all of the electric motor 220 and the drive 234. A portion of the rotor body 280 radially overlapping with the stator 224 supports a plurality of magnets 288 and the rotor body 280 connects to the drive shaft 250 at a location radially inward of the stator 224.

Rotor 222 is disposed at least partially around the stator 224. The rotor 222 includes a rotor body 280 that connects with drive shaft 250. The rotor body 280 connects to drive shaft 250 such that rotation of the rotor body 280 causes simultaneous rotation of the drive shaft 250.

Rotor body 280 includes mounting ring 282 that is mounted to the drive shaft 250. Rotor body 280 further includes outer tube 286 that is disposed radially outward of the mounting ring 282. The outer tube 286 extends axially relative to the mounting ring 282. The outer tube 286 extends in the forward axial direction AD1 and towards the pump 226 in the example shown. The outer tube 286 extends axially towards control board 302. Blades 284 extend between and structurally connect mounting ring 282 and outer tube 286. The blades 284 can form a blade array that extends fully annularly around the axis A.

In the example shown, the rotor 222 is configured as a cup that is open in axial direction AD1. The rotor 222 is configured such that rotor body 280 is open in the forward axial direction AD1. The rotor 222 is open towards the drive 234 and towards the pump 226.

Magnets 288 of the rotor 222 are disposed on the outer tube 286. The magnets 288 can be mounted on an inner radial side of the outer tube 286. The magnets 288 are spaced radially from the stator 224 such that an annular air gap is disposed directly radially between the stator 224 and the rotor 222.

The rotor 222 is disposed about the stator 224 and extends rearward in axial direction AD2 relative to the stator 224. At least a portion of the rotor 222 is disposed rearward of the stator 224 such that that portion of the rotor 222 does not radially overlap with the stator 224. At least a portion of the rotor 222 is disposed rearward of the stator 224 such that that portion of the rotor 222 is disposed further rearward than a rearward-most portion of the stator 224. The rotor 222 extends rearward beyond the coils 290 of the stator 224.

Stator 224 extends forward of the rotor 222 in the forward axial direction AD1. At least a portion of the stator 224 is disposed forward of the rotor 222 such that that portion of the stator 224 does not radially overlap with the rotor 222. At least a portion of the stator 224 is disposed forward of the rotor 222 such that that portion of the stator 224 is disposed further forward than a forward-most portion of the rotor 222. The stator 224 extends forward beyond the magnets 288 of the stator 224. The stator 224 can be disposed such that at least one, up to all, of the coils 290 of the stator 224 extend forward of the rotor 222. At least a portion of the stator 224 is disposed axially closer to the drive 234 than any portion of the rotor 222. At least a portion of the stator 224 is disposed axially closer to the pump 226 than any portion of the rotor 222.

In the example shown, the driving arrangement of the pumping assembly 210 is configured such that, from rear end 322 and extending towards a front end 320, the components of the drive arrangement are disposed such that the rotor 222 is rearward of the stator 224, the stator 224 is rearward of the drive 234, and the drive 234 is at least partially rearward of the pump 226. The rotor 222 extends rearward of the stator 224. The stator 224 extends forward of the rotor 222. The drive 234 is disposed forward of the stator 224 such that the electric motor 220 is disposed fully rearward of the drive 234. The pump 226 is disposed fully forward of the electric motor 220.

In the example shown, a portion of the rotor 222 is disposed rearward of the stator 224 and a portion of the stator 224 is disposed forward of the rotor 222. A plurality of gears of the drive 234 are disposed forward of the electric motor 220. The pump 226 is disposed forward of the plurality of gears of the drive 234. The rear to front configuration of the components of pumping assembly 210 provides for a compact configuration of pumping assembly 210.

Mount body 212 supports the electric motor 220. A portion of the mount body 212 connected to the stand 214 also supports the electric motor 220. The electric motor 220 is directly connected to the portion of the mount body 212 that reacts loads generated during operation to the stand 214 and thus to the support surface. In the example shown, the electric motor 220 is mounted to frame 258 and frame 258 is mounted to stand 214.

A portion of the mount body 212 extends into the electric motor 220 to structurally support the electric motor 220. The portion of the mount body 212 that interfaces with the electric motor to support the electric motor 220 is a stationary portion of the mount body 212 that is configured to remain stationary during operation of the pumping assembly 210. The rotor 222 moves relative to the portion of the mount body 212 during rotation of the rotor 222.

The portion of the mount body 212 that extends into the electric motor 220 is formed by the frame 258 in the example shown. The portion of the mount body 212 is formed as tube 266. Shaft passage 382 extends through tube 266. Shaft passage 382 can, in some examples, be generally cylindrical. The shaft passage 382 can, in some examples, be disposed coaxially with drive shaft 250. The shaft passage 382 is open in both the forward axial direction AD1 and the rearward axial direction AD2 in the example shown.

The shaft passage 382 is configured such that drive shaft 250 can pass fully through the shaft passage 382. The drive shaft 250 extends through a distal opening 384 of shaft passage 382 to project out of shaft passage 382 in axial direction AD2. The drive shaft 250 extends through distal opening 384 to connect to rotor 222. The drive shaft 250 extends through passage opening 386 of shaft passage 382 to project out of shaft passage 382 in axial direction AD1. The drive shaft 250 extends through passage opening 386 to interface with drive 234. In some examples, the drive shaft 250 can be disposed coaxially with shaft passage 382. In some additional or alternative examples, one or both of the drive shaft 250 and the shaft passage 382 is disposed coaxially with the rotor 222. In various examples, the drive shaft 250 and/or the shaft passage 382 can be disposed along one or more axes that are transverse to the rotational axis of the rotor 222.

The shaft passage 382 is an elongate channel that provides an opening through mount body 212 such that drive shaft 250 can pass through mount body 212 to transmit rotational motion from electric motor 220 to drive 234. In some examples, the rotational axis A can extend through end openings of the mount body 212 (e.g., through distal opening 384 and passage opening 386). The drive shaft 250 receives the rotational input from the rotor 222 at a location disposed rearward of the shaft passage 382. The drive shaft 250 can output the rotational motion to the drive 234 at a location disposed forward of the shaft passage 382.

In the example shown, at least a portion of the shaft passage 382 is disposed directly radially inward of the stator 224. The shaft passage 382 can extend at least partially through the stator 224. In some examples, the shaft passage 382 can be considered to be at least partially defined by the stator 224 (e.g., in examples in which the stator 224 projects axially outward of distal end of the tube 266).

In the example shown, tube 266 forms the portion of the mount body 212 that extends within the electric motor 220 to mount the electric motor 220. The shaft passage 382 can be at least partially defined by the tube 266. Stator 224 is mounted on cantilevered portion 370 of tube 266 in the example shown. Tube 266 can extend at least partially through the stator 224. The distal opening 384 can be formed at an end of the tube 266 within the stator 224. Tube 266 can, in some examples, be disposed coaxially with electric motor 220. Tube 266 extends in the rearward axial direction AD2 from frame 258 in the example shown.

Tube 266 is formed as a portion of the mount body 212. In the example shown, tube 266 is formed as a portion of frame 258. A forward end of tube 266 can interface with upright portion 260 and a rearward end of tube 266 is spaced axially away from upright portion 260. In the example shown, the rearward end of the tube 266 is cantilevered from the frame 258.

At least a portion of the tube 266 can be formed by base portion 262 in various examples. The cantilevered portion 370 of tube 266 can extend outward beyond the base portion 262. The cantilevered portion 370 of tube 266 can, in various examples, form a rearward-most portion of the frame 258. The cantilevered portion 370 of tube 266 can, in various examples, form a rearward-most portion of the mount body 212. The tube 266 can form a portion of the mount body 212 that is disposed closest to the rear end 322 of the pumping assembly 210.

A portion of the tube 266 can be formed by the portion of the mount body 212 that connects to the stand 214. The tube 266 can be at least partially formed by a portion of the mount body 212 that reacts forces generated during operation to the stand 214. In the example shown, the tube 266 is at least partially formed by the base portion 262. The tube 266 being at least partially formed by the base portion 262 provides for a robust configuration of pumping assembly 210. Loads generated by the electric motor 220 during operation can be reacted directly to the base portion 262 from the tube 266. Such forces are not required to be transmitted to the upright portion 260 and then to the base portion 262. Such a configuration can decrease loading experienced by upright portion 260, which also supports gearing of the drive 234.

In the example shown, the frame 258 structurally supports the electric motor 220. Tube 266 extends in axial direction AD2 from the upright portion 260 of the frame 258. In some examples, the tube 266 can be at least partially formed by the base portion 262 of the frame 258. The stator 224 is mounted on the frame 258 such that the tube 266 structurally supports the stator 224. The stator 224 can be mounted on the tube 266 such that the stator 224 extends fully annularly about the tube 266. The coils 290 of the stator 224 can form a coil array that extends fully annularly about the tube 266. The mandrel 292 of the stator 224 can be mounted directly on the tube 266. In some examples, portions of the stator 224 can extend rearward in axial direction AD2 beyond the distal end of the tube 266.

Drive shaft 250 extends between and connects electric motor 220 and drive 234. Drive shaft 250 is connected to rotor 222 to receive rotational motion from the electric motor 220. Drive shaft 250 extends in the forward axial direction AD1 from rotor 222. Drive shaft 250 extends through tube 266 and into the gear chamber 332. Drive shaft 250 extends fully axially through tube 266 and projects in both axial directions AD1, AD2 beyond the tube 266 in the example shown. In various examples, the drive shaft 250 can project axially beyond the tube 266 in both axial directions AD1, AD2. The drive shaft 250 can extend through the shaft passage 382 and project out of the shaft passage 382 through both distal opening 384 and passage opening 386.

In the example shown, the drive shaft 250 projects from a location outside of the mount body 212 (interface between drive shaft 250 and rotor 222) and terminates at a location within the mount body 212 (at pinion 252). Drive shaft 250 extends through tube 266 and into gear chamber 332 to interface with drive 234. The drive shaft 250 transmits the rotational motion from the electric motor 220 that is mounted on an exterior surface of the mount body 212 to a location within the mount body 212.

In the example shown, the drive shaft 250 is configured to transmit the rotational motion from electric motor 220 through a portion of the mount body 212 (e.g., through upright portion 260 of frame 258) from a first axial side (e.g., a rearward side) of the portion of the mount body 212 to a second axial side (e.g., a forward side) of the portion of the mount body 212. Drive shaft 250 extends axially beyond the electric motor 220 to interface with drive 234. In the example shown, the drive shaft 250 extends from the electric motor 220 in the axial direction AD1 to interface with drive 234.

At least a portion of drive shaft 250 is disposed directly radially inward of stator 224 to radially overlap with stator 224. The drive shaft 250 extends through the stator 224 that is mounted on the tube 266. The drive shaft 250 extends fully axially through the stator 224 in the example shown. The drive shaft 250 projects in both axial directions AD1, AD2 beyond the stator 224. The stator 224 can be coaxial with the drive shaft 250 and directly radially overlap with the drive shaft 250, and the rotor 222 may not be directly radially between the drive shaft 250 and the stator 224.

An input end of the drive shaft 250 is connected to rotor 222 and an output end of the drive shaft 250 interfaces with drive 234. In the example shown, drive shaft 250 is connected to rotor 222 at the rearward end of drive shaft 250 and drive shaft 250 interfaces with drive 234 at the forward end of drive shaft 250. Drive shaft 250 includes pinion 252 at the output end of the drive shaft 250. The pinion 252 interfaces with gearing of the drive 234 to provide rotational motion to the drive 234. In the example shown, pinion 252 interfaces with lower gear assembly 268. In the example shown, pinion interfaces with lower gear **276*a***.

Electric motor 220 includes a single interior bearing in the example shown. Motor bearing 254 is disposed within electric motor 220 to radially overlap with one or both of rotor 222 and stator 224. In the example shown, the motor bearing 254 radially overlaps with the electromagnetic components of both the stator 224 and the rotor 222 (e.g., with coils 290 and magnets 288).

In some examples, the coils 290 of the stator 224 can extend forward of the motor bearing 254. In additional or alternative examples, the coils 290 of the stator 224 can extend rearward of the motor bearing 254.

In some examples, the magnets 288 of the rotor 222 can extend forward of the motor bearing 254. In additional or alternative examples, the magnets 288 of the rotor 222 can extend rearward of the motor bearing 254.

The motor bearing 254 supports rotation of the drive shaft 250 within the electric motor 220. The motor bearing 254 interfaces with the tube 266 on an outer radial side of the motor bearing 254 and interfaces with the drive shaft 250 on an inner radial side of the motor bearing 254. In the example shown, only a single bearing is disposed directly radially within the electric motor 220. While electric motor 220 is shown as an outer rotator, it is understood that the discussed bearing arrangement can apply equality to an inner rotator.

Motor bearing 254 is disposed directly radially inward of the stator 224. Motor bearing 254 is the only bearing of pumping assembly 210 that is disposed radially within the electric motor 220, in the example shown. The motor bearing 254 is mounted to the tube 266 within the tube 266. The motor bearing 254 can be disposed in the cantilevered portion 370 of the tube 266.

Drive shaft 250 is supported by motor bearing 254 and shaft bearing 256. The drive shaft 250 engages with shaft bearing 256 at a location forward of the electric motor 220. The shaft bearing 256 supports rotation of the drive shaft 250. The shaft bearing 256 can interface with the frame 258 on an outer radial side of shaft bearing 256 and can interface with drive shaft 250 on an inner radial side of shaft bearing 256. The shaft bearing 256 is disposed within tube 266 in the example shown. The shaft bearing 256 can, in some examples, be disposed within a portion of the tube 266 formed at least partially by the base portion 262.

In the example shown, the drive shaft 250 is supported by multiple bearings, but only a single bearing (e.g., motor bearing 254) is dispose directly radially within the electric motor 220 and the other bearing (or bearings in various examples) (e.g., shaft bearing 256) is disposed outside of the electric motor 220. The drive shaft 250 can, in some examples, be supported by only the shaft bearing 256 and the motor bearing 254.

Motor bearing 254 is disposed within electric motor 220 and shaft bearing 256 is not disposed within electric motor 220. The motor bearing 254 radially overlaps with one or both of the stator 224 and the rotor 222 while the shaft bearing 256 is spaced axially from the stator 224 and the rotor 222. In the example shown, the rotor body 280 of rotor 222 both axially and radially overlaps with the motor bearing 254.

The shaft bearing 256 is disposed outside of the electric motor 220 such that the shaft bearing 256 does not radially overlap with the stator 224 or the rotor 222. In the example shown, the shaft bearing 256 is disposed axially between the motor bearing 254 and the pump 226. In the example shown, the shaft bearing 256 is disposed axially between the motor bearing 254 and the drive 234. The rotor body 280 can axially overlap with both the motor bearing 254 and the shaft bearing 256 in various examples. In the example shown, the stator 224 does not overlap with the shaft bearing 256, radially or axially.

The motor bearing 254 and the shaft bearing 256 are disposed axially between the interface between drive shaft 250 and rotor 222 and the interface between drive shaft 250 and lower gear 276*a*. The pinion 252 of drive shaft 250 is disposed on an opposite axial side of the shaft bearing 256 from the rotor 222. The pinion 252 of drive shaft is disposed on an opposite axial side of shaft bearing 256 from the stator 224.

In the example shown, the rotor 222 extends in axial direction AD1 over the stator 224 such that at least a portion of the rotor 222 is axially closer to the shaft bearing 256 along the rotor axis A than the motor bearing 254 is to the shaft bearing 256. In the example shown, the rotor 222 interfaces with the drive shaft 250 rearward of the motor bearing 254 and the rotor 222 extends such that at least a portion of the rotor 222 is disposed axially forward of the motor bearing 254. In the example shown, the rotor 222 does not interface with the drive shaft 250 at locations forward of the motor bearing 254.

In the example shown, the stator 224 is disposed such that at least a portion of the stator 224 is axially closer to the shaft bearing 256 along the rotor axis A than the motor bearing 254 is to the shaft bearing 256.

In the example shown, the rotational output of the electric motor 220 is supported by a pair of bearings. Pumping assembly 210 includes a forward bearing (e.g., shaft bearing 256) that supports the drive shaft 250. Pumping assembly 210 further includes a rearward bearing (e.g., motor bearing 254) that supports the drive shaft 250. In the example shown, the rearward bearing is disposed within the electric motor 220 while the forward bearing is not disposed within the electric motor 220. The rearward bearing is disposed directly radially inward of the stator 224 and the rotor 222 while the forward bearing is disposed outside of the electric motor 220.

Rotor 222 is mounted to drive shaft 250 to drive rotation of the drive shaft 250. In the example shown, rotor 222 includes a rotor body 280 that supports magnets 288 of a magnetic array. The rotor body 280 is connected to the drive shaft 250. In the example shown, mounting ring 282 of rotor body 280 is connected to the drive shaft 250. Outer tube 286 of rotor body 280 extends to radially overlap with the stator 224. Outer tube 286 supports the magnets 288 of the rotor 222. The magnets 288 can be disposed on an inner radial side of the outer tube 286. In the example shown, the rotor body 280 includes a plurality of blades 284 that extend between and structurally connect the mounting ring 282 and the outer tube 286. The blades 284 can be disposed in an annular array extending around the rotor axis A.

Gaps are disposed circumferentially between adjacent blades 284 such that air can be moved by the blades 284. In the example shown, the gap between adjacent blades is open both radially and axially. Such a configuration can provide for increased airflow as the rotating blades 284 can draw in cooling air both axially and radially.

As rotor 222 rotates, the blades 284 are configured to blow air, such as in the manner of a fan, that provides cooling to components of the pumping assembly 210. The rotor 222 can blow cooling air through the stator 224 such that the cooling air flows through the coil gaps 314 between adjacent coils 290 of the stator 224. The cooling air can flow fully axially through the stator 224 to provide cooling to the stator 224.

In the example shown, the coils 290 of the stator 224 axially overlap with the blades 284 of the rotor body 280. The coils 290 axially overlapping with the blades 284 facilitates effective cooling of the stator 224 as the rotor body 280 can blow cooling air directly axially through the stator 224. The cooling air may not need to turn or be routed through a tortuous path. Instead, the cooling air can be blown axially through the stator 224 at locations directly circumferentially between adjacent coils 290 to provide cooling to the stator 224.

The drive shaft 250 is disposed inward of the stator 224 and extends through the stator 224. The drive shaft 250 is disposed inward of the blades 284. The drive shaft 250 extends through the stator 224 at a location radially inward of the stator 224 such that the drive shaft 250 does not interfere with cooling airflow. The rotor 222 can drive rotation of the drive shaft 250 and blow cooling air through the stator 224 without the drive shaft 250 interfering with or obstructing the cooling air.

The motor control 294 is disposed forward of the electric motor 220 such that the cooling air blown by the rotor 222 in the forward direction flows towards the motor control 294. The rotor 222 can thus generate a flow of cooling air that flows towards and cools multiple heat generating components of pumping assembly 210.

In the example shown, the drive shaft 250 connects to the rotor body 280 at a location rearward of the stator 224. The drive shaft 250 connects to the rotor body 280 at a location rearward of both the motor bearing 254 and the shaft bearing 256. In the example shown, the drive shaft 250 does not support any fan separate from rotor 222. The drive shaft 250 does not project axially outward of the rotor body 280 in the rearward axial direction AD2, though it is understood that not all examples are so limited. In the example shown, the input end of the drive shaft 250 terminates at a location radially overlapped with the rotor body 280.

The drive shaft 250 interfaces with the drive 234 at a location axially between the stator 224 and the pump 226. The drive shaft 250 interfaces with the drive 234 at a location axially between the rotor 222 and the pump 226. The drive shaft 250 extends into the gear chamber 332 to interface with gearing of the drive 234.

A radial direction R is shown in FIG. 18, which radial direction R is orthogonal to the axis of rotation A. It is understood that the radial direction R can be any direction that is orthogonal to the axis A. In the example shown, the electric motor 220 is configured as an outer rotator. The rotor 222 is configured such that at least a portion of the rotor 222 is radially outward of the stator 224. In the example shown, the outer tube 286 of the rotor 222 is disposed radially outward of and radially overlaps with the stator 224. The outer tube 286 radially overlaps with the coils 290 of the stator 224.

Pumping assembly 210 is configured such that the drive shaft 250 is radially inward of the stator 224 and the stator 224 is radially inward of the rotor 222. The radial line R passes through the drive shaft 250, then through stator 224, then through rotor 222. In the example shown, the radial line R passes through the drive shaft 250, then the shaft passage 382, then the tube 266, then the stator 224, then the annular air gap between the stator 224 and rotor 222, and then the rotor 222.

In the example shown, one or more capacitors 350 of the motor control 294 are directly above the rotor 222. The rotor 222 is directly radially between the stator 224 and at least one capacitor 350. In the example shown, the capacitor 350 radially overlaps with the rotor 222. The capacitor 350 can be cylindrical. The capacitor 350 can extend parallel to the axis of rotation A of the rotor 222. The capacitor 350 is disposed directly radially outward of the rotor 222. In the example shown, a radial line R extending from the axis of rotation A passes first through drive shaft 250, then through stator 224, then through rotor 222, and then through the capacitor 350. Such a configuration provides for a compact configuration of pumping assembly 210, reducing both size and weight.

During operation, the pump 226 pumps fluid and outputs the fluid under pressure for utilization, such as for spraying by a spray gun 30. Electrical power is provided to the stator 224. Specifically, the electrical power is provided to the coils 290 of the stator 224. The coils 290 of the stator 224 generate electromagnetic flux that flux shears with the magnetic flux from the magnets 288 in the air gap between rotor 222 and stator 224. The rotor 222 rotates on the axis of rotation A. The magnets 288 are mounted on the outer tube 286 and the driving force generated is transmitted axially rearward and radially inward through blades 284 and to mounting ring 282.

The mounting ring 282 is connected to drive shaft 250 such that rotation of the mounting ring 282 drives rotation of the drive shaft 250. In the example shown, the drive shaft 250, tube 266, stator 224, and rotor 222 are all disposed coaxially on the axis A, though it is understood that not all examples are so limited. The driving force is transmitted in the forward direction AD1 through drive shaft 250.

The drive shaft 250 rotates on the axis A. The drive shaft 250 transmits the rotational motion to drive 234 via the interface between pinion 252 and lower gear assembly 268. Rotation of the lower gear assembly 268 drives rotation of the upper gear assembly 270. Rotation of the upper gear assembly 270 drives rotation of the eccentric 242, which rotation of the eccentric 242 is converted to linear reciprocating motion by crank arm 244 and coupling 246. The linear reciprocating motion is provided to piston 236 to drive reciprocation of piston 236 and thereby cause pumping by pump 226.

Pumping assembly 210 provides significant advantages. Electric motor 220 is supported by tube 266 of mount body 212. In the example shown, the stator 224 is statically connected to the tube 266 and structurally supported by the tube 266, while the rotor 222 is dynamically connected to the tube (e.g., via motor bearing 254) to be supported by the tube 266. The electric motor 220 is fully supported by the tube 266. The tube 266 supporting the stator 224 provides for a compact configuration for pumping assembly 210, reducing both the size and weight of pumping assembly 210.

Electric motor 220 can be configured as an outer rotator in which the rotor 222 rotates around the stator 224. The rotor 222 transmits rotational motion to drive shaft 250 that extends through the tube 266 that supports the stator 224 such that the drive shaft 250 also extends axially through the stator 224. The drive shaft 250 connects to the rotor 222 on a rear side of the stator 224 such that the drive shaft 250 receives a rotational input rearward of the stator 224. The drive shaft 250 interfaces with the drive 234 on a forward side of the stator 224 such that the drive shaft 250 provides a rotational output forward of the stator 224. As such, the drive shaft 250 transmits rotational motion through the stator 224 and rotates at a location radially within the stator 224. The drive shaft 250 extending through tube 266 and stator 224 to transmit rotational motion through the stator 224 from one axial side of the stator 224 to the other axial side of the stator 224 provides for a compact configuration for pumping assembly 210 which also reduces size, weight, and cost.

The drive shaft 250 is disposed within tube 266 that supports stator 224. The drive shaft 250 is disposed radially inward of stator 224 and extends through stator 224. The rotor 222 extends radially outward from the drive shaft 250 to axially overlap with the stator 224. The rotor 222 further extends outward beyond the stator 224 and forward to radially overlap with the stator 224. The drive shaft 250 extending through the electric motor 220 with the rotor 222 disposed axially outward of and axially overlapping with the stator 224 provides improved cooling for electric motor 220 as the rotor 222 is able to blow cooling air directly into and through the stator 224.

Electric motor 220 includes a single bearing disposed within the electric motor 220. Motor bearing 254 is disposed radially within the electric motor 220. Motor bearing 254 can be the only bearing disposed directly radially within the electric motor 220. Having only a single bearing within the electric motor 220 provides for a compact configuration that reduces the overall size and weight of pumping assembly 210, also providing for reduced costs.

The bearings supporting drive shaft 250 are disposed within the electric motor 220 (motor bearing 254) and forward of the electric motor 220 (shaft bearing 256). The electric motor 220 does not include any bearings that are rearward of the stator 224. The electric motor 220 does not include any bearings that are rearward of the rotor 222. The bearing configuration of the electric motor 220 provides for a compact configuration for transmitting rotational motion through the electric motor 220 and from a rear end of the electric motor 220 forward to the drive 234 and pump 226 that are disposed forward of the electric motor 220.

Figure 20:
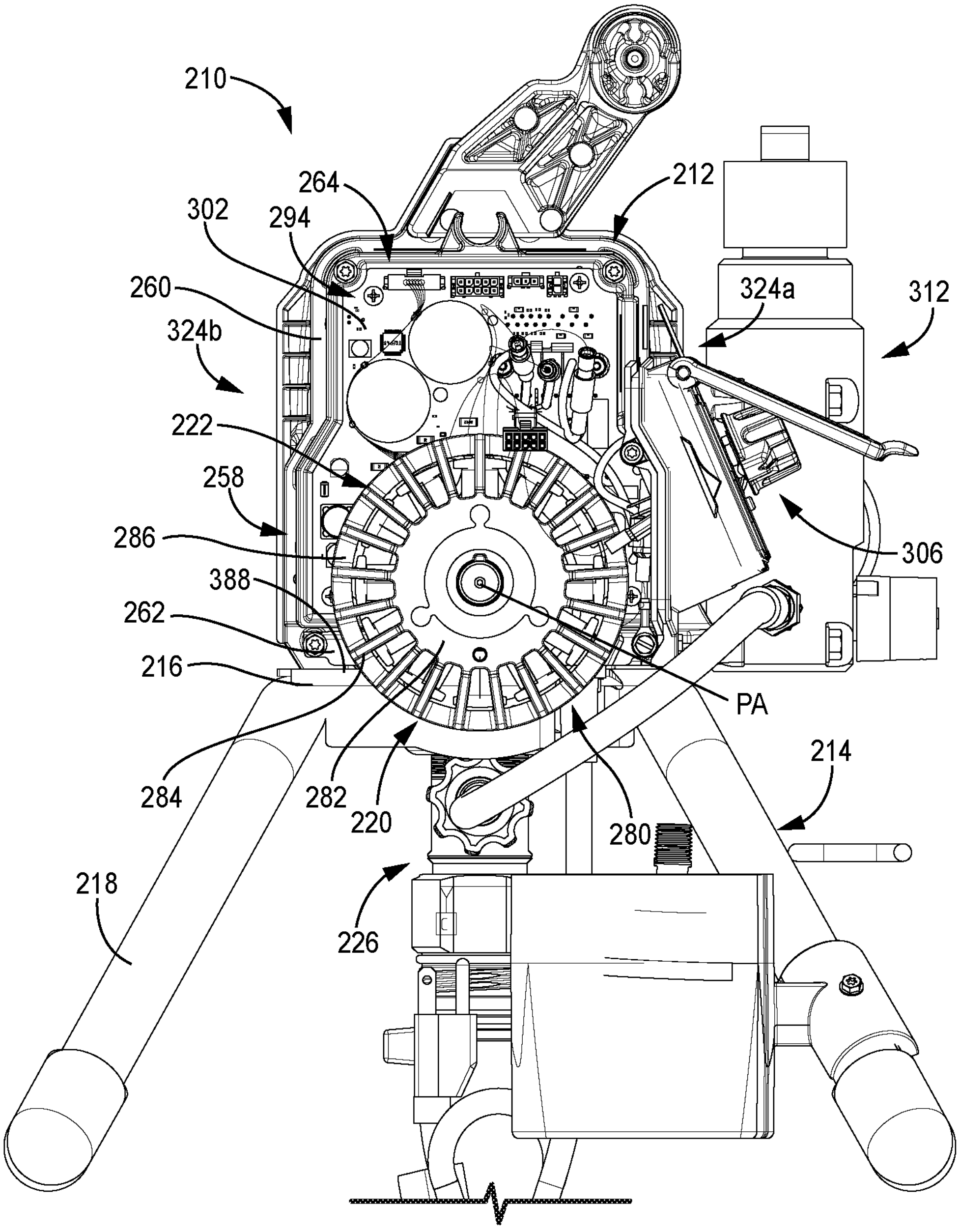
FIG. 20 is a rear elevational view of the pumping assembly.

FIG. 20 is a rear elevational view of pumping assembly 210. The mount body 212 of the pumping assembly 210 is disposed on and connected to stand 214 to support pumping assembly 210 relative to a support surface (e.g., the ground). The stand 214 includes base plate 216, which can be a platform onto which the mount body 212 is directly or indirectly mounted. In the example shown, the frame 258 is configured to mount to the base plate 216. More specifically, the base portion 262 of the frame 258 is mounted on the base plate 216 to connect the mount body 212 to the stand 214. A plurality of fasteners (e.g., bolts among other options) can extend partially or fully through the base plate 216 and base portion 262 to connect the frame 258 to the base plate 216. The base plate 216 may be the only part of the stand 214 that supports the rest of the main body of the pumping assembly 210, such as the pump 226, electric motor 220, drive 234, and mount body 212.

In the example shown, the mount body 212 is disposed on a plate top side 388 of the base plate 216. The mount body 212 interfaces with the stand 214 on plate top side 388 of the base plate 216. The base portion 262 is disposed on and can contact the plate top side 388 of the base plate 216.

The electric motor 220 is supported by the mount body 212 of the pumping assembly 210. The rotor 222 rotates about the stator 224. In the example shown, the rotor 222 extends downward below the bottom side 390 of the mount body 212. The rotor 222 can project out of the mount body 212 such that at least a portion of the rotor 222 extends downward below the base portion 262 of the frame 258. The rotor 222 can extend both below the base portion 262 and above the base portion 262. The rotor 222 can extend below the bottom end 392 of the mount body 212 and above the bottom end 392 of the mount body 212.

In the example shown, the rotor 222 axially overlaps with the top of the stand 214. The rotor 222 axially overlaps with the base plate 216. The rotor 222 axially overlaps with the plate top side 388 of the base plate 216. In this way, part of the rotor 222 is entirely above the stand 214 while another part of the rotor 222 is below a top of the stand 214. Which part of the rotor 222 is above and below the top of the stand 214 depends on the rotational position of the rotor 222 at that moment because which part is above and below changes as a rotor 222 rotates.

The rotor 222 is cantilevered such that that part of the rotor 222 hangs below the top of the stand 214. This allows for a compact design of the pumping assembly 210. The top of the stand 214 can be defined by the plate top side 388 of the base plate 216. As such, the rotor 222 axially overlaps with the base plate 216 such that part of the rotor 222 is above the base plate 216 and part of the rotor 222 is not above the base plate 216. The rotor 222 axially overlaps with the base plate 216 such that part of the rotor 222 is below the base plate 216 and part of the rotor 222 is not below the base plate 216. The rotor axially overlaps with base plate 216 such that part of the rotor 222 is below the base plate 216 and part of the rotor 222 is above base plate 216.

The electric motor 220 is disposed such that the electric motor 220 projects vertically below the base portion 262 of the frame 258 and vertically above the base portion 262 of the frame 258. The electric motor 220 extends vertically downwards such that the electric motor 220 axially overlaps with the mounting interface between the mount body 212 and the stand 214. In the example shown, the coils 290 of the stator 224 axially overlap with the mounting interface between the base portion 262 and the base plate 216.

The electric motor 220 is mounted such that an outer diameter of the electric motor 220 (formed by an outer radial side of the rotor 222 in this example) extends downwards below the base plate 216. It is understood that the base plate 216 is considered to be the horizontal portion of the stand 214 on which the frame 258 is mounted. As such, the electric motor 220 can be considered to extend below the base plate 216 even when the portion of the stand 214 forming the base plate 216 includes flanges or other features that may project vertically downward beyond the electric motor 220.

The electric motor 220 extends vertically below the top side 388 of the base plate 216 on which the frame 258 is disposed. The electric motor 220 extends vertically downward below a bottom side 390 of the base plate 216. The electric motor 220 is partially disposed above the base plate 216 and partially disposed below the baes plate 264. In the example shown, the electric motor 220 is offset from the base plate 216 such that, while the electric motor 220 hangs down below the plate top side 388 of the base plate 216, the electric motor 220 does not extend through the base plate 216. The portion of the electric motor 220 extending below the base plate 216 is offset from an outer edge of the base plate 216 in a direction away from the base plate 216. In the example shown, the portion of the electric motor 220 that hangs below the base plate 216 is disposed fully rearward of the base plate 216. The portion of the electric motor 220 that hangs below the base plate 216 is disposed in rearward axial direction AD2 from the base plate 216.

In the example shown, the electric motor 220 is disposed such that the stator 224 axially overlaps with the base plate 216. The stator 224 can hang down such that a portion of the stator 224 extends downward below the base plate 216 and another portion of the stator 224 extends upwards above the base plate 216. The stator 224 can be disposed such that a subset of the coils 290 axially overlap with the base plate 216 and another subset of the coils 290 do not axially overlap with the base plate 216.

In the example shown, the electric motor 220 is disposed such that the rotor 222 axially overlaps with the base plate 216. The rotor 222 can hang down such that a portion of the rotor 222 extends downward below the base portion 262 and another portion of the rotor 222 extends upwards above the base portion 262. The rotor 222 can be disposed such that a subset of the magnets 288 are disposed below the plate top side 388 of the base plate 216 and another subset of the magnets 288 are disposed above the plate top side 388 of the base plate 216.

The electric motor 220 is mounted on tube 266, which is formed as a portion of frame 258. The electric motor 220 is mounted on cantilevered portion 370 of tube 266 in the example shown. The electric motor 220 hangs from the tube 266 such that a portion of the electric motor 220 is disposed below the vertically lowest portion of the frame 258 and another portion of the electric motor 220 is disposed above the vertically lowest portion of the frame 258.

In the example shown, the electric motor 220 hangs downward such that at least a portion of the electric motor is between stand legs 218 of the stand 214. The electric motor 220 can hang downwards such that a portion of the electric motor 220 is disposed directly between stand legs 218 of the stand 214.

In the example shown, the rotor 222 extends vertically downward such that at least a portion of the rotor 222 is disposed between the stand legs 218. The portion of the rotor 222 can be disposed directly between the stand legs 218. The portion of the rotor 222 extends downwards beyond the location that the stand legs 218 interface with the base plate 216 to connect to the base plate 216. In additional or alternative examples, the stator 224 can extend downwards beyond the location that the stand legs 218 connect to the base plate 216.

The stand 214 can include multiple stand legs 218. A first stand leg 218 is offset from a reciprocation axis RA of the pump 226 towards a first lateral side 324*a* of the pumping assembly 210 while a second stand leg 218 is offset from the reciprocation axis RA towards a second lateral side 324*b* of the pumping assembly 210. The rotor 222 is disposed laterally between the stand legs 218. At least a portion of the rotor 222 can be disposed directly laterally between the stand legs 218.

The pump 226 is disposed at the front end 320 of the pumping assembly 210. The pump 226 can be mounted such that the pump 226 extends from above the top side of the base plate 216 to below the plate top side 388 of the base plate 216. In various examples, the electric motor 220 can be disposed such that a portion of the electric motor 220 axially overlaps with the pump 226 and that same portion of the electric motor 220 is also disposed directly between multiple stand legs 218 of the pumping assembly 210. The rotor 222 can extend below a top end of each of the multiple stand legs 218.

As shown in FIG. 20, the control board 302 extends vertically above the electric motor 220. The control board 302 projects laterally outward relative to the electric motor 220. The control board 302 extends laterally outward beyond electric motor 220 towards lateral side 324*a* of pumping assembly 210. The control board 302 extends laterally outward beyond electric motor 220 towards lateral side 324*b* of pumping assembly 210.

Electric motor 220 is mounted to mount body 212 that is connected to stand 214. The electric motor 220 hangs down below the portion of the mount body 212 on which the stator 224 is mounted. The electric motor 220 hangs down below the bottom end 392 of the frame 258. The electric motor 220 extends from above the bottom end 392 of the frame 258 to below the bottom end 392 of the frame 258. The electric motor 220 is disposed such that a portion of the electric motor 220 extends below a top end of the stand 214 supporting the mount body 212. The electric motor 220 extends from above an interface between the mount body 212 and the stand 214 to below the interface between the mount body 212 and the stand 214. The electric motor 220 can, in various examples, extend such that at least a portion of the electric motor 220 is disposed directly between stand legs 218 of the stand 214. The hanging configuration of the electric motor 220 and positioning of the electric motor 220 provides for a compact configuration of pumping assembly 210, making for a smaller and lighter pumping assembly 210.

Figure 21A:
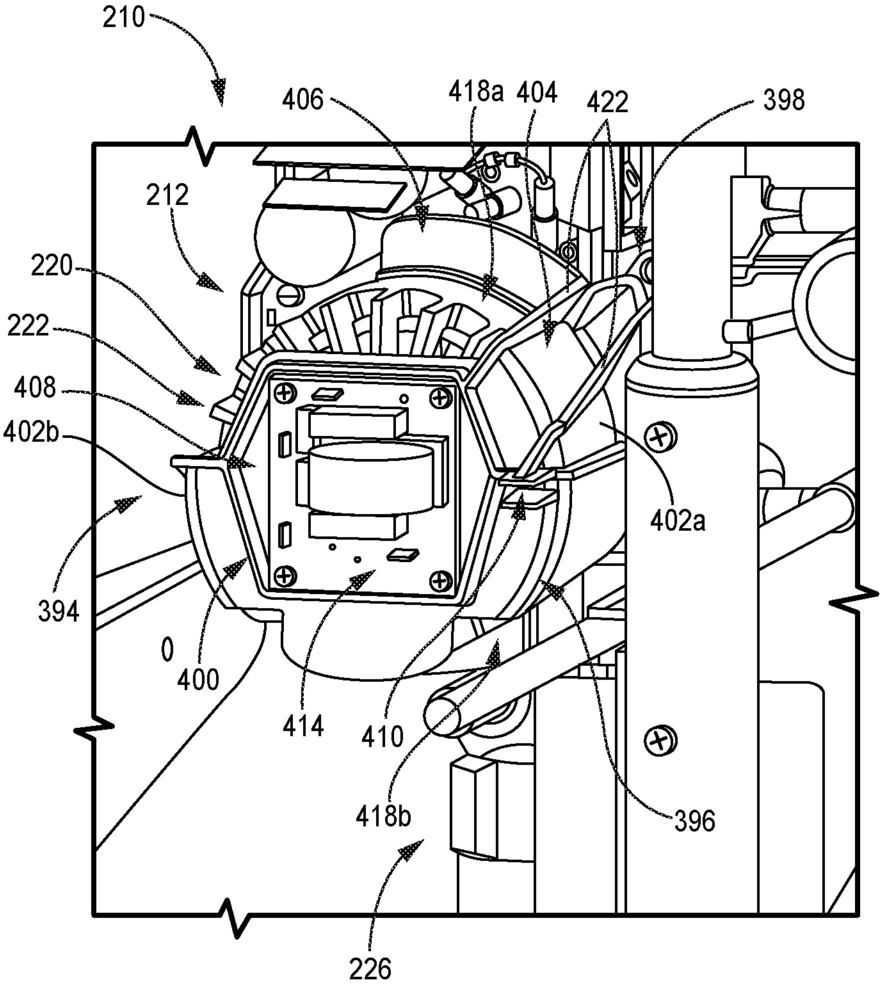
FIG. 21A is a first isometric view showing a portion of the pumping assembly.
Figure 21B:
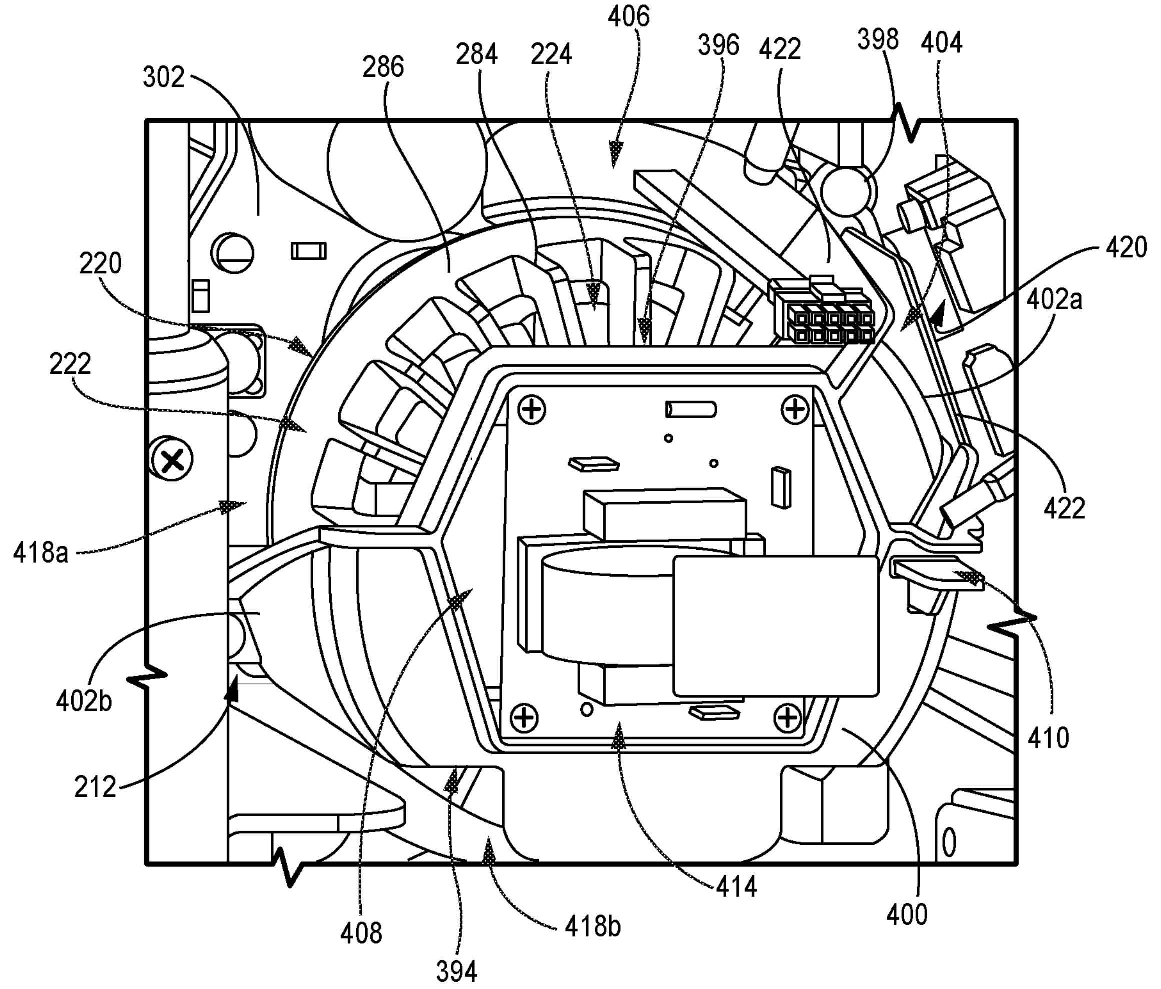
FIG. 21B is a second isometric view showing a portion of the pumping assembly.
Figure 22:
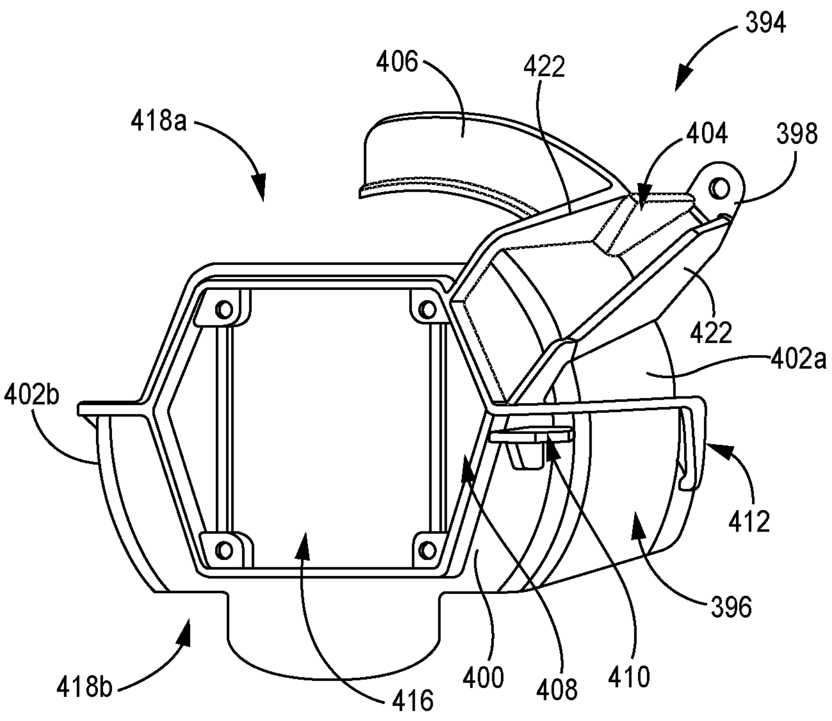
FIG. 22 is an isometric view of a rotor cover.

FIG. 21A is a first isometric view showing portion of pumping assembly 210. FIG. 21B is a second isometric view showing a portion of pumping assembly 210. FIG. 22 is an isometric view of rotor cover 394. FIGS. 21A-22 are discussed together. Rotor cover 394 is disposed at least partially around the rotor 222 of the electric motor 220. Cover body 396 of rotor cover 394 extends between mount end 398 and free end 400. Cover body 396 includes mount leg 402*a*, mount leg 402*b*, cover channel 404, spacer 406, cover recess 408, guide 410, and retainer 412.

Rotor cover 394 is disposed at least partially around rotor 222. Rotor cover 394 can extend axially beyond the rotor 222 in both the forward axial direction AD1 and the rearward axial direction AD2. Rotor cover 394 is disposed radially outward from the rotor 222. The rotor cover 394 extends axially between mount end 398 and free end 400. The mount end 398 is connected to the mount body 212. The free end 400 can extend over a rearward end of the electric motor 220 to axially overlap with the electric motor 220.

Rotor cover 394 is disposed within assembly body 316. Rotor cover 394 is disposed within the assembly cover 318 that at least partially encloses the electric motor 220. Rotor cover 394 extends over the rotor 222 and guards rotor 222. Rotor cover 394 can from a shroud that prevents various components from contacting the spinning rotor 222. For example, the rotor cover 394 can be disposed between one or more wires and the rotor 222 to prevent the wires from contacting the rotor 222, which could damage or destroy the wires.

Rotor cover 394 is mounted to mount body 212, such as by fasteners (e.g., bolts). In the example shown, the rotor cover 394 is mounted to frame 258. More specifically, the rotor cover 394 is mounted to the upright portion 260 of the frame 258. The rotor cover 394 is cantilevered from the frame 258.

Rotor cover 394 extends from mount body 212 to at least partially cover the rotor 222. In some examples, the rotor cover 394 can project outward beyond the mount body 212. For example, the rotor cover 394 can extend rearward beyond a rearward-most portion of the mount body 212. The rotor cover 394 can extend rearward beyond a rearward-most portion of the frame 258. In the example shown, the rotor cover 394 extends in axial direction AD2 beyond the tube 266.

In the example shown, the rotor cover 394 partially covers the rotor 222, though it is understood that not all examples are so limited. The rotor cover 394 can partially cover the rotor 222 such that the rotor 222 is exposed radially through the rotor cover 394 at one or more locations about the axis A. Additionally or alternatively, the rotor cover 394 can partially cover the rotor 222 such that the rotor 222 is exposed axially through the rotor cover 394.

The rotor cover 394 mounts to the mount body 212 and extends outward from the mount body 212 to over the rotor 222. The rotor cover 394 can mount to the mount body 212 at multiple locations on the mount body 212. The rotor cover 394 can mount to the mount body 212 at opposite locations relative to the rotor axis A. In the example shown, the rotor cover 394 is connected to the mount body 212 on a first lateral side of the axis A and on a second lateral side of the axis A. The rotor cover 394 connects to the mount body 212 at a first location that is disposed laterally between the axis A and lateral side 324*a*. The rotor cover 394 can further connect to the mount body 212 at a second location that is disposed laterally between the axis A and lateral side 324*b*. In additional or alternative examples, the rotor cover 394 is connected to the mount body on a first vertical side of axis A (e.g., above axis A) and on a second vertical side of axis A (e.g., below axis A). In some examples, the rotor cover 394 can be connected to the mount body 212 at only two locations, though it is understood that not all examples are so limited. The mount legs 402*a*, 402*b* connect to the mount body 212 on opposite sides of the rotor 222. The mount legs 402*a*, 402*b* can connect to the mount body 212 such that the rotor 222 is located between the connection point of mount leg 402*a* to mount body 212 and the connection point of mount leg 402*b* to mount body 212. In some examples, the connection points of the mount legs 402*a*, 402*b* to the mount body 212 can be disposed about 180-degrees apart from each other.

The mount legs 402*a*, 402*b* can connect to the mount body 212 at opposite locations relative to the rotor axis A. In the example shown, the mount leg 402*a* is connected to the upright portion 260 on a first lateral side of the axis A and the mount leg 402*b* is connected to the upright portion 260 on a second lateral side of the axis A. The mount leg 402*a* connects to the mount body 212 at a first location that is disposed laterally between the axis A and lateral side 324*a*. The mount leg 402*b* connects to the mount body 212 at a second location that is disposed laterally between the axis A and lateral side 324*b*. Mount leg 402*a* is connected to the mount body 212 on a first vertical side of axis A (e.g., above axis A) and mount leg 402*b* is connected to the mount body 212 on a second vertical side of axis A (e.g., below axis A). In the example shown, the rotor cover 394 connects to the mount body 212 at only two locations, though it is understood that not all examples are so limited.

Rotor cover 394 can be disposed directly between electronic components of pumping assembly 210 and rotor 222. The rotor cover 394 can provide a shield that prevents wiring connecting various of the electronic components from contacting the rotor 222. The rotor cover 394 can, in some examples, form a wire guide that routes various wires between electronic components of pumping assembly 210.

In some examples, rotor cover 394 can hold one or more electronic components of pumping assembly 210. In the example shown, end board 414 is mounted to rotor cover 394. End board 414 is formed by one or more circuit boards. End board 414 can be electrically connected to electric motor 220, such as to stator 224. End board 414 can be electrically connected to other components of pumping assembly 210, such as to motor control 294 among other options. The end board 414 can be mounted to rotor cover 394 such that end board 414 axially overlaps with electric motor 220. The end board 414 can be held by the rotor cover 394 on an opposite axial side of the rotor 222 from electronic components wired to end board 414. For example, the end board 414 can be wired to motor control 294 that is disposed forward of rotor 222.

In the example shown, each mount leg 402*a*, 402*b* of the rotor cover 394 is fixed to the mount body 212 to connect the rotor cover 394 to the mount body 212. For example, the mount legs 402*a*, 402*b* can be connected to the mount body 212 by fasteners (e.g., bolts). The fasteners can extend through the rotor cover 394 and into the mount body 212, such as into the upright portion of the frame 258. Rotor cover 394 can be mounted to the mount body 212 at locations outward of the control board 302. In the example shown, each mount leg 402*a*, 402*b* is individually connected to the mount body 212.

Mount leg 402*a* and mount leg 402*b* extend in axial direction AD2 from the upright portion 260 to at least partially cover the rotor 222. In the example shown, each mount leg 402*a*, 402*b* extends to radially overlap with the rotor 222. The mount legs 402*a*, 402*b* radially overlap with the rotor 222 at locations radially outward of the rotor 222. The mount legs 402*a*, 402*b* extend from one axial side of rotor 222 to an opposite axial side of rotor 222. The mount legs 402*a*, 402*b* extend across a full axial extent of the rotor 222 to project axially outward from rotor 222 in both axial directions AD1, AD2.

Mount leg 402*a* connects to mount leg 402*b* rearward of the electric motor 220. Free end 400 of electric motor 220 extends between and structurally connects mount legs 402*a*, 402*b*. Free end 400 axially overlaps with the rotor 222. In the example shown, end aperture 416 is formed through free end 400, though it is understood that not all examples are so limited.

Rotor 222 is exposed radially through one or more gaps in the rotor cover 394. In the example shown, rotor 222 is further exposed axially through one or more gaps in the rotor cover 394. In the example shown, cover gaps 418*a*, 418*b* are disposed circumferentially between the mount legs 402*a*, 402*b*. The rotor 222 is exposed through the cover gaps 418*a*, 418*b*.

One or both of cover gaps 418*a*, 418*b* can be open radially relative to the rotor 222 such that the rotor 222 is radially exposed through rotor cover 394. One or both of cover gaps 418*a*, 418*b* can be open axially at locations axially overlapping with rotor 222 such that rotor 222 is axially exposed through rotor cover 394. The cover gaps 418*a*, 418*b* facilitate effective cooling of electric motor 220 while rotor cover 394 also protects various components of pumping assembly 210 from the rotating rotor 222. The rotor 222 is able to pull cooling air through the cover gaps 418*a*, 418*b*.

One or both of the cover gaps 418*a*, 418*b* can axially overlap with the rotor 222 such that blades 284 of the rotor 222 are exposed axially through the cover gap 418*a*, 418*b*. One or both of cover gaps 418*a*, 418*b* can radially overlap with the blades 284 of the rotor 222 such that the blades 284 are exposed radially through the cover gap 418*a*, 418*b*. Having the cover gaps 418*a*, 418*b* directly overlap with one or more blades 284 of the rotor 222 facilitates improved cooling by allowing rotor 222 to directly draw cooling air.

In the example shown, cover gap 418*a* is disposed on a top side of rotor 222 and cover gap 418*b* is disposed on a bottom side of rotor 222. The cover gaps 418*a*, 418*b* can be disposed on radially opposite sides of the rotor 222. A plane extending alone rotor axis A can pass through both the cover gaps 418*a*, 418*b*.

In some examples, the cover gaps 418*a*, 418*b* can extend over a greater circumferential extent of the rotor 222 than the mount legs 402*a*, 402*b*. For example, a combined circumferential width of the cover gaps 418*a*, 418*b* can be greater than a combined circumferential width of the mount legs 402*a*, 402*b* when taken at a location along the rotor axis A.

In some examples, an area of a radial exterior of the rotor 222 that is exposed directly radially outward through the rotor cover 394 can be greater than an area of the radial exterior of the rotor 222 that is directly radially inward of and overlapped by the rotor cover 394. Such a configuration can provide improved cooling by not overly restricting airflow to the rotor 222.

Rotor cover 394 shields other components of pumping assembly 210 from the rotating rotor 222. For example, the rotor cover 394 can prevent wires that extend between electronic components of pumping assembly 210 from contacting rotor 222. The rotor cover 394 provides a barrier that prevents the wires from contacting the spinning rotor 222, which could damage or destroy the wires.

Control panel 420 of pumping assembly 210 is shown in FIG. 21B. Control panel 420 is disposed on lateral side 324*a* of pumping assembly 210. Control panel 420 can include one or more interfaces for receiving an input from the user. For example, control panel 420 can include a power switch for controlling power to pumping assembly 210, can include a display screen (e.g., a graphical user interface), and/or can include a parameter control (e.g., pressure or flow control to set desired pressure or flow rate), among other options. Components of the control panel 420 can be wired to motor control 294.

The rotor cover 394 can include one or more wire guides for routing wiring of pumping assembly 210. In the example shown, the rotor cover 394 includes multiple wire guides that are configured to hold and/or guide wiring of the pumping assembly 210. It is understood, however, that rotor cover 394 can be configured without wire guides and/or with a single wire guide.

Rotor cover 394 is configured to shield the wired connections between control panel 420 and motor control 294. In the example shown, mount leg 402*a* is disposed directly between the control panel 420 and the rotor 222. The mount leg 402 is disposed directly between lateral side 324*a* and rotor 222. At least a portion of the mount leg 402*a* radially overlaps with both the rotor 222 and the control panel 420. A radial line extending outward from axis A can pass through electric motor 220, then mount leg 402*a*, and then the control panel 420. Mount leg 402*a* includes cover channel 404 that extends along mount leg 402*a*. The cover channel 404 is open outwards towards control panel 420. The cover channel 404 is closed inwards towards the rotor 222.

Cover channel 404 extends lengthwise along the mount leg 402*a*. The cover channel 404 radially overlaps with the rotor 222 and radially overlaps with control panel 420. Cover channel 404 is formed circumferentially between channel walls 422 in the example shown. The channel walls 422 are configured to prevent wiring from sagging out of the cover channel 404 or otherwise shifting circumferentially out of the cover channel 404. Cover channel 404 is configured such that one or more wires from the control panel 420 can be routed within guide channel 352 longitudinally forward towards motor control 294.

In the example shown, rotor cover 394 includes spacer 406 that acts as a wire guide. Spacer 406 extends from mount arm 402*a* and towards mount arm 402*b*. In the example shown, the spacer 406 at least partially spans the cover gap 418*a* between mount arm 402*a* and mount arm 402*b*. Spacer 406 is spaced in axial direction AD2 from control board 302. Spacer 406 can be disposed at a distal end of rotor 222 oriented in axial direction AD1. Spacer 406 can, in some examples, radially overlap with electric motor 220, such as with a portion of stator 224 disposed forward of rotor 222. In the example shown, the spacer 406 extends arcuately. The spacer 406 can extend over a highest vertical point of the rotor 222 such that the spacer 406 begins to curve vertically downward after passing over that highest vertical point.

Spacer 406 axially overlaps with control board 302. Spacer 406 can be disposed radially outward of electric motor 220. Spacer 406 can be disposed forward of rotor 222. Spacer 406 can prevent wires from control board 302 from contacting rotor 222. The spacer 406 can prevent wiring from drooping into the rotor 222.

In some examples, rotor cover 394 is configured to hold one or more electronic components of pumping assembly 210. As shown, end board 414 can be mounted to and held by the rotor cover 394. The end board 414 can be mounted on the free end 400 of rotor cover 394. The end board 414 can be disposed radially inward of the mount legs 402*a*, 402*b*. The end board 414 can be disposed to axially overlap with one or both of stator 224 and rotor 222. While rotor cover 394 is shown as holding end board 414, it is understood that not all examples include an end board 414.

End board 414 is mounted to free end 400 of the rotor cover 394. End board 414 can be disposed in cover recess 408. The end board 414 can be mounted in cover recess 408 such that the edges of the end board 414 are covered by the walls defining the cover recess 408. Such a configuration can protect the end board 414 and provide for more secure mounting of the end board 414.

In the example shown, the end board 414 mounts over the end aperture 416. As such, both axial faces of the end board 414 can be exposed, providing for enhanced cooling. The end board 414 can further be connected to the control board 302 by one or more wires. In the example shown, the guide 410 and retainer 412 can form a wire guide for routing wiring between the end board 414 and the control board 302. For example, wires from the end board 414 can be routed through the guide 410 and between the walls defining the guide 410. The wires can be routed along the exterior of the rotor cover 394 and through retainer 412 and then further forward to connect with the control board 302. The retainer 412 and guide can hold the wires while the wires route from rearward of the rotor 222 to forward of the rotor 222. The retainer 412 can be formed as a clip for holding such wires. The rotor cover 394 can guide at least one wire that extends across a full axial extent of the rotor 222 while shielding the wire from the rotor 222 that is radially inward of the rotor cover 394.

Rotor cover 394 provides significant advantages. Rotor cover 394 can partially cover rotor 222 and partially expose rotor 222. Such a configuration can provide improved cooling for operation of electric motor 220. The rotor cover 394 is not an outermost shroud of the pumping assembly 210, instead the rotor cover 394 is disposed within the assembly cover 318.

The rotor cover 394 is cantilevered from mount body 212 and extends over the rotor 222. Electronic components of pumping assembly 210 can be disposed both inward of rotor cover 394 (e.g., the stator coils 290) and outward of rotor cover 394. The rotor cover 394 can be disposed directly between electronic components of pumping assembly 210 and rotor 222. In the example shown, mount leg 402*a* is disposed between lateral side 324*a* of pumping assembly 210 and rotor 222. Various electronic components are disposed on lateral side 324*a* such that rotor cover 394 can protect wired connections of those electronic components.

Rotor cover 394 protects wired connections of pumping assembly 210. The rotor cover 394 is configured to shield wiring and prevents the wiring from contacting the spinning rotor 222. Rotor cover 394 can route wiring at locations radially outward of the rotor 222 to guide the wiring between electronic components.

In various examples, the rotor cover 394 can support one or more electronic components of the pumping assembly 210. The end board 414 can be mounted on free end 400 of the rotor cover 394. The end board 414 is connected to control board 302 for operation of pumping assembly 210, in examples including end board 414. The rotor cover 394 can route and support the wiring between end board 414 and control board 302, preventing risk of contact between the wiring and rotor 222.

Figure 23A:
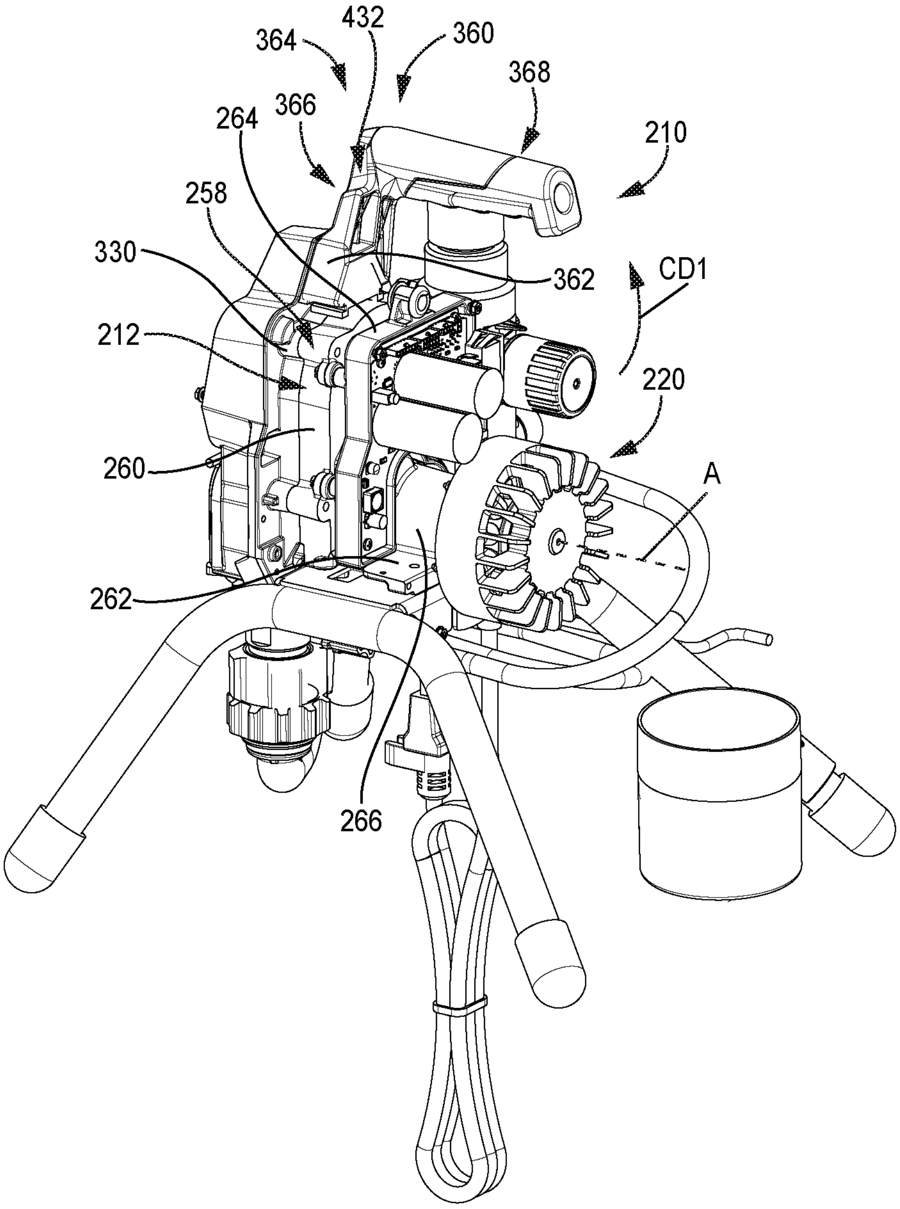
FIG. 23A is an isometric view of a pumping assembly.
Figure 23B:
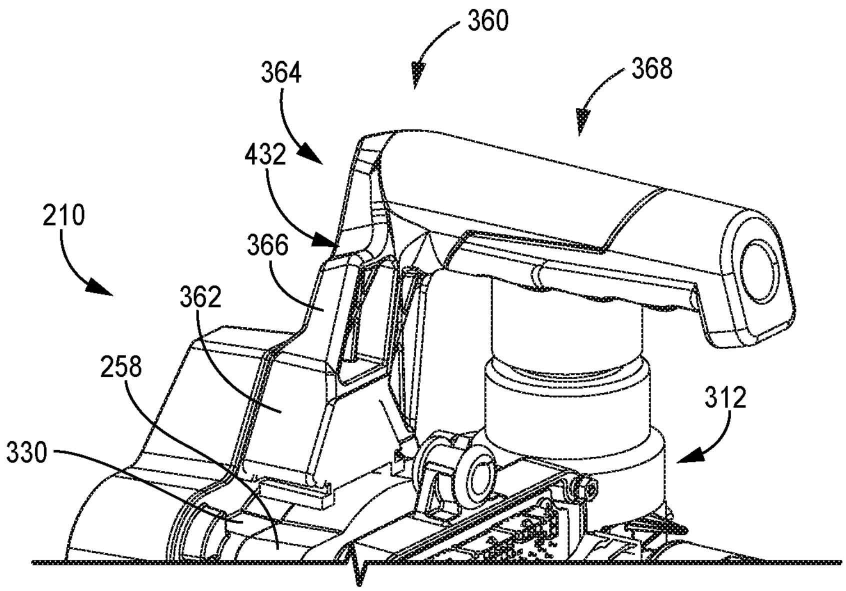
FIG. 23B is an enlarged isometric view of a top portion of the pumping assembly.
Figure 23C:
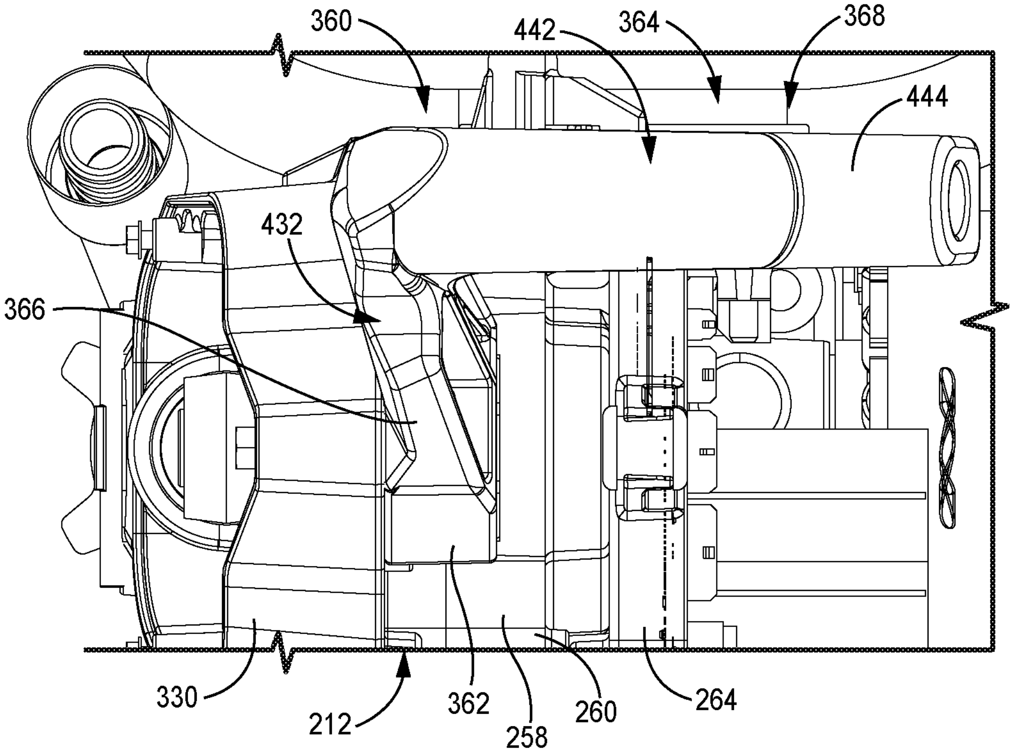
FIG. 23C is a top plan view of a portion of the pumping assembly.
Figure 23D:
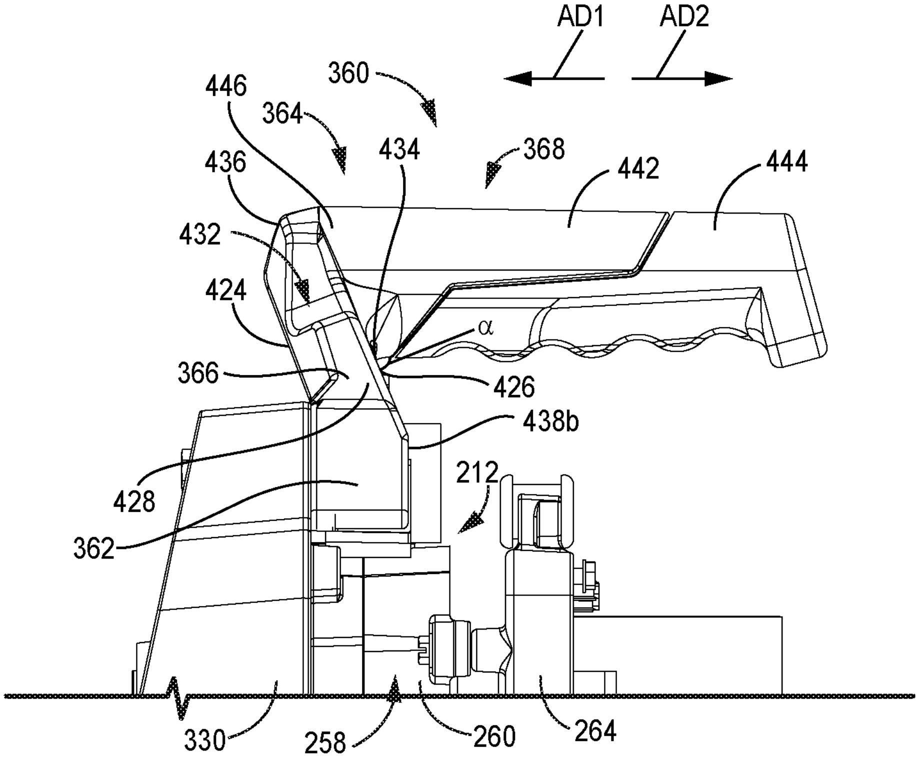
FIG. 23D is a side elevational view of a portion of the pumping assembly.
Figure 24A:
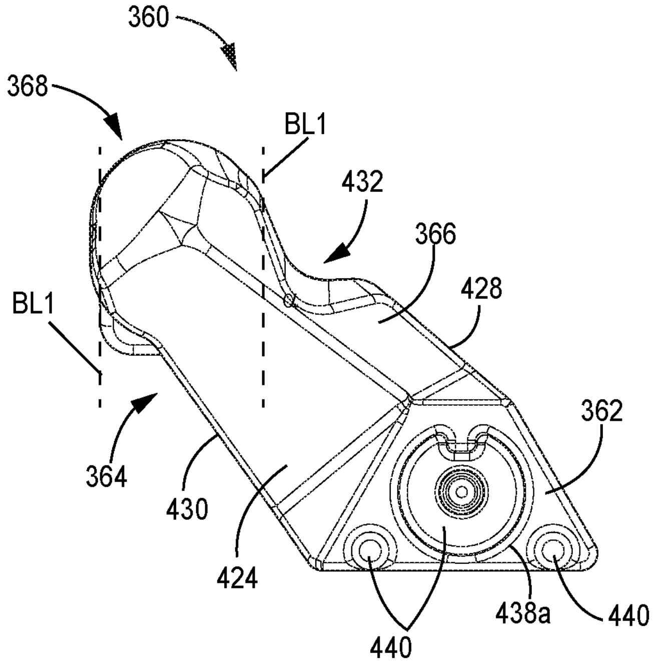
FIG. 24A is a front elevational view of an assembly handle.
Figure 24B:
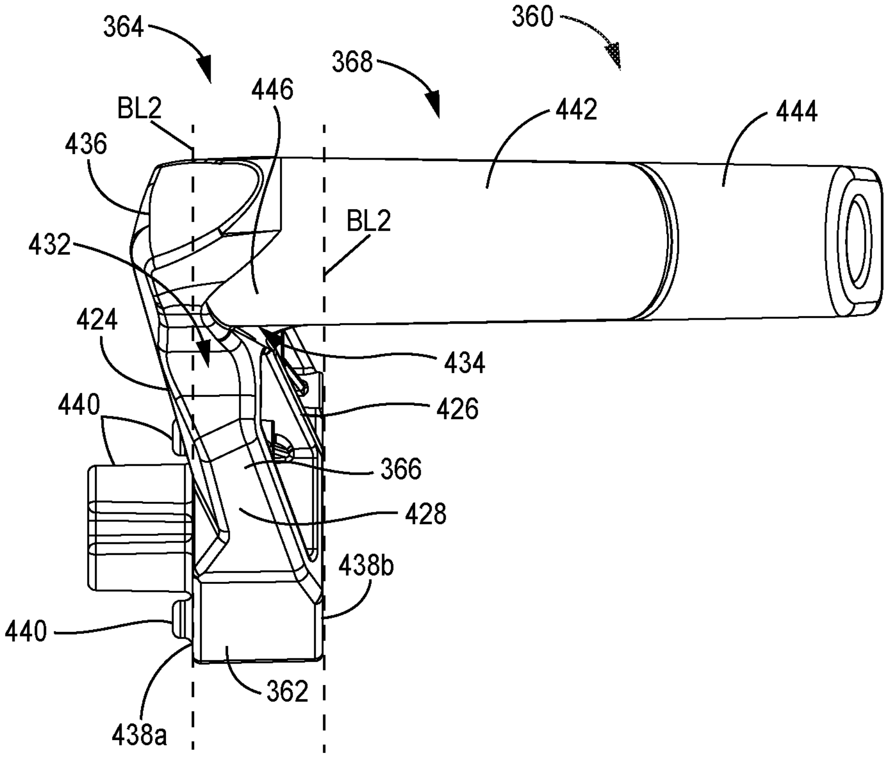
FIG. 24B is a side elevational view of the assembly handle.

FIG. 23A is an isometric view of pumping assembly 210. FIG. 23B is an enlarged isometric view of a top portion of pumping assembly 210. FIG. 23C is a top plan view of a portion of pumping assembly 210. FIG. 23D is a side elevational view of a portion of pumping assembly 210. FIG. 24A is a front elevational view of assembly handle 360. FIG. 24B is a side elevational view of assembly handle 360. FIGS. 23A-24B are discussed together.

Assembly handle 360 is connected to mount body 212. Assembly handle 360 extends from a top side of the mount body 212. Assembly handle 360 can form an uppermost portion of the pumping assembly 210. Assembly handle 360 can, in some examples, be partially disposed within assembly cover 318 and can extend out from assembly cover 318. In the example shown, assembly handle 360 is connected to drive housing 330, though it is understood that other configuration are possible.

Assembly handle 360 is cantilevered in that assembly handle 360 only connects to the other components of pumping assembly 210 by one connection point (e.g., between handle base 362 and mount body 212). In the example shown, assembly handle 360 directly connects with the drive housing 330. It is understood, however, that assembly handle 360 may alternatively connect to the frame 258 or other part of the mount body 212.

Assembly handle 360 include extension 364 that extends from handle base 362. Extension 364 includes base arm 366 and grip arm 368. Base arm 366 extends from handle base 362 that is connected to mount body 212. Base arm 366 can be considered to form an angled extension of the assembly handle 360. The base arm 366 projects outward from the drive housing 330 in several directions. In particular, the base arm 366 projects forward and also laterally. In the example shown, angled extension 364 projects laterally towards lateral side 324*a* of the fluid sprayer, though it is understood that in various other examples the base arm 366 can project laterally towards lateral side 324*b*.

Grip arm 368 is attached to base arm 366. Grip arm 368 can extend horizontally. Grip arm 368 can be cantilevered off of the base arm 366. The horizontal grip arm 368 is offset, both forward, and laterally (towards lateral side 324*a* in this case), due to the projecting orientation of the base arm 366 both forward and laterally. This allows the grip arm 368 to be ideally positioned relative to the center of gravity of the pumping assembly 210 so that the grip arm 368 can be held with a single hand by a user standing upright while carrying the pumping assembly 210 around a job site. In this orientation, the pumping assembly 210 tilts to accommodate the legs of the user carrying the pumping assembly 210.

Assembly handle 360 provides a location for a user to interface with assembly body 316 such as to pick up and carry pumping assembly 210. Assembly handle 360 projects outwards relative to mount body 212. In the example shown, assembly handle 360 is formed separately from other components of mount body 212 and connected to mount body 212 by a fastener (e.g., bolt). It is understood, however, that not all examples are so limited. For example, assembly handle 360 can, in some examples, be formed monolithically with other portions of mount body 212 such as by being cast together.

Handle base 362 is connected to mount body 212. For example, a fastener can extend through handle base 362 and into mount body 212. In the example shown, the handle base 362 is disposed on a side of the drive housing 330 that is oriented rearward towards electric motor 220. The handle base 362 can be disposed directly radially outward from the gear chamber 332 relative to axis A. The handle base 362 can be connected to the mount body 212 from a rear side of mount body 212. In the example shown, the handle base 362 is disposed on a rear side of the drive housing 330 to connect to the drive housing 330. In the example shown, the handle base 362 interfaces with a side of mount body 212 oriented towards the rear end 322 of pumping assembly 210.

Base arm 366 extends from handle base 362. Base arm 366 extends above the top side 326 of pumping assembly 210. Base arm 366 is angled such that base arm 366 extends laterally outward between handle base 362 and junction 434. In the example shown, base arm 366 can be considered to extend radially outward relative to rotor axis A. In the example shown, base arm 366 is laterally canted such that base arm 366 does not extend directly vertically upward. The base arm 366 is laterally canted such that the base arm 366 does not extend directly horizontally outward. In the example shown, base arm 366 can be considered to extend both radially and axially relative to the pump axis PA and relative to the rotor axis A.

Base arm 366 is canted such that the base arm 366 extends forward from handle base 362 and towards front end 320 as the base arm 366 extends from handle base 362 and towards junction 434. Base arm 366 extends forward to radially overlap with a top side of the drive housing 330. In the example shown, base arm 366 extends from one side of drive housing 330 towards an opposite side of drive housing 330 by extending over drive housing 330. In the example shown, the base arm 366 extends from a rearward side of drive housing 330 and towards a forward side of drive housing 330.

In the example shown, base arm 366 can be considered to have dual-canting in that base arm 366 extends laterally (e.g., outwards towards lateral side 324*a*) and longitudinally (e.g., towards front end 320). The assembly handle 360 can be considered to have dual-canting in that the base arm 366 extends laterally and longitudinally away from handle base 362. The dual-canting of assembly handle 360 provides for a compact configuration of assembly handle 360, requiring less material to manufacture and thereby providing cost savings.

Base arm 366 includes front surface 424, rear surface 426, inner surface 428, and outer surface 430. In the example shown, each of the surfaces 424, 426, 428, and 430 are angled such that the surfaces do not extend straight vertically, laterally, or longitudinally. In the example shown, the front surface 424 is oriented towards the front end 320 of fluid sprayer. The front surface 424 is further oriented to face vertically downwards in addition to facing towards the front end 320. The rear surface 426 is oriented towards the rear end 322. The rear surface 426 is further oriented to face vertically upwards and away from the assembly body 316 in addition to facing towards the rear end 322. The inner surface 428 is oriented in a same lateral direction as lateral side 324*b*. The inner surface 428 is further oriented to face vertically upwards in addition to facing laterally in a same lateral direction as lateral side 324*b*. The outer surface 430 is oriented in a same lateral direction as lateral side 324*a*. The outer surface 430 is further oriented to face vertically downwards in addition to facing laterally in a same lateral direction as lateral side 324*a*. The inner surface 428 and outer surface 430 form lateral sides of the base arm 366. The front surface 424 and rear surface 426 form longitudinal sides of base arm 366.

Assembly handle 360 is configured for ergonomic gripping and carrying of pumping assembly 210. In the example shown, assembly handle 360 includes grip notch 432. Grip notch 432 can receive a portion of a hand of a user, such as the thumb of the user. Grip notch 432 provides for ergonomic carrying. The user can place their thumb in grip notch 432 while grasping grip arm 368 with the fingers of the same hand. The user is not required to place their thumb in the junction 434 having the acute angle α.

Grip notch 432 is formed on inner surface 428 of base arm 366 in the example shown. Grip notch 432 is disposed at a location along base arm 366 that is closer to grip arm 368 than to handle base 362. Grip notch 432 is open vertically upward away from assembly body 316. Grip notch 432 is open laterally. Grip notch 432 is open laterally in an opposite lateral direction from the lateral direction that base arm 366 extends. In the example shown, the base arm 366 extends laterally towards lateral side 324*a* and grip notch 432 is open laterally towards lateral side 324*b*. In some examples, grip notch 432 can be open longitudinally. Grip notch 432 extends through front surface 424 and rear surface 426 in the example shown such that grip notch 432 is open in both longitudinal directions.

The configuration of grip notch 432 provides for ergonomic carrying as the thumb of the user can be placed at any desired location along grip notch 432 and/or can rest in grip notch 432 to extend fully through grip notch 432. The user is able to place their thumb into the grip notch 432 vertically or laterally, providing for easy access and gripping.

The base arm 366 can be considered to have a multi-axis pitch in that the base arm 366 is slanted both laterally and longitudinally as base arm 366 extends away from mount body 212. The base arm 366 extends both laterally outward and forwardly as the base arm 366 extends away from handle base 362.

Junction 434 is disposed at the intersection between base arm 366 and grip arm 368. Grip arm 368 extends from junction 434 to a distal end of assembly handle 360. Assembly handle 360 is cantilevered such that one end of assembly handle 360 is connected to mount body 212 while the other end of assembly handle 360 is not connected to mount body 212. In the example shown, grip arm 368 is cantilevered from base arm 366. Junction 434 is disposed on an inner side of assembly handle 360 and top corner 436 is disposed on an outer side of assembly handle 360. Top corner 436 is located at a transition from the outwardly extending base arm 366 to the longitudinally extending grip arm 368.

In the example shown, grip arm 368 extends axially relative to axis A. In some examples, grip arm 368 extends parallel to axis A. The grip arm 368 extends towards the rear end 322 from junction 434. In the example shown, grip arm 368 does not extend beyond rear end 322. Instead, grip arm 368 extends partially, but not fully, along a length of pumping assembly 210. The grip arm 368 extends horizontally from the junction 434. Grip arm 368 is disposed on one lateral side of mounting cavity 334 laterally outward from the pump axis PA.

Grip arm 368 extends to overlap with a center of gravity of pumping assembly 210. The grip arm 368 overlapping with the center of gravity of pumping assembly 210 balances pumping assembly 210 when the user grasps grip arm 368 to pick up pumping assembly 210. In the example shown, the grip arm 368 is spaced laterally from the center of gravity with the pumping assembly 210 supported on the ground surface by the stand 214.

The balanced pumping assembly 210 facilitates easier and more ergonomic carrying of pumping assembly 210. The grip arm 368 being laterally offset from the center of gravity causes the pumping assembly 210 to swing away from the user when the pumping assembly 210 is picked up by the user. As such, the legs supporting the pumping assembly 210 (e.g., the stand legs 218) swing away from the user such that the legs do not interfere with the user while walking and carrying the pumping assembly 210.

The grip arm 368 is laterally offset from handle base 362. The grip arm 368 does not overlap with the handle base 362, as best shown by bracketing lines BL1 in FIG. 24A. The grip arm 368 is laterally offset from the handle base 362. The grip arm 368 is laterally offset from an interface between assembly handle 360 and mount body 212.

In the example shown, the connected end 446 of grip arm 368, at which grip arm 368 interfaces with base arm 366, is not longitudinally offset from handle base 362. The grip arm 368 connects to the base arm 366 at a location that is disposed vertically above the handle base 362 in-line with the handle base 362. The connected end 446 of grip arm 368 overlaps with handle base 362 but is not disposed directly vertically above the handle base 362. Instead, the grip arm 368 overlaps with handle base 362 at a location laterally offset from handle base 362 such that a plane normal to the rotor axis A can pass through both handle base 362 and grip arm 368.

Base arm 366 extends from a top side of handle base 362. Base arm 366 connects to the handle base 362 between base face 438*a* and base face 438*b*. Base face 438*a* is configured to interface with mount body 212. Base face 438*b* is oriented away from mount body 212 in the example shown. Base face 438*a* is oriented in axial direction AD1 and base face 438*b* is oriented in axial direction AD1, in this example. Base face 438*a* is oriented forward. Base face 438*b* is oriented rearward.

Base arm 366 is dual-canted to extend both laterally and longitudinally from handle base 362. Bracketing lines BL2 are shown extending laterally along the base faces 438*a*, 438*b* of the handle base 362. The base arm 366 is canted relative to the handle base 362 such that the junction 434 is disposed above the handle base 362 between the bracketing lines BL2. The base arm 366 is canted longitudinally such that the junction 434 is disposed longitudinally between the base faces 438*a*, 438*b*. The base arm 366 is canted such that the junction 434 is laterally offset from the handle base 362 and not disposed directly vertically over the handle base 362. The canting of the base arm 366 positions the grip arm 368 such that an entirety of the grip arm 368 is laterally offset from the handle base 362 while the connected end 446 of the grip arm 368 overlaps with the handle base 362 at a location longitudinally between the front end 320 and the rear end 322.

In the example shown, the base arm 366 is canted such that the junction 434 is disposed at a longitudinal location between the bracketing lines BL2. The junction 434 is not disposed forward or rearward of the handle base 362. Instead, the junction 434 can be considered to be aligned with the handle base 362 at a location longitudinally between front end 320 and rear end 322.

Base arm 366 extends longitudinally from handle base 362 such that at least a portion of the base arm 366 is disposed longitudinally forward of the handle base 362. In the example shown, the top corner 436 is disposed forward of both bracketing lines BL2. The base arm 366 extends longitudinally such that the top corner 436 is forward of and not aligned with a common longitudinal location with handle base 362. The top corner 436 is disposed on an opposite longitudinal side of the handle base 362 from a distal end of the grip arm 368.

The extension 364 can be considered to extend fully longitudinally across the handle base 362. The extension 364 extends fully across handle base 362 such that at least a portion of the extension 364 extends forward of the handle base 362 in axial direction AD1 and another portion of the extension 364 extends rearward of handle base 362 in axial direction AD2.

Assembly handle 360 can be keyed to the mount body 212. Assembly handle 360 can be mounted to the mount body 212 such that a keyed interface maintains an orientation of the assembly handle 360 relative to the mount body 212. In the example shown, assembly handle 360 includes projections 440. Projections 440 extend from base face 438*a* of handle base 362.

Projections 440 are configured to interface with corresponding features (e.g., bores) in mount body 212 with assembly handle 360 connected to mount body 212. While projections 440 are shown as extending from assembly handle 360, it is understood that not all configurations are so limited. For example, assembly handle 360 can include bores that receive projections of the mount body 212. In some examples, assembly handle 360 can include a combination of projections and bores that interface with bores and projections of the mount body 212.

In the example shown, grip arm 368 includes arm base 442 and arm cover 444. Arm base 442 extends from base arm 366. Arm cover 444 is at least partially disposed over arm base 442 and is supported by arm base 442. Arm base 442 can be monolithically formed with other portions of assembly handle 360, such as with base arm 366. Arm base 442 and arm cover 444 can be formed from different materials. For example, arm base 442 can be formed from a metal to provide structural stability to assembly handle 360 and arm cover 444 can be formed from a non-metallic material, such as plastic, for user comfort and reduced weight. In the example shown, the arm cover 444 is exposed on a top side of grip arm 368, a bottom side of grip arm 368, and on both lateral sides of grip arm 368. In the example shown, the arm cover 444 is exposed at the distal longitudinal end of grip arm 368. In the example shown, the exterior of grip arm 368 is fully formed by arm cover 444 at at least one location along the length of grip arm 368.

In the example shown, the arm cover 444 is connected to arm base 442 by a fastener (e.g., bolt) extending through arm cover 444 and into arm base 442 at a distal end of grip arm 368. Such positioning of the fastener removes the fastener from locations that are gripped by the user, providing improved comfort and ergonomics. It is understood, however, that arm cover 444 can be connected to arm base 442 in any desired manner (e.g., press-fitting, overmolding, etc.).

The base arm 366 extending forwardly from handle base 362 to junction 434 provides for improved structural stability of assembly handle 360. The angle α between base arm 366 and grip arm 368 is an acute angle. Such a configuration provides for a more rigid assembly handle 360 than if base arm 366 extended straight vertically to junction 434. The base arm 78 extending forwardly to junction 434 also decreases the overall length of assembly handle 360, providing for a more compact configuration of assembly handle 360. Such a configuration reduces the lever arm assembly handle 360, providing for more ergonomic carrying for the user.

Assembly handle 360 is pitched both laterally and longitudinally. In the example shown, the base arm 366 forms the canted portion of assembly handle 360. The base arm 366 extends away from pump axis PA such that a closest portion of assembly handle 360 to pump axis PA is formed at the interface between assembly handle 360 and mount body 212.

In the example shown, extension 364 extends from handle base 362 such that grip arm 368 is disposed between filter manifold 312 and crank arm 244. The grip arm 368 is disposed vertically above electric motor 220 and drive 234. The grip arm 368 is disposed vertically above the filter manifold 312 in the example shown. In the example shown, the grip arm 368 provides a vertically highest portion of pumping assembly 210.

The assembly handle 360 is disposed such that grip arm 368 is fully on one lateral side of the motor axis A. In the example shown, the assembly handle 360 is mounted in-line with the motor axis A. At least a portion of the assembly handle 360 can be disposed directly vertically above the motor axis A. In the example shown, the handle base 362 is disposed directly vertically above the motor axis A. The base arm 366 extends laterally outward from handle base 362. The base arm 366 extends in one lateral direction away from the motor axis A. The base arm 366 extends such that the grip arm 368 is laterally offset from and not directly vertically over the motor axis A.

The grip arm 368 being laterally offset from the motor axis A facilitates ergonomic carrying of pumping assembly 210. When the user picks up the pumping assembly 210 at assembly handle 360 the pumping assembly 210 will pivot about grip arm 368 in circumferential direction CD1. The pivoting will vertically align the center of gravity of pumping assembly 210 with the grip arm 368. Typically, the user will reach over the top side 326 from lateral side 324*b* to grasp grip arm 368 such that the pivoting causes the stand legs 218 to shift out of the way of the user as the user carries the pumping assembly 210. As such, the user does not need to worry about bumping their leg into the stand legs 218 of the stand 214 and instead can freely carry the pumping assembly 210. The configuration of assembly handle 360 causes the stand legs 218 to pivot away from the user such that the user can freely walk while carrying the pumping assembly 210.

Assembly handle 360 provides improved ergonomic functionality. Assembly handle 360 extends to overlap with the center of gravity of pumping assembly 210 providing for balanced, ergonomic carrying of pumping assembly 210 when grasping grip arm 368. The assembly handle 360 is cantilevered, allowing for easy access to and release of assembly handle 360. Assembly handle 360 is dual-canted such that assembly handle 360 extends both laterally and longitudinally from handle base 362. In the examples shown, the base arm 366 extends laterally away from handle base 362 and extends forward from handle base 362. The dual-canting of base arm 366 provides for a compact configuration that provides material savings and thereby reduces costs. In the example shown, the assembly handle 360 is canted such that the extension 364 extends both longitudinally forward from the handle base 362 and longitudinally rearward from the handle base 362. Further, reducing the material in assembly handle 360 also reduces weight, providing for a more ergonomic carrying experience.

Base arm 366 extending forwardly as base arm 366 extends away from handle base 362 reduces the overall length of assembly handle 360 and provides for a strong, sturdy configuration while providing a grip arm 368 that is long enough to accommodate the hand of the user and that also extends to overlap with the center of gravity of pumping assembly 210. Grip arm 368 extends horizontally. In the example shown, grip arm 368 includes arm cover 444 that is mounted on arm base 442. Arm cover 444 is configured to interface with the hand of the user when the user grasps grip arm 368. The arm cover 444 can be made of a softer material than metal, improving ergonomics and reducing weight. The grip notch 432 further facilitates ergonomic carrying of the pumping assembly 210. The user is not required to place their thumb in the acute angle α at junction 434 and can instead place their thumb in grip notch 432.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fluid sprayer configured to spray a spray fluid, the fluid sprayer comprising:

a pumping assembly comprising:

an electric motor, the electric motor comprising a rotor and a stator, at least a portion of the rotor located directly radially outward of the stator relative to a rotational axis of the electric motor such that at least the portion of the rotor rotates around the stator, the electric motor configured to output rotational motion;

a drive which converts rotational motion output by the electric motor into linear reciprocating motion;

a pump, the pump receiving linear reciprocating motion from the drive to pump the spray fluid;

a frame comprising a plate and a tube that extends away from the plate in a direction that is away from the pump, the frame stationary during operation of the pumping assembly, wherein the tube extends within the electric motor, and the rotor rotates around the tube;

a first bearing located within a portion of the tube, the portion extending away from the plate in the direction that is away from the pump, the first bearing supported by the tube; and a drive shaft connected to the rotor, the drive shaft extending within each of the tube, the stator, the rotor, and the first bearing while the stator is located directly radially outward from the tube relative to the rotational axis, and the drive shaft is supported by the first bearing;

a supply hose to convey the spray fluid from the pumping assembly; and a spray gun configured to receive the spray fluid from the supply hose and emit the spray fluid as a fluid spray.

2. The fluid sprayer of claim 1, wherein the pump includes a piston configured to reciprocate on a pump axis.

3. The fluid sprayer of claim 1, wherein the drive shaft is connected to the rotor such that the drive shaft rotates 1:1 with the rotor.

4. The fluid sprayer of claim 1, wherein the first bearing directly contacts the drive shaft and the tube.

5. The fluid sprayer of claim 1, wherein the drive shaft extends entirely though through each of the stator, the rotor, the first bearing, and the tube such that the drive shaft is located both forward and rearward of each of the stator, the rotor, the first bearing, and the tube.

6. The fluid sprayer of claim 1, wherein an end of the drive shaft is formed into a pinion that interfaces with a gear of the drive.

7. The fluid sprayer of claim 1, further comprising a rotor frame that fixes the rotor to a rear end of the drive shaft, wherein the stator is disposed along the rotational axis between the rotor frame and the drive, and the pump is located forward of both of the electric motor and the drive shaft.

8. The fluid sprayer of claim 1, further comprising a drive housing having a mounting cavity, wherein the drive housing is connected to the frame, the drive is captured by and between the drive housing and the plate, the frame is a single piece of metal, and the pump is at least partially disposed in the mounting cavity and hangs down from the drive housing.

9. The fluid sprayer of claim 1, wherein the first bearing is located directly radially inward of both of the rotor and the stator relative to the rotational axis while the first bearing is located directly radially outward of the drive shaft.

10. The fluid sprayer of claim 1, further comprising a second bearing through which the drive shaft extends, the second bearing mounted to the frame and located outside of the electric motor, the second bearing spaced from the first bearing along the drive shaft, the second bearing closer to the pump than the first bearing is relative to the pump.

11. The fluid sprayer of claim 1, wherein the plate receives part of an upper gear shaft, the upper gear shaft is located above the drive shaft, the upper gear shaft comprises an eccentric, the eccentric is connected to a crank arm of the drive which together convert rotational motion into linear reciprocating motion to operate the pump, and the pump extends below the drive shaft.

12. The fluid sprayer of claim 1, further comprising a stand comprising a plurality of legs, wherein the tube extends rearward from an upright portion of the frame, the frame comprises a base portion that extends horizontally, the base portion is mounted on the stand, the frame is formed from a single piece of metal, and the pump extends below the electric motor and the drive.

13. The fluid sprayer of claim 1, further comprising a rotor frame, the rotor frame comprising a mounting ring, an outer tube in which a circular array of magnets are mounted, and a plurality of blades, the mounting ring mounted to the drive shaft, the plurality of blades extending radially outward from the mounting ring to the outer tube to structurally connect the outer tube to the mounting ring, the plurality of blades rotating when the rotor drives the pump to cause airflow when the rotor rotates which cools the stator.

14. The fluid sprayer of claim 1, wherein the rotational motion generated by the electric motor is transmitted in a forward axial direction from the rotor to the drive, and a control board of a motor control configured to regulate one or more power signals to the electric motor is disposed axially along the rotational axis between the rotor and the pump.

15. The fluid sprayer of claim 1, wherein the tube is a single piece of a material and the direction is rearward.

16. The fluid sprayer of claim 1, wherein the stator comprises a plurality of electromagnet coils and the rotor comprises a circular array of magnets.

17. A fluid sprayer configured to spray a spray fluid, the fluid sprayer comprising:

a pumping assembly comprising:

an electric motor, the electric motor comprising a rotor and a stator, at least a portion of the rotor located directly radially outward of the stator relative to a rotational axis of the electric motor, the electric motor configured to output rotational motion;

a drive which converts rotational motion output by the electric motor into linear reciprocating motion;

a pump, the pump receiving linear reciprocating motion from the drive to pump the spray fluid;

a frame, the frame stationary during operation of the pumping assembly, wherein a part of the frame extends within the electric motor and the part of the frame is a tube; and a drive shaft connected to the rotor extends within and through the tube while the stator is located directly radially outward from the tube;

wherein the tube extends rearward from an upright portion of the frame and the tube is cantilevered from the upright portion of the frame;

a supply hose extending from the pumping assembly to convey the spray fluid from the pumping assembly; and a spray gun configured to receive the spray fluid from the supply hose and emit the spray fluid as a fluid spray.

18. The fluid sprayer of claim 17, wherein the frame comprises a horizontal portion.

19. The fluid sprayer of claim 18, wherein the frame is a single piece of metal.

20. A fluid sprayer configured to spray a spray fluid, the fluid sprayer comprising:

a pumping assembly comprising:

an electric motor, the electric motor comprising a rotor, a rotor body, and a stator, the stator comprising a plurality of electromagnet coils, the rotor comprising a circular array of magnets, the rotor body comprising a plurality of blades and an outer tube to which the circular array of magnets are mounted, at least a portion of the rotor located directly radially outward of the stator relative to a rotational axis of the electric motor such that the rotor rotates around the stator, the electric motor configured to output rotational motion;

a drive which converts rotational motion output by the electric motor into linear reciprocating motion;

a drive shaft connected to the rotor to receive a rotational output from the rotor, wherein the rotor is connected to an input end of the drive shaft and an output end of the drive shaft interfaces with a gear of the drive, at least part of the drive shaft located directly radially inward of both of the rotor and the stator relative to the rotational axis, wherein the input end is a rear end of the drive shaft and the output end is a forward end of the drive shaft;

a pump, the pump receiving linear reciprocating motion from the drive to pump the spray fluid; and a frame, the frame stationary during operation of the pumping assembly, wherein a part of the frame extends within the electric motor, the stator is mounted on the part of the frame, and the drive shaft extends within the part of the frame;

wherein the drive shaft extends through the electric motor such that the output end is disposed closer to the pump than the input end relative to the pump; and wherein the plurality of blades structurally connect the outer tube to the drive shaft such that the driving force from the plurality of magnets is transmitted radially inward through the plurality of blades to the drive shaft while the plurality of blades also cause airflow between the electromagnet coils to cool the electromagnet coils when the rotor rotates to operate the pump;

a supply hose to convey the spray fluid from the pumping assembly; and a spray gun configured to receive the spray fluid from the supply hose and emit the spray fluid as a fluid spray.

21. The fluid sprayer of claim 20, wherein the rotor extends rearward of the stator along the rotational axis and further extends radially outward beyond the stator, the stator extends forward of the rotor along the rotational axis, the drive extends forward of the stator, and the pump is located forward of the electric motor and extends below all of the electric motor and the drive.

22. The fluid sprayer of claim 20, wherein the drive shaft extends fully axially through the part of the frame, and the part of the frame is a tube.

23. The fluid sprayer of claim 20, wherein the rotor body comprises a mounting ring that fixes the plurality of blades to the drive shaft, and the rotor body is formed as a cup that is open towards the pump.

24. A fluid sprayer configured to spray a spray fluid, the fluid sprayer comprising:

an electric motor, the electric motor comprising a rotor and a stator, at least a portion of the rotor located directly radially outward of the stator relative to a rotational axis of the electric motor such that at least the portion of the rotor rotates around the stator, the electric motor configured to output rotational motion;

a drive which converts rotational motion output by the electric motor into linear reciprocating motion;

a drive shaft connected to the rotor to receive a rotational output from the rotor, the drive shaft connected to the rotor at a rear end of the electric motor by a rotor frame, at least part of the drive shaft located directly radially inward of both of the rotor and the stator relative to the rotational axis;

a pump, the pump receiving linear reciprocating motion from the drive to pump the spray fluid, the pump disposed forward of the electric motor;

a first bearing through which the drive shaft extends, the first bearing supporting the drive shaft; and a frame, the frame stationary during operation of the pumping assembly, wherein a part of the frame extends within the electric motor and the part of the frame is a tube;

wherein the first bearing is located directly radially between the drive shaft and the rotor relative to the rotational axis, wherein the first bearing is located directly radially between the drive shaft and the stator relative to the rotational axis, wherein a forward end of the drive shaft interfaces with the drive, and wherein the pump is disposed forward of the electric motor.

25. The fluid sprayer of claim 24, wherein the stator comprises a plurality of electromagnet coils and the rotor comprises a circular array of magnets.

* * * * *